US012352196B2

(12) United States Patent
Chiruta et al.

(10) Patent No.: US 12,352,196 B2
(45) Date of Patent: Jul. 8, 2025

(54) EXHAUST GAS AFTERTREATMENT SYSTEM

(71) Applicant: Cummins Emission Solutions Inc., Columbus, IN (US)

(72) Inventors: Mihai Chiruta, Madison, WI (US); David L. Dunnuck, Columbus, IN (US); Matthew Henry, Darlington (GB); Akshat Gattani, San Francisco, CA (US); Reed Tracy Gardner, Fitchburg, WI (US)

(73) Assignee: Cummins Emission Solutions Inc., Columbus, IN (US)

( * ) Notice: Subject to any disclaimer, the term of this patent is extended or adjusted under 35 U.S.C. 154(b) by 64 days.

(21) Appl. No.: 18/275,096

(22) PCT Filed: Feb. 1, 2022

(86) PCT No.: PCT/US2022/014781

§ 371 (c)(1),
(2) Date: Jul. 31, 2023

(87) PCT Pub. No.: WO2022/169775

PCT Pub. Date: Aug. 11, 2022

(65) Prior Publication Data

US 2024/0093624 A1 Mar. 21, 2024

Related U.S. Application Data

(60) Provisional application No. 63/144,689, filed on Feb. 2, 2021.

(51) Int. Cl.
*F01N 3/20* (2006.01)
*B01F 23/213* (2022.01)
(Continued)

(52) U.S. Cl.
CPC ........ *F01N 3/2066* (2013.01); *B01F 23/2132* (2022.01); *B01F 25/103* (2022.01);
(Continued)

(58) Field of Classification Search
CPC ...... F01N 3/2066; F01N 3/2892; F01N 13/00; F01N 2240/20; F01N 2610/1453;
(Continued)

(56) References Cited

U.S. PATENT DOCUMENTS 1,104,963 A 7/1914 Coanda
3,699,407 A 10/1972 Gurtler et al.
(Continued)

FOREIGN PATENT DOCUMENTS

CN 1864835 A 11/2006
CN 101501308 A 8/2009
(Continued)

OTHER PUBLICATIONS

Office Action issued in German Patent Application No. 11 2021 005 606.9 on Dec. 14, 2023.
(Continued)

*Primary Examiner* — Audrey B. Walter
(74) *Attorney, Agent, or Firm* — Foley & Lardner LLP

(57) ABSTRACT

An exhaust gas aftertreatment system includes an exhaust gas conduit a mixer, and a plurality of flow disrupters. The exhaust gas conduit is centered on a conduit center axis and includes an inner surface. The mixer includes a mixer body and an upstream vane plate. The upstream vane plate has a plurality of upstream vanes. At least one of the upstream vanes is coupled to the mixer body. The flow disrupters are disposed downstream of the mixer and circumferentially around the conduit center axis. Each of the flow disrupters is coupled to the exhaust gas conduit or integrally formed
(Continued)

with the exhaust gas conduit. Each of the flow disrupters extends inwardly from the inner surface.

23 Claims, 19 Drawing Sheets

(51) Int. Cl.
*B01F 25/10* (2022.01)
*B01F 25/314* (2022.01)
*B01F 25/431* (2022.01)
*B01F 25/452* (2022.01)
*F01N 3/28* (2006.01)
*F01N 13/00* (2010.01)

(52) U.S. Cl.
CPC ...... *B01F 25/3141* (2022.01); *B01F 25/4312* (2022.01); *B01F 25/43171* (2022.01); *B01F 25/431971* (2022.01); *B01F 25/4521* (2022.01); *F01N 3/2892* (2013.01); *F01N 13/00* (2013.01); *B01F 2215/0431* (2013.01); *F01N 2240/20* (2013.01); *F01N 2610/1453* (2013.01)

(58) Field of Classification Search
CPC ................ B01F 23/2132; B01F 25/103; B01F 25/3141; B01F 25/4312; B01F 25/43171; B01F 25/431971; B01F 25/4521; B01F 2215/0431
See application file for complete search history.

(56) References Cited

U.S. PATENT DOCUMENTS

| | | | |
|---|---|---|---|
| 4,424,777 | A | 1/1984 | Klomp |
| 6,444,177 | B1 | 9/2002 | Muller et al. |
| 7,127,884 | B2 | 10/2006 | Worner et al. |
| 7,581,387 | B2 | 9/2009 | Bui et al. |
| 7,793,490 | B2 | 9/2010 | Amon et al. |
| 7,836,688 | B2 | 11/2010 | Woerner et al. |
| 7,866,143 | B2 | 1/2011 | Buhmann et al. |
| 8,033,101 | B2 | 10/2011 | Amon et al. |
| 8,230,678 | B2 | 7/2012 | Aneja et al. |
| 8,375,708 | B2 | 2/2013 | Forster et al. |
| 8,460,610 | B2 | 6/2013 | Silver et al. |
| 8,607,555 | B2 | 12/2013 | Kaiser et al. |
| 8,615,984 | B2 | 12/2013 | Kornherr et al. |
| 8,695,330 | B2 | 4/2014 | Davidson et al. |
| 8,776,509 | B2 | 7/2014 | Wikaryasz et al. |
| 8,789,363 | B2 | 7/2014 | Iverson et al. |
| 9,021,794 | B2 | 5/2015 | Goss et al. |
| 9,133,744 | B2 | 9/2015 | Birkby et al. |
| 9,248,404 | B2 | 2/2016 | Brunel et al. |
| 9,266,075 | B2 | 2/2016 | Chapman et al. |
| 9,267,417 | B2 | 2/2016 | Baldwin et al. |
| D757,919 | S | 5/2016 | Kimura |
| 9,328,640 | B2 | 5/2016 | Iverson et al. |
| 9,346,017 | B2 | 5/2016 | Greber |
| 9,352,276 | B2 | 5/2016 | Sampath |
| 9,453,444 | B2 | 9/2016 | Fischer et al. |
| 9,464,546 | B2 | 10/2016 | Perrot et al. |
| 9,504,960 | B2 | 11/2016 | Park |
| 9,581,067 | B2 | 2/2017 | Guilbaud et al. |
| D781,071 | S | 3/2017 | Callif et al. |
| 9,605,573 | B2 | 3/2017 | Solbrig et al. |
| 9,644,516 | B1 | 5/2017 | Chiruta et al. |
| 9,664,081 | B2 | 5/2017 | Rusch et al. |
| 9,714,598 | B2 | 7/2017 | Alano et al. |
| D794,100 | S | 8/2017 | McDonald et al. |
| 9,726,064 | B2 | 8/2017 | Alano |
| 9,737,908 | B2 | 8/2017 | Hornback et al. |
| 9,776,135 | B2 | 10/2017 | Boeshans et al. |
| D809,577 | S | 2/2018 | McDonald et al. |
| D816,010 | S | 4/2018 | Rike |
| 9,995,193 | B2 | 6/2018 | Alano et al. |
| 10,024,217 | B1 | 7/2018 | Johnson et al. |
| 10,030,564 | B2 | 7/2018 | Cossard et al. |
| 10,174,658 | B2 | 1/2019 | Dimpelfeld et al. |
| 10,190,465 | B2 | 1/2019 | Alano et al. |
| D840,908 | S | 2/2019 | Rike |
| 10,215,075 | B2 | 2/2019 | Chapman et al. |
| 10,247,081 | B2 | 4/2019 | Niaz |
| 10,273,853 | B2 | 4/2019 | Golin |
| 10,273,854 | B1 | 4/2019 | Abbassi et al. |
| D849,662 | S | 5/2019 | Rike |
| 10,287,948 | B1 | 5/2019 | Moulieres et al. |
| 10,287,954 | B2 | 5/2019 | Chapman et al. |
| 10,294,843 | B2 | 5/2019 | Alano et al. |
| 10,316,721 | B1 | 6/2019 | Moulieres et al. |
| D855,090 | S | 7/2019 | McDonald et al. |
| 10,337,379 | B2 | 7/2019 | Dimpelfeld et al. |
| 10,337,380 | B2 | 7/2019 | Willats et al. |
| 10,422,268 | B2 | 9/2019 | Niaz |
| 10,533,478 | B2 | 1/2020 | Alano |
| 10,577,995 | B2 | 3/2020 | Ker et al. |
| 10,612,443 | B2 | 4/2020 | Li et al. |
| 10,632,430 | B1 | 4/2020 | Liu et al. |
| 10,731,536 | B1 | 8/2020 | Chenoweth et al. |
| 10,787,946 | B2 | 9/2020 | Rohde et al. |
| 10,808,587 | B2 | 10/2020 | Ottaviani et al. |
| 10,823,032 | B2 | 11/2020 | Willats et al. |
| 10,907,522 | B2 | 2/2021 | Poinsot et al. |
| 10,914,218 | B1 | 2/2021 | Chapman et al. |
| 10,920,635 | B2 | 2/2021 | Kozakiewicz |
| 10,920,642 | B2 | 2/2021 | Wang et al. |
| 10,933,387 | B2 | 3/2021 | Cvelbar |
| 10,967,329 | B2 | 4/2021 | Alano et al. |
| 11,085,346 | B2 | 8/2021 | Tucker et al. |
| 11,105,241 | B2 | 8/2021 | Tucker et al. |
| 11,143,084 | B2 | 10/2021 | Wahlstrom |
| 11,193,412 | B2 | 12/2021 | Cvelbar et al. |
| 11,230,958 | B2 | 1/2022 | Tucker et al. |
| 11,242,788 | B2 | 2/2022 | Kinnaird |
| 11,242,790 | B2 | 2/2022 | Chapman et al. |
| 11,268,424 | B2 | 3/2022 | Kimura et al. |
| 11,300,028 | B2 | 4/2022 | Meunier |
| 11,313,266 | B2 | 4/2022 | Tucker et al. |
| 11,428,140 | B1 | 8/2022 | Kinnaird et al. |
| 11,459,927 | B2 | 10/2022 | Rajashekharaiah et al. |
| 11,459,929 | B2 | 10/2022 | Dimpelfeld et al. |
| 11,506,101 | B2 | 11/2022 | Levato et al. |
| 11,591,943 | B2 | 2/2023 | Hornback |
| 11,746,684 | B2 | 9/2023 | Wahlstrom |
| 11,761,365 | B2 | 9/2023 | Liu et al. |
| 2002/0023435 | A1 | 2/2002 | Woerner et al. |
| 2002/0110047 | A1 * | 8/2002 | Bruck .................. F01N 3/0842 366/340 |
| 2004/0112883 | A1 | 6/2004 | Bowden et al. |
| 2004/0237511 | A1 | 12/2004 | Ripper et al. |
| 2005/0172615 | A1 | 8/2005 | Mahr |
| 2005/0262843 | A1 | 12/2005 | Monty |
| 2006/0150614 | A1 | 7/2006 | Cummings |
| 2006/0153748 | A1 | 7/2006 | Huthwohl et al. |
| 2006/0191254 | A1 | 8/2006 | Bui et al. |
| 2006/0260104 | A1 | 11/2006 | Himi |
| 2006/0266022 | A1 | 11/2006 | Woerner et al. |
| 2006/0283181 | A1 | 12/2006 | Crawley et al. |
| 2007/0144126 | A1 | 6/2007 | Ohya et al. |
| 2007/0163241 | A1 | 7/2007 | Meingast et al. |
| 2007/0245718 | A1 | 10/2007 | Cheng et al. |
| 2007/0283683 | A1 | 12/2007 | Bellinger |
| 2007/0289294 | A1 | 12/2007 | Werni et al. |
| 2008/0087013 | A1 | 4/2008 | Crawley et al. |
| 2008/0121179 | A1 | 5/2008 | Park et al. |
| 2008/0127635 | A1 | 6/2008 | Hirata et al. |
| 2008/0314033 | A1 | 12/2008 | Aneja et al. |
| 2009/0000283 | A1 | 1/2009 | Endicott et al. |
| 2009/0019843 | A1 | 1/2009 | Levin et al. |
| 2009/0031717 | A1 | 2/2009 | Blaisdell |
| 2009/0049829 | A1 | 2/2009 | Kaiser et al. |
| 2009/0084094 | A1 | 4/2009 | Goss et al. |
| 2009/0145119 | A1 | 6/2009 | Farrell et al. |
| 2009/0158717 | A1 | 6/2009 | Kimura et al. |

(56) References Cited

U.S. PATENT DOCUMENTS

| | | | |
|---|---|---|---|
| 2009/0158721 | A1 | 6/2009 | Wieland et al. |
| 2009/0158722 | A1 | 6/2009 | Kojima et al. |
| 2009/0180937 | A1 | 7/2009 | Nohl et al. |
| 2009/0229254 | A1 | 9/2009 | Gibson |
| 2009/0272106 | A1 | 11/2009 | Werni et al. |
| 2010/0083641 | A1 | 4/2010 | Makartchouk et al. |
| 2010/0146942 | A1 | 6/2010 | Mayr et al. |
| 2010/0146948 | A1 | 6/2010 | Dacosta et al. |
| 2010/0187383 | A1 | 7/2010 | Olsen et al. |
| 2010/0251719 | A1 | 10/2010 | Mancini et al. |
| 2010/0319329 | A1 | 12/2010 | Khadiya |
| 2011/0005232 | A1 | 1/2011 | Williams et al. |
| 2011/0079003 | A1 | 4/2011 | Sun et al. |
| 2011/0094206 | A1 | 4/2011 | Liu et al. |
| 2011/0099978 | A1 | 5/2011 | Davidson et al. |
| 2011/0146237 | A1 | 6/2011 | Adelmann et al. |
| 2011/0146253 | A1 | 6/2011 | Isada et al. |
| 2011/0194987 | A1 | 8/2011 | Hodgson et al. |
| 2012/0003955 | A1 | 1/2012 | Gabriel |
| 2012/0124983 | A1 | 5/2012 | Hong |
| 2012/0204541 | A1 | 8/2012 | Li et al. |
| 2012/0204542 | A1 | 8/2012 | Norris et al. |
| 2012/0204544 | A1 | 8/2012 | Uhrich et al. |
| 2012/0216513 | A1 | 8/2012 | Greber et al. |
| 2013/0067891 | A1 | 3/2013 | Hittle et al. |
| 2013/0097819 | A1 | 4/2013 | Kojima |
| 2013/0333363 | A1 | 12/2013 | Joshi et al. |
| 2014/0033686 | A1 | 2/2014 | Fischer et al. |
| 2014/0230418 | A1 | 8/2014 | Perrot et al. |
| 2014/0260209 | A1 | 9/2014 | Goss et al. |
| 2014/0325967 | A1 | 11/2014 | Kimura |
| 2014/0373721 | A1 | 12/2014 | Sandou et al. |
| 2015/0000389 | A1 | 1/2015 | Runde et al. |
| 2015/0016214 | A1 | 1/2015 | Mueller |
| 2015/0089923 | A1 | 4/2015 | Henderson et al. |
| 2015/0110681 | A1 | 4/2015 | Ferront et al. |
| 2015/0121855 | A1 | 5/2015 | Munnannur et al. |
| 2015/0218996 | A1 | 8/2015 | Brandl et al. |
| 2015/0224870 | A1 | 8/2015 | Shin et al. |
| 2015/0233276 | A1 | 8/2015 | Cassity et al. |
| 2015/0360176 | A1 | 12/2015 | Bui et al. |
| 2016/0061090 | A1 | 3/2016 | Anand et al. |
| 2016/0069239 | A1 | 3/2016 | Freeman et al. |
| 2016/0083060 | A1 | 3/2016 | Kassianoff |
| 2016/0090887 | A1 | 3/2016 | Mitchell et al. |
| 2016/0115847 | A1 | 4/2016 | Chapman et al. |
| 2016/0138454 | A1 | 5/2016 | Alano et al. |
| 2016/0158714 | A1 | 6/2016 | Li et al. |
| 2016/0175784 | A1 | 6/2016 | Harmon et al. |
| 2016/0194991 | A1 | 7/2016 | Clayton et al. |
| 2016/0243510 | A1 | 8/2016 | Denton et al. |
| 2016/0251990 | A1 | 9/2016 | Dimpelfeld et al. |
| 2016/0326931 | A1 | 11/2016 | Freeman et al. |
| 2016/0332126 | A1 | 11/2016 | Nande et al. |
| 2016/0361694 | A1 | 12/2016 | Brandl et al. |
| 2016/0376969 | A1 | 12/2016 | Zhang et al. |
| 2017/0067387 | A1 | 3/2017 | Khaled |
| 2017/0089246 | A1 | 3/2017 | Greber et al. |
| 2017/0107882 | A1 | 4/2017 | Chiruta et al. |
| 2017/0152778 | A1 | 6/2017 | Li et al. |
| 2017/0327273 | A1 | 11/2017 | Lee et al. |
| 2017/0361273 | A1 | 12/2017 | Zoran et al. |
| 2017/0370262 | A1 | 12/2017 | Zoran et al. |
| 2018/0078912 | A1 | 3/2018 | Yadav et al. |
| 2018/0087428 | A1 | 3/2018 | Barr |
| 2018/0142604 | A1 | 5/2018 | Niaz |
| 2018/0266300 | A1 | 9/2018 | Liu et al. |
| 2018/0306083 | A1 | 10/2018 | Sampath et al. |
| 2018/0313247 | A1 | 11/2018 | Bauknecht et al. |
| 2019/0063294 | A1 | 2/2019 | Johnson et al. |
| 2019/0107025 | A1 | 4/2019 | Brinkmeyer |
| 2019/0323397 | A1 | 10/2019 | Pill et al. |
| 2020/0102873 | A1 | 4/2020 | Ramolivo et al. |
| 2020/0123955 | A1 | 4/2020 | Liu et al. |
| 2020/0325811 | A1 | 10/2020 | Levin et al. |
| 2020/0332696 | A1 | 10/2020 | Chapman et al. |
| 2021/0039056 | A1 | 2/2021 | De Rudder et al. |
| 2021/0095587 | A1 | 4/2021 | Cvelbar et al. |
| 2021/0301704 | A1 | 9/2021 | Hornback |
| 2021/0301710 | A1 | 9/2021 | Cvelbar et al. |
| 2021/0363907 | A1 | 11/2021 | Poinsot et al. |
| 2021/0404367 | A1 | 12/2021 | Alano et al. |
| 2022/0065148 | A1 | 3/2022 | Sudries et al. |
| 2022/0090532 | A1 | 3/2022 | Degner et al. |
| 2022/0099121 | A1 | 3/2022 | Kumar |
| 2022/0162975 | A1 | 5/2022 | Cvelbar et al. |
| 2022/0162976 | A1 | 5/2022 | Alano et al. |
| 2022/0178296 | A1 | 6/2022 | Hogan |
| 2022/0184567 | A1 | 6/2022 | Geant |
| 2022/0316382 | A1 | 10/2022 | De Rudder |
| 2022/0349330 | A1 | 11/2022 | Chapman et al. |
| 2022/0379272 | A1 | 12/2022 | Alano |
| 2023/0003159 | A1 | 1/2023 | Mittapalli et al. |
| 2023/0141549 | A1 | 5/2023 | Kalyanshetti |

FOREIGN PATENT DOCUMENTS

| | | | |
|---|---|---|---|
| CN | 101815851 | A | 8/2010 |
| CN | 102242662 | A | 11/2011 |
| CN | 103429864 | A | 12/2013 |
| CN | 105143628 | A | 12/2015 |
| CN | 105612325 | A | 5/2016 |
| CN | 105715340 | A | 6/2016 |
| CN | 205559030 | U | 9/2016 |
| CN | 106321199 | A | 1/2017 |
| CN | 106377919 | A | 2/2017 |
| CN | 206144632 | U | 5/2017 |
| CN | 206144633 | U | 5/2017 |
| CN | 106968765 | A | 7/2017 |
| CN | 107435576 | A | 12/2017 |
| CN | 108194176 | A | 6/2018 |
| CN | 108252771 | A | 7/2018 |
| CN | 108708781 | A | 10/2018 |
| CN | 109477413 | A | 3/2019 |
| CN | 208982145 | U | 6/2019 |
| CN | 106014560 | B | 7/2019 |
| CN | 209179849 | U | 7/2019 |
| CN | 209586479 | U | 11/2019 |
| CN | 209855888 | U | 12/2019 |
| CN | 110761876 | A | 2/2020 |
| CN | 210195855 | U | 3/2020 |
| CN | 210686097 | U | 6/2020 |
| CN | 210858906 | U | 6/2020 |
| CN | 211082028 | U | 7/2020 |
| CN | 211116205 | U | 7/2020 |
| CN | 211573625 | U | 9/2020 |
| CN | 111810276 | A | 10/2020 |
| CN | 212130586 | U | 12/2020 |
| CN | 212130587 | U | 12/2020 |
| CN | 212296579 | U | 1/2021 |
| CN | 112483224 | A | 3/2021 |
| CN | 212744129 | U | 3/2021 |
| CN | 214304014 | U | 9/2021 |
| CN | 214836650 | U | 11/2021 |
| CN | 214887318 | U | 11/2021 |
| CN | 215109110 | U | 12/2021 |
| CN | 215719044 | U | 2/2022 |
| CN | 215719045 | U | 2/2022 |
| CN | 216157745 | U | 4/2022 |
| CN | 216617626 | U | 5/2022 |
| CN | 217872989 | U | 11/2022 |
| DE | 10021166 | A1 | 11/2001 |
| DE | 10131803 | A1 | 5/2003 |
| DE | 10312212 | A1 | 11/2003 |
| DE | 10 2004 043 931 | A1 | 3/2006 |
| DE | 10 2010 014 037 | A1 | 11/2010 |
| DE | 11 2009 000 650 | T5 | 1/2011 |
| DE | 11 2010 002 589 | T5 | 11/2012 |
| DE | 10 2014 101 889 | | 8/2015 |
| DE | 10 2014 102 798 | A1 | 9/2015 |
| DE | 10 2016 222 743 | A1 | 5/2017 |
| DE | 10 2016 115 030 | A1 | 2/2018 |
| DE | 10 2018 127 387 | A1 | 5/2019 |
| DE | 10 2007 051 510 | B4 | 2/2021 |

(56) References Cited

FOREIGN PATENT DOCUMENTS

| | | | |
|---|---|---|---|
| DE | 10 2020 121 659 | A1 | 3/2021 |
| EP | 0 716 918 | A2 | 6/1996 |
| EP | 1 716 917 | A1 | 11/2006 |
| EP | 2 769 762 | A1 | 8/2014 |
| EP | 2 551 482 | B1 | 1/2015 |
| EP | 2 546 488 | B1 | 4/2015 |
| EP | 2 551 481 | B1 | 8/2015 |
| EP | 3 085 913 | A1 | 10/2016 |
| EP | 3 085 915 | A1 | 10/2016 |
| EP | 3 085 916 | A1 | 10/2016 |
| EP | 2 570 178 | B1 | 4/2017 |
| EP | 2 522 822 | B1 | 6/2017 |
| EP | 2 796 684 | B1 | 1/2018 |
| EP | 3 425 180 | A1 | 1/2019 |
| EP | 3 699 407 | A1 | 8/2020 |
| EP | 3 775 514 | A1 | 2/2021 |
| FR | 2965011 | A1 | 3/2012 |
| FR | 3010134 | A1 | 3/2015 |
| FR | 2984953 | B1 | 4/2015 |
| FR | 2977913 | B1 | 6/2015 |
| FR | 3020835 | A1 | 11/2015 |
| FR | 3020834 | B1 | 6/2016 |
| FR | 3020835 | B1 | 6/2016 |
| FR | 3098854 | B1 | 7/2021 |
| FR | 3097775 | B1 | 5/2022 |
| FR | 3102683 | B1 | 6/2022 |
| FR | 3111664 | B1 | 7/2022 |
| FR | 3110634 | B1 | 9/2022 |
| GB | 2 385 545 | A | 8/2003 |
| GB | 2 558 311 | A | 7/2018 |
| IN | 201921025624 | A | 1/2021 |
| JP | 2003-056274 | | 2/2003 |
| JP | 2009-156077 | A | 7/2009 |
| JP | 2010-180863 | A | 8/2010 |
| JP | 2013-133774 | A | 7/2013 |
| WO | WO-2009/024815 | A2 | 2/2009 |
| WO | WO-2009/024815 | A3 | 2/2009 |
| WO | WO-2010/146285 | A1 | 12/2010 |
| WO | WO-2011/110885 | A1 | 9/2011 |
| WO | WO-2012/110720 | A1 | 8/2012 |
| WO | WO-2012/123660 | A1 | 9/2012 |
| WO | WO-2016/082850 | A1 | 6/2016 |
| WO | WO-2016/111701 | A1 | 7/2016 |
| WO | WO-2018/017164 | A1 | 1/2018 |
| WO | WO-2018/075061 | A1 | 4/2018 |
| WO | WO-2018/226626 | A1 | 12/2018 |
| WO | WO-2019/029880 | A1 | 2/2019 |
| WO | WO-2019/143373 | A1 | 7/2019 |
| WO | WO-2020/009713 | A1 | 1/2020 |
| WO | WO-2021/050819 | A1 | 3/2021 |
| WO | WO-2021/112826 | A1 | 6/2021 |
| WO | WO-2021/113246 | A1 | 6/2021 |
| WO | WO-2021/173357 | A1 | 9/2021 |
| WO | WO-2021/225824 | | 11/2021 |

OTHER PUBLICATIONS

International Search Report and Written Opinion issued in PCT Application No. PCT/US 2020/050318 on Dec. 8, 2020.
Non-Final Office Action issued in Design U.S. Appl. No. 29/835,755 on Oct. 4, 2023.
Non-Final Office Action issued in Design U.S. Appl. No. 29/835,777 on Oct. 4, 2023.
Office Action issued in Chinese Patent Application No. 202180064965-5 on Sep. 13, 2023.
Extended European Search Report in European Patent Application No. 19955166.4 dated Jul. 10, 2023.
Non-Final Office Action on U.S. Appl. No. 18/033,021 Dtd Jul. 18, 2023.
Coanda effect, https://en.wikipedia.org/w/index.php?title=Coand%C4%83_effect&oldid=1000333406 (last visited Mar. 12, 2021).
Combined Search and Examination Report in UK Patent Application No. GB2205057.9, issued May 5, 2022.
Examination Report for U.K. Patent Application No. 1413056.1 issued Sep. 21, 2017.
Examination Report in U.K. Patent Application No. 1805598.8 issued Apr. 24, 2018.
Examination Report in UK Patent Application No. GB2305850.6 issued May 26, 2023.
Examination Report in UK Patent Application No. GB 1917608.0 issued Sep. 6, 2021.
Final Office Action in U.S. Appl. No. 17/695,580 issued Feb. 6, 2023.
Final Office Action in U.S. Appl. No. 13/837,446 issued Jan. 5, 2015.
Office Action in Indian Patent Application No. 201947050068, issued Jan. 13, 2021.
Office Action in Indian Patent Application No. IN 202247030005, issued Jul. 13, 2022.
Office Action in Indian Patent Application No. IN 202147057999, issued Mar. 14, 2022.
Office Action in Chinese Patent Application No. CN 201880001223.6, issued Dec. 17, 2020.
Chinese Office Action in Chinese Patent Application No. CN 201880001223.6 issued Jul. 30, 2021.
Office Action in Indian Patent Application No. IN 201947050068 issued Jan. 13, 2021.
Office Action in German Patent Application No. DE 102014002750.3, issued Jan. 24, 2022.
G. Comes, "Theoretical Modeling, Design and Simulation of an Innovative Diverting Valve Based on Coanda Effect", Fluids 2018, 3, 103, (2018).
International Search Report and Written Opinion in PCT Application No. PCT/US2012/022582 issued Oct. 25, 2012.
International Search Report and Written Opinion in PCT Application No. PCT/US2020/062718 issued Feb. 19, 2021.
International Search Report and Written Opinion in PCT Application No. PCT/IB2019/054988 issued Jan. 29, 2020.
International Search Report and Written Opinion in PCT Application No. PCT/US2021/017551 issued Apr. 28, 2021.
International Search Report and Written Opinion in PCT Application No. PCT/US2022/014781 issued Apr. 25, 2022.
International Search Report and Written Opinion in PCT Application No. PCT/US2021/029282 issued Jul. 27, 2021.
International Search Report from corresponding PCT Application No. PCT/US2018/035959, issued Oct. 19, 2018.
Office Action in U.S. Appl. No. 15/657,941 issued Aug. 6, 2019.
Office Action in U.S. Appl. No. 16/618,716 issued Feb. 23, 2021.
Office Action in U.S. Appl. No. 17/400,567 issued May 23, 2022.
Office Action in U.S. Appl. No. 17/695,580 issued Jul. 27, 2022.
Office Action in U.S. Appl. No. 17/923,804 issued Mar. 16, 2023.
Office Action in U.S. Appl. No. 18/071,189 issued Jul. 10, 2023.
Written Opinion in PCT Application No. PCT/US2018/035959, issued Oct. 19, 2018.
Office Action in Chinese Patent Application No. 2021800162220 issued Mar. 17, 2023.
Office Action in Chinese Patent Application No. 202210283795.6, dated Mar. 20, 2023.
Office Action in German Patent Application No. DE 11 2012 005 741.4 issued Dec. 7, 2022.
Preliminary Office Action in BR1120190253246, issued Apr. 26, 2022.
Search and Examination Report in UK Patent Application No. GB2116026.2 issued Dec. 20, 2021.
Search Report and Written Opinion issued in PCT Application No. PCT/US2019/064232 issued Feb. 12, 2020.
Search Report in UK Patent Application No. GB 2101393.3, issued Feb. 22, 2022.
Search Report Letter in UK Patent Application No. GB 2101393.3, issued Feb. 22, 2021.
Office Action in U.S. Appl. No. 13/837,446, issued Aug. 29, 2014.
Office Action in U.S. Appl. No. 14/372,810, issued Mar. 8, 2017.
Office Action in U.S. Appl. No. 14/372,810, issued May 25, 2016.
Office Action in U.S. Appl. No. 16/618,716, issued Jan. 4, 2021.

* cited by examiner

EXHAUST GAS AFTERTREATMENT SYSTEM

CROSS-REFERENCE TO RELATED PATENT APPLICATION

This Application is a national phase of PCT Application No. PCT/US2022/014781, filed Feb. 1, 2022, which claims the benefit of U.S. Provisional Patent Application No. 63/144,689, filed Feb. 2, 2021. The contents of these applications are incorporated herein by reference.

TECHNICAL FIELD

The present disclosure relates generally to an exhaust gas aftertreatment system for an internal combustion engine.

BACKGROUND

For an internal combustion engine system, it may be desirable to treat exhaust gas produced by a combustion of fuel by an internal combustion engine. The exhaust gas can be treated using an aftertreatment system. One approach that can be implemented in an aftertreatment system is to dose the exhaust gas with a reductant and pass the exhaust gas and reductant through a catalyst member. It may desirable to cause the exhaust gas and the reductant to swirl upstream of the catalyst member so as to increase mixing of the exhaust gas and the reductant. However, this swirling may not be capable of independently facilitating desirable mixing the exhaust gas and the reductant in some applications.

SUMMARY

In one embodiment, an exhaust gas aftertreatment system includes an exhaust gas conduit a mixer, and a plurality of flow disrupters. The exhaust gas conduit is centered on a conduit center axis and includes an inner surface. The mixer includes a mixer body and an upstream vane plate. The upstream vane plate has a plurality of upstream vanes. At least one of the upstream vanes is coupled to the mixer body. The flow disrupters are disposed downstream of the mixer and circumferentially around the conduit center axis. Each of the flow disrupters is coupled to the exhaust gas conduit or integrally formed with the exhaust gas conduit. Each of the flow disrupters extends inwardly from the inner surface.

In another embodiment, an exhaust gas aftertreatment system includes an exhaust gas conduit, a mixer, a perforated plate, and a first flow disrupter. The exhaust gas conduit is centered on a conduit center axis. The mixer includes a mixer body and an upstream vane plate. The upstream vane plate has a plurality of upstream vanes. At least one of the upstream vanes is coupled to the mixer body. The perforated plate is coupled to the exhaust gas conduit and disposed downstream of the mixer. The perforated plate includes a plurality of perforations that are each configured to facilitate passage of exhaust gas through the perforated plate. The first flow disrupter is coupled to the perforated plate or integrally formed with the perforated plate. The first flow disrupter extends towards the conduit center axis.

In another embodiment, an exhaust gas aftertreatment system includes an exhaust gas conduit, a mixer, a perforated plate, and a flow disrupter. The exhaust gas conduit is centered on a conduit center axis and includes an inner surface. The mixer includes a mixer outlet disposed along a mixer outlet plane. The perforated plate is coupled to the exhaust gas conduit and disposed downstream of the mixer. The perforated plate includes a plurality of perforations that are each configured to facilitate passage of exhaust gas through the perforated plate. The flow disrupter is disposed downstream of the mixer and circumferentially around the conduit center axis. The flow disrupter extends inwardly from the inner surface. The flow disrupter is configured such that: $0.10*d_c \leq S_d \leq 0.30*d_c$, where $d_c$ is a conduit diameter of the exhaust gas conduit and $S_d$ is a flow disrupter separation along the conduit center axis between the flow disrupter and the mixer outlet plane, and $0.05*d_c \leq h_r \leq 0.30*d_c$, where $h_r$ is a height of the flow disrupter from the exhaust gas conduit to a center point of a downstream edge of the flow disrupter. The flow disrupter is: coupled to the exhaust gas conduit, integrally formed with the exhaust gas conduit, coupled to the perforated plate, or integrally formed with the perforated plate.

BRIEF DESCRIPTION OF THE DRAWINGS

The disclosure will become more fully understood from the following detailed description, taken in conjunction with the accompanying Figures, wherein like reference numerals refer to like elements unless otherwise indicated, in which.

It will be recognized that the Figures are schematic representations for purposes of illustration. The Figures are provided for the purpose of illustrating one or more implementations with the explicit understanding that the Figures will not be used to limit the scope or the meaning of the claims.

DETAILED DESCRIPTION

Following below are more detailed descriptions of various concepts related to, and implementations of, methods, apparatuses, and for providing a flow disrupter for an exhaust gas aftertreatment system of an internal combustion engine. The various concepts introduced above and discussed in greater detail below may be implemented in any of a number of ways, as the described concepts are not limited to any particular manner of implementation. Examples of specific implementations and applications are provided primarily for illustrative purposes.

I. Overview

In order to reduce emissions, it may be desirable to treat exhaust gas using an aftertreatment system that includes at least one aftertreatment component. This may be done using a treatment fluid. Treatment of the exhaust gas may be enhanced by increasing a uniformity of distribution of the treatment fluid in the exhaust gas.

Various devices may be used in order to increase the uniformity of distribution of the treatment fluid in the exhaust gas. For example, a device may be used to cause swirling of the exhaust gas. However, it may be possible to further increase the uniformity of distribution of the treatment fluid in the exhaust gas by providing a mechanism for disrupting flow after the swirling has been initiated.

Implementations herein are directed to an exhaust gas aftertreatment system that includes a flow disrupter which is located downstream of a mixer. After the mixer causes swirling of the exhaust gas and treatment fluid, the exhaust gas flows against the flow disrupter. The flow disrupter breaks up the swirling and causes tumbling of the exhaust gas. This tumbling provides a second mechanism for increasing the uniformity of distribution of the treatment fluid in the exhaust gas and enables the mixer to attain greater uniformity of distribution of the treatment fluid in the exhaust gas than in other systems without such a flow disrupter.

In some implementations described herein, the flow disrupter is coupled to or integrally formed with an exhaust gas conduit. For example, the flow disrupter may be attached to the exhaust gas conduit via welds. In other implements described herein, the flow disrupter is coupled to or integrally formed with a perforated plate. The perforated plate includes a plurality of perforations which function to straighten a flow of the exhaust gas after the exhaust gas has been tumbled by the flow disrupter. In these ways, the exhaust gas aftertreatment system described herein is capable of desirably treating exhaust gas than other systems without such flow disrupters.

II. Overview of First Example Exhaust Gas Aftertreatment Systems

Figure 1:
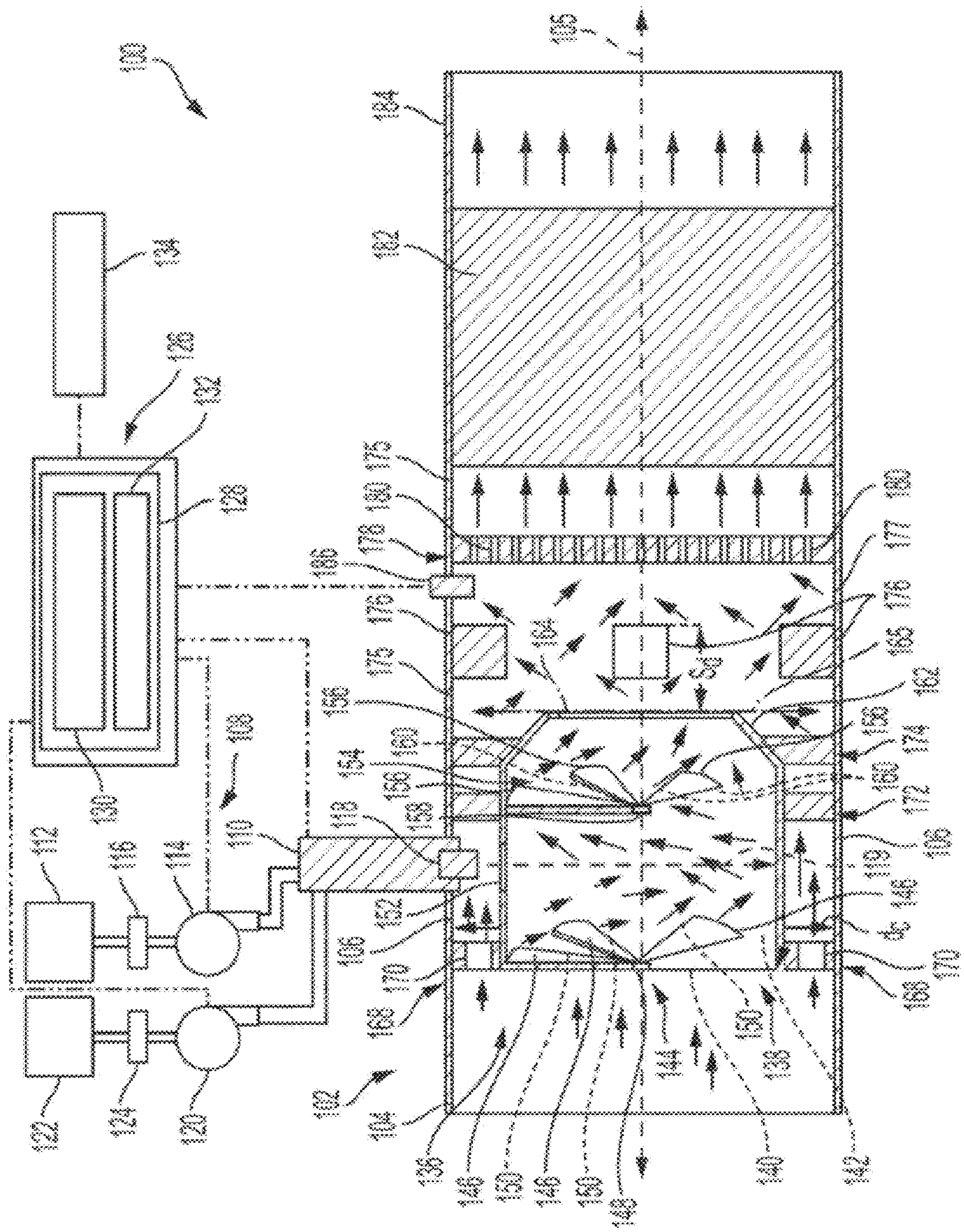
FIG. 1 is a schematic diagram of an example exhaust gas aftertreatment system including flow disrupters.

FIG. 1 depicts an exhaust gas aftertreatment system 100 (e.g., treatment system, etc.) for treating exhaust gas produced by an internal combustion engine (e.g., diesel internal combustion engine, gasoline internal combustion engine, hybrid internal combustion engine, propane internal combustion engine, dual-fuel internal combustion engine, etc.). As is explained in more detail herein, the exhaust gas aftertreatment system 100 is configured to facilitate treatment of the exhaust gas. This treatment may facilitate reduction of emission of undesirable components (e.g., nitrogen oxides ($NO_x$), etc.) in the exhaust gas. This treatment may also or instead facilitate conversion of various oxidation components (e.g., carbon monoxide (CO), hydrocarbons, etc.) of the exhaust gas into other components (e.g., carbon dioxide ($CO_2$), water vapor, etc.). This treatment may also or instead facilitate removal of particulates (e.g., soot, particulate matter, etc.) from the exhaust gas.

The exhaust gas aftertreatment system 100 includes an exhaust gas conduit system 102 (e.g., line system, pipe system, etc.). The exhaust gas conduit system 102 is configured to facilitate routing of the exhaust gas produced by the internal combustion engine throughout the exhaust gas aftertreatment system 100 and to atmosphere (e.g., ambient environment, etc.).

The exhaust gas conduit system 102 includes an inlet conduit 104 (e.g., line, pipe, etc.). The inlet conduit 104 is fluidly coupled to an upstream component (e.g., header on the internal combustion engine, exhaust manifold on the internal combustion engine, the internal combustion engine, etc.) and is configured to receive exhaust gas from the upstream component. In some embodiments, the inlet conduit 104 is coupled (e.g., attached, fixed, welded, fastened, riveted, adhesively attached, bonded, pinned, etc.) to the upstream component. In other embodiments, the inlet conduit 104 is integrally formed with the upstream component. The inlet conduit 104 is centered on a conduit center axis 105 (e.g., the conduit center axis 105 extends through a center point of the inlet conduit 104, etc.). As used herein, the term "axis" describes a theoretical line extending through the centroid (e.g., center of mass, etc.) of an object. The object is centered on this axis. The object is not necessarily cylindrical (e.g., a non-cylindrical shape may be centered on an axis, etc.).

The exhaust gas conduit system 102 also includes an introduction conduit 106 (e.g., decomposition housing, decomposition reactor, decomposition chamber, reactor pipe, decomposition tube, reactor tube, hydrocarbon introduction housing, etc.). The introduction conduit 106 is fluidly coupled to the inlet conduit 104 and is configured to receive exhaust gas from the inlet conduit 104. In various embodiments, the introduction conduit 106 is coupled to the inlet conduit 104. For example, the introduction conduit 106 may be fastened (e.g., using a band, using bolts, using twist-lock fasteners, threaded, etc.), welded, riveted, or otherwise attached to the inlet conduit 104. In other embodiments, the introduction conduit 106 is integrally formed with the inlet conduit 104. As utilized herein, the terms "fastened," "fastening," and the like describe attachment (e.g., joining, etc.) of two structures in such a way that detachment (e.g., separation, etc.) of the two structures remains possible while "fastened" or after the "fastening" is completed, without destroying or damaging either or both of the two structures. In some embodiments, the inlet conduit 104 is the introduction conduit 106 (e.g., only the inlet conduit 104 is included in the exhaust gas conduit system 102 and the inlet conduit 104 functions as both the inlet conduit 104 and the introduction conduit 106). The introduction conduit 106 is centered on the conduit center axis 105 (e.g., the conduit center axis 105 extends through a center point of the introduction conduit 106, etc.). The introduction conduit 106 has a conduit diameter $d_c$. The conduit diameter $d_c$ may be selected so as to tailor the exhaust gas aftertreatment system 100 for a target application.

The exhaust gas aftertreatment system 100 also includes a treatment fluid delivery system 108. As is explained in more detail herein, the treatment fluid delivery system 108 is configured to facilitate the introduction of a treatment fluid, such as a reductant (e.g., diesel exhaust fluid (DEF), Adblue®, a urea-water solution (UWS), an aqueous urea solution, AUS32, etc.) or a hydrocarbon (e.g., fuel, oil, additive, etc.), into the exhaust gas. When the reductant is introduced into the exhaust gas, reduction of emission of undesirable components in the exhaust gas may be facilitated. When the hydrocarbon is introduced into the exhaust gas, the temperature of the exhaust gas may be increased (e.g., to facilitate regeneration of components of the exhaust gas aftertreatment system 100, etc.). For example, the temperature of the exhaust gas may be increased by combusting the hydrocarbon within the exhaust gas (e.g., using a spark plug, etc.).

The treatment fluid delivery system 108 includes a dosing module 110 (e.g., doser, reductant doser, hydrocarbon doser, etc.). The dosing module 110 is configured to facilitate passage of the treatment fluid through the introduction conduit 106 and into the introduction conduit 106. The dosing module 110 may include an insulator interposed between a portion of the dosing module 110 and the portion of the introduction conduit 106 on which the dosing module 110 is mounted. In various embodiments, the dosing module 110 is coupled to the introduction conduit 106.

The treatment fluid delivery system 108 also includes a treatment fluid source 112 (e.g., reductant tank, hydrocarbon tank, etc.). The treatment fluid source 112 is configured to contain the treatment fluid. The treatment fluid source 112 is fluidly coupled to the dosing module 110 and configured to provide the treatment fluid to the dosing module 110. The treatment fluid source 112 may include multiple treatment fluid sources 112 (e.g., multiple tanks connected in series or in parallel, etc.). The treatment fluid source 112 may be, for example, a diesel exhaust fluid tank containing Adblue® or a fuel tank containing fuel.

The treatment fluid delivery system 108 also includes a treatment fluid pump 114 (e.g., supply unit, etc.). The treatment fluid pump 114 is fluidly coupled to the treatment fluid source 112 and the dosing module 110 and configured to receive the treatment fluid from the treatment fluid source 112 and to provide the treatment fluid to the dosing module 110. The treatment fluid pump 114 is used to pressurize the treatment fluid from the treatment fluid source 112 for delivery to the dosing module 110. In some embodiments, the treatment fluid pump 114 is pressure controlled. In some embodiments, the treatment fluid pump 114 is coupled to a chassis of a vehicle associated with the exhaust gas aftertreatment system 100.

In some embodiments, the treatment fluid delivery system 108 also includes a treatment fluid filter 116. The treatment fluid filter 116 is fluidly coupled to the treatment fluid source 112 and the treatment fluid pump 114 and is configured to receive the treatment fluid from the treatment fluid source 112 and to provide the treatment fluid to the treatment fluid pump 114. The treatment fluid filter 116 filters the treatment fluid prior to the treatment fluid being provided to internal components of the treatment fluid pump 114. For example, the treatment fluid filter 116 may inhibit or prevent the transmission of solids to the internal components of the treatment fluid pump 114. In this way, the treatment fluid filter 116 may facilitate prolonged desirable operation of the treatment fluid pump 114.

The dosing module 110 includes at least one injector 118 (e.g., insertion device, etc.). The injector 118 is fluidly coupled to the treatment fluid pump 114 and configured to receive the treatment fluid from the treatment fluid pump 114. The injector 118 is configured to dose (e.g., inject, insert, etc.) the treatment fluid received by the dosing module 110 into the exhaust gas within the introduction conduit 106 along an injection axis 119 (e.g., within a spray cone that is centered on the injection axis 119, etc.).

In some embodiments, the treatment fluid delivery system 108 also includes an air pump 120 and an air source 122 (e.g., air intake, etc.). The air pump 120 is fluidly coupled to the air source 122 and is configured to receive air from the air source 122. The air pump 120 is fluidly coupled to the dosing module 110 and is configured to provide the air to the dosing module 110. In some applications, the dosing module 110 is configured to mix the air and the treatment fluid into an air-treatment fluid mixture and to provide the air-treatment fluid mixture to the injector 118 (e.g., for dosing into the exhaust gas within the introduction conduit 106, etc.). The injector 118 is fluidly coupled to the air pump 120 and configured to receive the air from the air pump 120. The injector 118 is configured to dose the air-treatment fluid mixture into the exhaust gas within the introduction conduit 106. In some of these embodiments, the treatment fluid delivery system 108 also includes an air filter 124. The air filter 124 is fluidly coupled to the air source 122 and the air pump 120 and is configured to receive the air from the air source 122 and to provide the air to the air pump 120. The air filter 124 is configured to filter the air prior to the air being provided to the air pump 120. In other embodiments, the treatment fluid delivery system 108 does not include the air pump 120 and/or the treatment fluid delivery system 108 does not include the air source 122. In such embodiments, the dosing module 110 is not configured to mix the treatment fluid with the air.

In various embodiments, the dosing module 110 is configured to receive air and fluid, and doses the air-treatment fluid mixture into the introduction conduit 106. In various embodiments, the dosing module 110 is configured to receive treatment fluid (and does not receive air), and doses the treatment fluid into the introduction conduit 106. In various embodiments, the dosing module 110 is configured to receive treatment fluid, and doses the treatment fluid into the introduction conduit 106. In various embodiments, the dosing module 110 is configured to receive air and treatment fluid, and doses the air-treatment fluid mixture into the introduction conduit 106.

The exhaust gas aftertreatment system 100 also includes a controller 126 (e.g., control circuit, driver, etc.). The dosing module 110, the treatment fluid pump 114, and the air pump 120 are also electrically or communicatively coupled to the controller 126. The controller 126 is configured to control the dosing module 110 to dose the treatment fluid or the air-treatment fluid mixture into the introduction conduit 106. The controller 126 may also be configured to control the treatment fluid pump 114 and/or the air pump 120 in order to control the treatment fluid or the air-treatment fluid mixture that is dosed into the introduction conduit 106.

The controller 126 includes a processing circuit 128. The processing circuit 128 includes a processor 130 and a memory 132. The processor 130 may include a microprocessor, an application-specific integrated circuit (ASIC), a field-programmable gate array (FPGA), etc., or combinations thereof. The memory 132 may include, but is not limited to, electronic, optical, magnetic, or any other storage or transmission device capable of providing a processor, ASIC, FPGA, etc. with program instructions. This memory 132 may include a memory chip, Electrically Erasable Programmable Read-Only Memory (EEPROM), Erasable Programmable Read Only Memory (EPROM), flash memory, or any other suitable memory from which the controller 126 can read instructions. The instructions may include code from any suitable programming language. The memory 132 may include various modules that include instructions which are configured to be implemented by the processor 130.

In various embodiments, the controller 126 is configured to communicate with a central controller 134 (e.g., engine control unit (ECU), engine control module (ECM), etc.) of an internal combustion engine having the exhaust gas aftertreatment system 100. In some embodiments, the central controller 134 and the controller 126 are integrated into a single controller.

In some embodiments, the central controller 134 is communicable with a display device (e.g., screen, monitor, touch screen, heads up display (HUD), indicator light, etc.). The display device may be configured to change state in response to receiving information from the central controller 134. For example, the display device may be configured to change between a static state and an alarm state based on a communication from the central controller 134. By changing state, the display device may provide an indication to a user of a status of the treatment fluid delivery system 108.

The exhaust gas aftertreatment system 100 also includes a mixer 136 (e.g., a swirl generating device, etc.). At least a portion of the mixer 136 is positioned within the introduction conduit 106. In some embodiments, a first portion of the mixer 136 is positioned within the inlet conduit 104 and a second portion of the mixer 136 is positioned within the introduction conduit 106.

The mixer 136 receives the exhaust gas from the inlet conduit 104 (e.g., via the introduction conduit 106, etc.). The mixer 136 also receives the treatment fluid or the air-treatment fluid mixture received from the injector 118. The mixer 136 is configured to mix the treatment fluid or the air-treatment fluid mixture with the exhaust gas. The mixer 136 is also configured to facilitate swirling (e.g., rotation, etc.) of the exhaust gas and mixing (e.g., combination, etc.) of the exhaust gas and the treatment fluid or the air-treatment fluid mixture so as to disperse the treatment fluid within the exhaust gas downstream of the mixer 136 (e.g., to obtain an increased uniformity index, etc.). By dispersing the treatment fluid within the exhaust gas using the mixer 136, reduction of emission of undesirable components in the exhaust gas is enhanced and/or an ability of the exhaust gas aftertreatment system 100 to increase a temperature of the exhaust gas may be enhanced.

The mixer 136 includes a mixer body 138 (e.g., shell, frame, etc.). The mixer body 138 is supported within the inlet conduit 104 and/or the introduction conduit 106. In various embodiments, the mixer body 138 is centered on the conduit center axis 105 (e.g., the conduit center axis 105 extends through a center point of the mixer body 138, etc.). In other embodiments, the mixer body 138 is centered on an axis that is separated from the conduit center axis 105. For example, the mixer body 138 may be centered on an axis that is separated from and approximately (e.g., within 5% of, etc.) parallel to the conduit center axis 105. In another example, the mixer body 138 may be centered on an axis that intersects the conduit center axis 105 and is angled relative to the conduit center axis 105 (e.g., when viewed on a plane along which the axis and the conduit center axis 105 extend, etc.).

The mixer body 138 includes a mixer inlet 140 (e.g., inlet aperture, inlet opening, etc.). The mixer inlet 140 receives the exhaust gas (e.g., from the inlet conduit 104, etc.). The mixer body 138 defines (e.g., partially encloses, etc.) a mixer cavity 142 (e.g., void, etc.). The mixer cavity 142 receives the exhaust gas from the mixer inlet 140. As is explained in more detail herein, the exhaust gas is caused to swirl within the mixer body 138.

The mixer 136 also includes an upstream vane plate 144 (e.g., upstream mixing element, mixing plate, etc.). The upstream vane plate 144 is coupled to the mixer body 138 and is disposed within the mixer cavity 142. In some embodiments, the upstream vane plate 144 is coupled to the mixer body 138 proximate the mixer inlet 140.

The upstream vane plate 144 includes a plurality of upstream vanes 146 (e.g., plates, fins, etc.). Each of the upstream vanes 146 extends within the mixer cavity 142 so as to cause the exhaust gas to swirl within the mixer cavity 142 (e.g., downstream of the upstream vane plate 144, etc.). At least one of the upstream vanes 146 is coupled to the mixer body 138. For example, an edge of one of the upstream vanes 146 may be coupled to the mixer body 138 (e.g., using spot welds, etc.).

In various embodiments, each of the upstream vanes 146 is coupled to an upstream vane hub 148 (e.g., center post, etc.). For example, the upstream vanes 146 may be coupled to the upstream vane hub 148 such that the upstream vane plate 144 is rotationally symmetric about the upstream vane hub 148. In various embodiments, the upstream vane hub 148 is centered on the conduit center axis 105 (e.g., the conduit center axis 105 extends through a center point of the upstream vane hub 148, etc.).

The upstream vane plate 144 defines a plurality of upstream vane apertures 150 (e.g., windows, holes, etc.). Each of the upstream vane apertures 150 is located between two adjacent upstream vanes 146. For example, where the upstream vane plate 144 includes four upstream vanes 146, the upstream vane plate 144 includes four upstream vane apertures 150 (e.g., a first upstream vane aperture 150 between a first upstream vane 146 and a second upstream vane 146, a second upstream vane aperture 150 between the second upstream vane 146 and a third upstream vane 146, a third upstream vane aperture 150 between the third upstream vane 146 and a fourth upstream vane 146, and a fourth upstream vane aperture 150 between the fourth upstream vane 146 and the first upstream vane 146). In various embodiments, the upstream vane plate 144 includes the same number of upstream vanes 146 and upstream vane apertures 150.

The mixer body 138 also includes a treatment fluid inlet 152 (e.g., aperture, window, hole, etc.). The treatment fluid inlet 152 is aligned with the injector 118 and the mixer body 138 is configured to receive the treatment fluid or the air-treatment fluid mixture through the treatment fluid inlet 152. The treatment fluid inlet 152 is disposed downstream of the upstream vane plate 144. As a result, the treatment fluid or the air-treatment fluid mixture flows from the injector 118, between the mixer body 138 and the introduction conduit 106, through the mixer body 138 via the treatment fluid inlet 152, and into the mixer cavity 142 (e.g., downstream of the upstream vane plate 144, etc.). The injection axis 119 extends through the treatment fluid inlet 152.

The mixer 136 also includes a downstream vane plate 154 (e.g., downstream mixing element, mixing plate, etc.). The downstream vane plate 154 is coupled to the mixer body 138 and is disposed within the mixer cavity 142. In various embodiments, the downstream vane plate 154 is coupled to the mixer body 138 downstream of the treatment fluid inlet

152 such that the treatment fluid inlet 152 is located between the upstream vane plate 144 and the downstream vane plate 154.

The downstream vane plate 154 includes a plurality of downstream vanes 156 (e.g., plates, fins, etc.). Each of the downstream vanes 156 extends within the mixer cavity 142 so as to cause the exhaust gas to swirl within the mixer cavity 142 (e.g., downstream of the downstream vane plate 154, etc.). At least one of the downstream vanes 156 is coupled to the mixer body 138. For example, an edge of one of the downstream vanes 156 may be coupled to the mixer body 138 (e.g., using spot welds, etc.).

The downstream vane plate 154 may include more, less, or the same number of downstream vanes 156 as the upstream vane plate 144 includes the upstream vanes 146. For example, where the upstream vane plate 144 includes five upstream vanes 146, the downstream vane plate 154 may include three, four, five, six, or other numbers of the downstream vanes 156.

In various embodiments, each of the downstream vanes 156 is coupled to an downstream vane hub 158 (e.g., center post, etc.). For example, the downstream vanes 156 may be coupled to the downstream vane hub 158 such that the downstream vane plate 154 is rotationally symmetric about the downstream vane hub 158. In various embodiments, the downstream vane hub 158 is centered on the conduit center axis 105 (e.g., the conduit center axis 105 extends through a center point of the downstream vane hub 158, etc.). In some embodiments, the downstream vane hub 158 is centered on an axis that is different from an axis that the upstream vane hub 148 is centered on. For example, the downstream vane hub 158 may be centered on an axis that is approximately parallel to and separated from an axis that the upstream vane hub 148 is centered on.

The downstream vane plate 154 defines a plurality of downstream vane apertures 160 (e.g., windows, holes, etc.). Each of the downstream vane apertures 160 is located between two adjacent downstream vanes 156. For example, where the downstream vane plate 154 includes four downstream vanes 156, the downstream vane plate 154 includes four downstream vane apertures 160 (e.g., a first downstream vane aperture 160 between a first downstream vane 156 and a second downstream vane 156, a second downstream vane aperture 160 between the second downstream vane 156 and a third downstream vane 156, a third downstream vane aperture 160 between the third downstream vane 156 and a fourth downstream vane 156, and a fourth downstream vane aperture 160 between the fourth downstream vane 156 and the first downstream vane 156). In various embodiments, the downstream vane plate 154 includes the same number of downstream vanes 156 and downstream vane apertures 160.

The mixer 136 also includes a shroud 162 (e.g., cover, etc.). The shroud 162 is contiguous with the mixer body 138 and extends from the mixer body 138 towards the conduit center axis 105. The shroud 162 functions to funnel (e.g., concentrate, direct, etc.) the exhaust gas towards the conduit center axis 105.

The shroud 162 includes a mixer outlet 164 (e.g., outlet aperture, outlet opening, etc.). The mixer outlet 164 provides the exhaust gas out of the shroud 162, and therefore out of the mixer body 138. Due to the upstream vane plate 144 and the downstream vane plate 154, the exhaust gas exiting the mixer outlet 164 swirls.

The mixer outlet 164 is disposed along a mixer outlet plane 165. The conduit center axis 105 extends through the mixer outlet plane 165. In various embodiments, the conduit center axis 105 is orthogonal to the mixer outlet plane 165.

The exhaust gas aftertreatment system 100 also includes an upstream flange 168 (e.g., panel, coupler, ring, etc.). The upstream flange 168 is coupled to the mixer body 138 proximate the mixer inlet 140. The upstream flange 168 is also coupled to the introduction conduit 106. The upstream flange 168 functions to separate the mixer body 138 from the introduction conduit 106 and support the mixer 136 within the introduction conduit 106.

In various embodiments, the upstream flange 168 includes a plurality of upstream flange apertures 170 (e.g., windows, holes, etc.). Each of the upstream flange apertures 170 is configured to facilitate passage of the exhaust gas through the upstream flange 168. As a result, the exhaust gas may flow between the mixer body 138 and the introduction conduit 106.

At least a portion of the exhaust gas flowing between the mixer body 138 and the introduction conduit 106 enters the mixer body 138 via the treatment fluid inlet 152. For example, the exhaust gas flowing through the mixer body 138 may create a vacuum at the treatment fluid inlet 152 and this vacuum may draw the exhaust gas flowing between the mixer body 138 and the introduction conduit 106 into the mixer body 138 via the treatment fluid inlet 152. The exhaust gas entering the mixer body via the treatment fluid inlet 152 may assist in propelling the treatment fluid and/or the air-treatment fluid mixture provided by the injector 118 into the mixer cavity 142 (e.g., between the upstream vane plate 144 and the downstream vane plate 154, etc.).

The exhaust gas aftertreatment system 100 also includes a midstream flange 172 (e.g., panel, coupler, ring, etc.). The midstream flange 172 is coupled to the mixer body 138 downstream of the treatment fluid inlet 152. The midstream flange 172 is also coupled to the introduction conduit 106. The midstream flange 172 functions to separate the mixer body 138 from the introduction conduit 106 and support the mixer 136 within the introduction conduit 106.

In various embodiments, the midstream flange 172 is configured to prevent flow of the exhaust gas and the treatment fluid and/or the air-treatment fluid mixture between the mixer body 138 and the introduction conduit 106 (e.g., less than 1% of the exhaust gas and the treatment fluid and/or the air-treatment fluid mixture flowing between the mixer body 138 and the introduction conduit 106 flows between the midstream flange 172 and the mixer body 138 and between the midstream flange 172 and the introduction conduit 106, etc.). In this way, the midstream flange 172 functions to direct the exhaust gas and the treatment fluid and/or the air-treatment fluid mixture flowing between the mixer body 138 and the introduction conduit 106 into the mixer body 138 via the treatment fluid inlet 152 (e.g., rather than facilitating bypassing of the mixer body 138 using apertures formed in the midstream flange 172, etc.).

In some embodiments, the midstream flange 172 includes apertures that are analogous to the upstream flange apertures 170. In these embodiments, these apertures are configured to facilitate flow of the exhaust gas and the treatment fluid and/or the air-treatment fluid mixture through the midstream flange 172.

The exhaust gas aftertreatment system 100 also includes a downstream flange 174 (e.g., panel, coupler, ring, etc.). The downstream flange 174 is coupled to the shroud 162. The downstream flange 174 is also coupled to the introduction conduit 106. The downstream flange 174 functions to separate the shroud 162 from the introduction conduit 106 and support the mixer 136 within the introduction conduit 106.

In various embodiments, the downstream flange 174 is configured to prevent (e.g., less than 1% of the exhaust gas and the treatment fluid and/or the air-treatment fluid mixture flowing between the mixer body 138 and the introduction conduit 106 flows between the downstream flange 174 and the mixer body 138 and between the downstream flange 174 and the introduction conduit 106, etc.) flow of the exhaust gas and the treatment fluid and/or the air-treatment fluid mixture between the shroud 162 and the introduction conduit 106. In this way, the downstream flange 174 functions to prevent flow of the exhaust gas and the treatment fluid and/or the air-treatment fluid mixture exiting the mixer outlet 164 from flowing back upstream towards the mixer inlet 140.

The exhaust gas conduit system 102 also includes a transfer conduit 175. The transfer conduit 175 is fluidly coupled to the introduction conduit 106 and is configured to receive the exhaust gas from the introduction conduit 106. In various embodiments, the transfer conduit 175 is coupled to the introduction conduit 106. For example, the transfer conduit 175 may be fastened (e.g., using a band, using bolts, using twist-lock fasteners, threaded, etc.), welded, riveted, or otherwise attached to the introduction conduit 106. In other embodiments, the transfer conduit 175 is integrally formed with the introduction conduit 106. In some embodiments, the introduction conduit 106 is the transfer conduit 175 (e.g., only the introduction conduit 106 is included in the exhaust gas conduit system 102 and the introduction conduit 106 functions as both the introduction conduit 106 and the transfer conduit 175). The transfer conduit 175 is centered on the conduit center axis 105 (e.g., the conduit center axis 105 extends through a center point of the transfer conduit 175, etc.).

The exhaust gas aftertreatment system 100 also includes one or more flow disrupters 176 (e.g., flow disrupters, protrusions, projections, protuberances, ribs, fins, guides, etc.). Each of the flow disrupters 176 is coupled to or integrally formed with the transfer conduit 175. For example, the flow disrupters 176 may be welded or fastened to the transfer conduit 175. In another example, the flow disrupters 176 are formed in the transfer conduit 175 via a bending process which bends portions of the transfer conduit 175 towards the conduit center axis 105.

Each of the flow disrupters 176 extends (e.g., protrudes, projects, etc.) inwardly from an inner surface 177 (e.g., face, etc.) of the transfer conduit 175. As a result, the exhaust gas flowing within the transfer conduit 175 is caused to flow around the flow disrupters 176. By flowing around the flow disrupters 176, the swirl of the exhaust gas that is provided by the mixer 136 is disrupted (e.g., broken up, etc.). This disruption causes the exhaust gas to tumble (e.g., mix, etc.) downstream of the flow disrupters 176. In addition to the swirl provided by the mixer 136, this tumbling provides another mechanism for mixing of the exhaust gas and the treatment fluid and/or the air-treatment fluid mixture. By variously configuring the flow disrupters 176, a target mixing of the exhaust gas and the treatment fluid and/or the air-treatment fluid mixture can be achieved.

As a result, the flow disrupters 176 are capable of increasing a uniformity index (UI) of the treatment fluid in the exhaust gas without substantially increasing a pressure drop produced by the mixer 136, a wall-film of the mixer 136, or deposits formed by the mixer 136, compared to other mixing devices. Additionally, the configuration of the flow disrupters 176 may be selected so as to minimize manufacturing requirements and decrease weight of the mixer 136 and low frequency modes when compared to other mixer devices. Furthermore, the mixer 136 may be variously configured while utilizing the flow disrupters 176 (e.g., the flow disrupters 176 do not substantially limit a configuration of the mixer 136, etc.). For example, the flow disrupters 176 may enable various sizing of the upstream flange apertures 170 so as to enable further reduction in pressure drop.

Furthermore, a downstream edge of each of the flow disrupters 176 is separated from the mixer outlet plane 165 by a flow disrupter separation $S_d$. The flow disrupter separation $S_d$ for each of the flow disrupters 176 may be independently selected such that the exhaust gas aftertreatment system 100 is tailored for a target application.

The flow disrupter separations $S_d$ may be selected based on the conduit diameter $d_c$. For example, the flow disrupters 176 may be configured such that the flow disrupter separations $S_d$ are each approximately equal to between $0.10d_c$ and $0.30d_c$, inclusive (e.g., $0.095d_c$, $0.10d_c$, $0.13d_c$, $0.15d_c$, $0.20d_c$, $0.25d_c$, $0.30d_c$, $0.315d_c$, etc.). In some applications, the flow disrupters 176 may be configured such that the flow disrupter separations $S_d$ are each approximately equal to between $0.13d_c$ and $0.25d_c$, inclusive (e.g., $0.1235d_c$, $0.13d_c$, $0.15d_c$, $0.20d_c$, $0.25d_c$, $0.2625d_c$, etc.).

In some applications, such as is shown in FIG. 1, the flow disrupter separations $S_d$ for all of the flow disrupters 176 are equal. In other embodiments, the flow disrupter separation $S_d$ for each of the flow disrupters 176 is different from the flow disrupter separations $S_d$ for the others of the flow disrupters 176. For example, four of the flow disrupters 176 may be staggered along the transfer conduit 175 by the first flow disrupter 176 having a first flow disrupter separation $S_{d1}$, the second flow disrupter 176 having a second flow disrupter separation $1.05S_{d1}$, the third flow disrupter 176 having a third flow disrupter separation $1.1S_{d1}$, and the fourth flow disrupter 176 having a fourth flow disrupter separation $1.15S_{d1}$.

Additionally, a center point (e.g., apex, etc.) of each of the flow disrupters 176 may be angularly separated from the injection axis 119 by an angular separation $\alpha_s$ when measured along a plane that is orthogonal to the conduit center axis 105. This plane may be approximately parallel to the mixer outlet plane 165 and/or a plane along which the injection axis 119 is disposed. The angular separation $\alpha_s$ for each of the flow disrupters 176 may be selected independent of the angular separation $\alpha_s$ for others of the flow disrupters 176 such that the exhaust gas aftertreatment system 100 is tailored for a target application. In various embodiments, the angular separation $\alpha_s$ for each of the flow disrupters 176 is approximately equal to between 0 degrees (°) and 270°, inclusive (e.g., 0°, 45°, 55°, 65°, 75°, 90°, 120°, 150°, 180°, 220°, 270°, 283.5°, etc.).

The exhaust gas aftertreatment system 100 also includes a perforated plate 178 (e.g., straightening plate, flow straightener, etc.). The perforated plate 178 is coupled to the transfer conduit 175 downstream of each of the flow disrupters 176. The perforated plate 178 extends across the transfer conduit 175. In various embodiments, the perforated plate 178 extends along a plane that is approximately parallel to a plane that the upstream flange 168 extends along, a plane that the midstream flange 172 extends along, and/or a plane that the downstream flange 174 extends along.

The perforated plate 178 includes a plurality of perforations 180 (e.g., holes, apertures, windows, etc.). Each of the perforations 180 facilitates passage of the exhaust gas and the treatment fluid and/or the air-treatment fluid mixture through the perforated plate 178. The perforated plate 178 is configured such that flow of the exhaust gas and the treatment fluid and/or the air-treatment fluid mixture between the perforated plate 178 and the transfer conduit 175 is substantially prevented (e.g., less than 1% of the exhaust gas and the treatment fluid and/or the air-treatment fluid mixture flows between the perforated plate 178 and the transfer conduit 175, etc.).

The perforations 180 function to straighten flow of the exhaust gas and the treatment fluid and/or the air-treatment fluid mixture downstream of the perforated plate 178. For example, the exhaust gas and the treatment fluid and/or the air-treatment fluid mixture may be tumbling upstream of the perforated plate 178 (e.g., due to the flow disrupters 176, etc.), may flow through the perforated plate 178 via the perforations 180, and then may flow along relatively straight flow paths downstream of the perforated plate 178.

The perforated plate 178 may be variously configured so as to be tailored for a target application. For example, a number of the perforations 180, locations of each of the perforations 180, and/or sizes (e.g., diameters, etc.) of each of the perforations 180 may be individually selected such that the perforated plate 178 is tailored for a target application. By variously locating the perforations 180, the exhaust gas and the treatment fluid and/or the air-treatment fluid mixture can be directed to target locations downstream of the perforated plate 178 because of the straight flow paths.

The exhaust gas aftertreatment system 100 also includes a catalyst member 182 (e.g., conversion catalyst member, selective catalytic reduction (SCR) catalyst member, catalyst metals, etc.). The catalyst member 182 is coupled to the transfer conduit 175. For example, the catalyst member 182 may be disposed within a shell (e.g., housing, sleeve, etc.) which is press-fit within the transfer conduit 175.

In various embodiments, the catalyst member 182 is configured to cause decomposition of components of the exhaust gas using reductant (e.g., via catalytic reactions, etc.). In these embodiments, the treatment fluid provided by the dosing module 110 is reductant. Specifically, the reductant that has been provided into the exhaust gas by the injector 118 undergoes the processes of evaporation, thermolysis, and hydrolysis to form non-$NO_x$ emissions within the transfer conduit 175 and/or the catalyst member 182. In this way, the catalyst member 182 is configured to assist in the reduction of $NO_x$ emissions by accelerating a $NO_x$ reduction process between the reductant and the $NO_x$ of the exhaust gas into diatomic nitrogen, water, and/or carbon dioxide. The catalyst member 182 may include, for example, platinum, rhodium, palladium, or other similar materials. In some embodiments, the catalyst member 182 is a ceramic conversion catalyst member.

In various embodiments, the catalyst member 182 is configured to oxidize a hydrocarbon and/or carbon monoxide in the exhaust gas and the treatment fluid and/or the air-treatment fluid mixture. In these embodiments, the catalyst member 182 includes an oxidation catalyst member (e.g., a diesel oxidation catalyst (DOC), etc.). For example, the catalyst member 182 may be an oxidation catalyst member that is configured to facilitate conversion of carbon monoxide in the exhaust gas and the treatment fluid and/or the air-treatment fluid mixture into carbon dioxide.

In various embodiments, the catalyst member 182 may include multiple portions. For example, the catalyst member 182 may include a first portion that includes platinum and a second portion that includes rhodium. By including multiple portions, an ability of the catalyst member 182 to facilitate treatment of the exhaust gas may be tailored for a target application.

The exhaust gas conduit system 102 also includes an outlet conduit 184. The outlet conduit 184 is fluidly coupled to the transfer conduit 175 and is configured to receive the exhaust gas from the transfer conduit 175. In various embodiments, the outlet conduit 184 is coupled to the transfer conduit 175. For example, the outlet conduit 184 may be fastened (e.g., using a band, using bolts, using twist-lock fasteners, threaded, etc.), welded, riveted, or otherwise attached to the transfer conduit 175. In other embodiments, the outlet conduit 184 is integrally formed with the transfer conduit 175. In some embodiments, the transfer conduit 175 is the outlet conduit 184 (e.g., only the transfer conduit 175 is included in the exhaust gas conduit system 102 and the transfer conduit 175 functions as both the transfer conduit 175 and the outlet conduit 184). The outlet conduit 184 is centered on the conduit center axis 105 (e.g., the conduit center axis 105 extends through a center point of the outlet conduit 184, etc.).

In various embodiments, the exhaust gas conduit system 102 only includes a single conduit which functions as the inlet conduit 104, the introduction conduit 106, the transfer conduit 175, and the outlet conduit 184.

In various embodiments, the exhaust gas aftertreatment system 100 also includes a sensor 186 (e.g., sensing unit, detector, flow rate sensor, mass flow rate sensor, volumetric flow rate sensor, velocity sensor, pressure sensor, temperature sensor, thermocouple, hydrocarbon sensor, $NO_x$ sensor, CO sensor, $CO_2$ sensor, $O_2$ sensor, particulate sensor, nitrogen sensor, etc.). The sensor 186 is coupled to the transfer conduit 175 and is configured to measure (e.g., sense, detect, etc.) a parameter (e.g., flow rate, mass flow rate, volumetric flow rate, velocity, pressure, temperature, hydrocarbon concentration, $NO_x$ concentration, CO concentration, $CO_2$ concentration, $O_2$ concentration, particulate concentration, nitrogen concentration, etc.) of the exhaust gas and the treatment fluid and/or the air-treatment fluid mixture within the transfer conduit 175. The sensor 186 is electrically or communicatively coupled to the controller 126 and is configured to provide a signal associated with the parameter to the controller 126. The controller 126 (e.g., via the processing circuit 128, etc.) is configured to determine the parameter based on the signal. The controller 126 may be configured to control the dosing module 110, the treatment fluid pump 114, and/or the air pump 120 based on the signal. Furthermore, the controller 126 may be configured to communicate the signal to the central controller 134.

Figure 2:
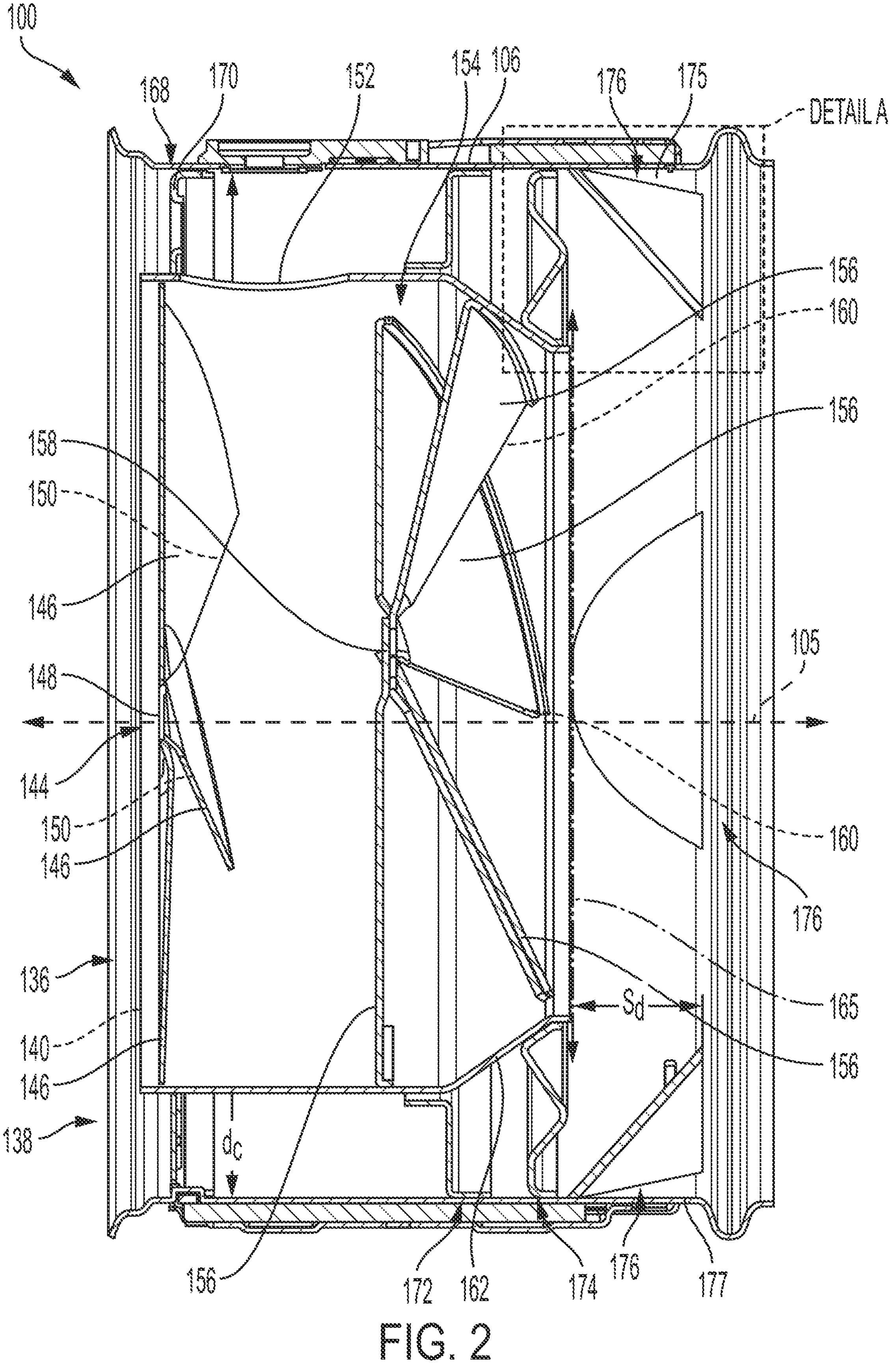
FIG. 2 is a cross-sectional view of a portion of an example exhaust gas aftertreatment system including flow disrupters.
Figure 3:
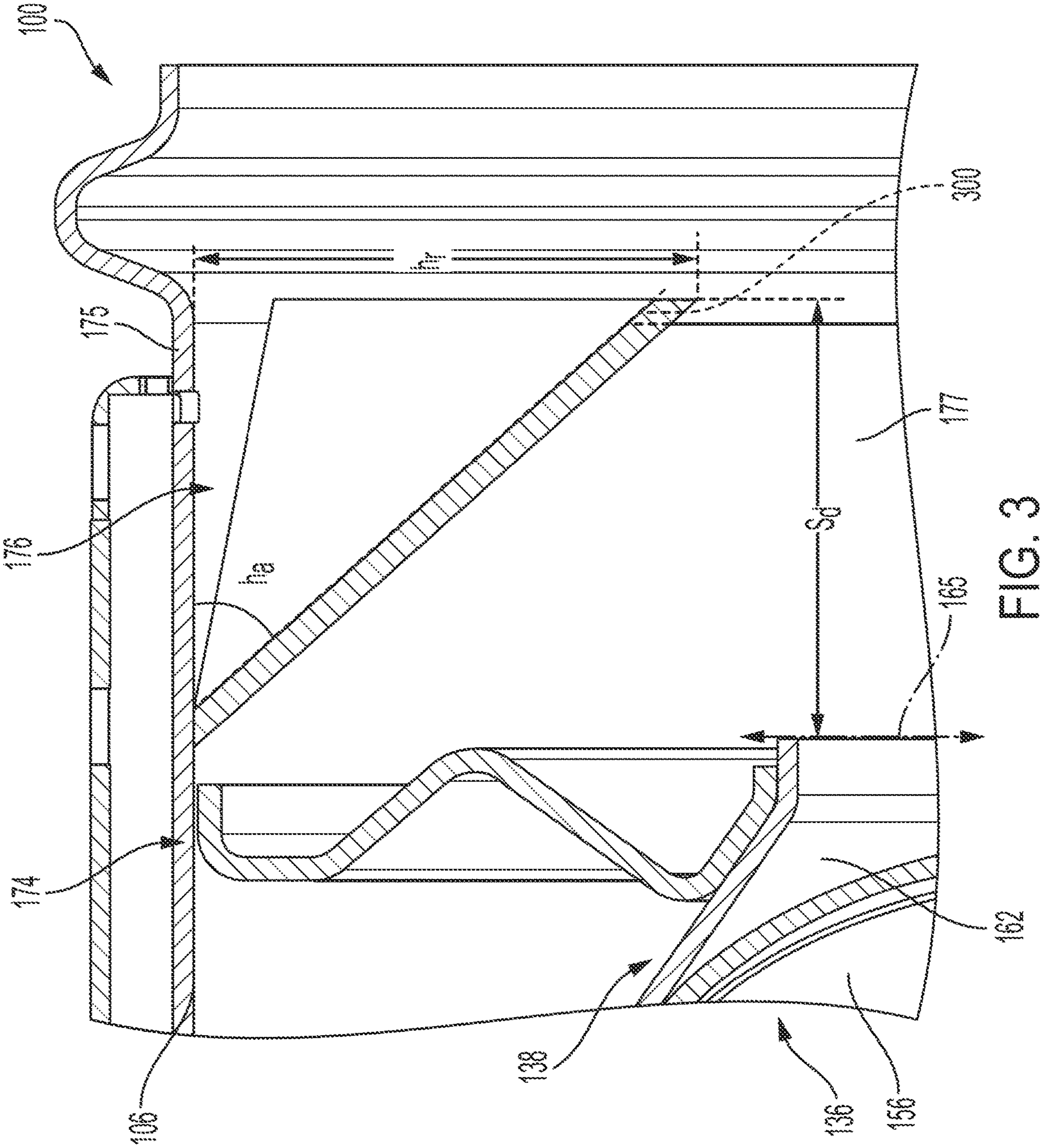
FIG. 3 is detailed view of Detail A in FIG. 2.
Figure 4:
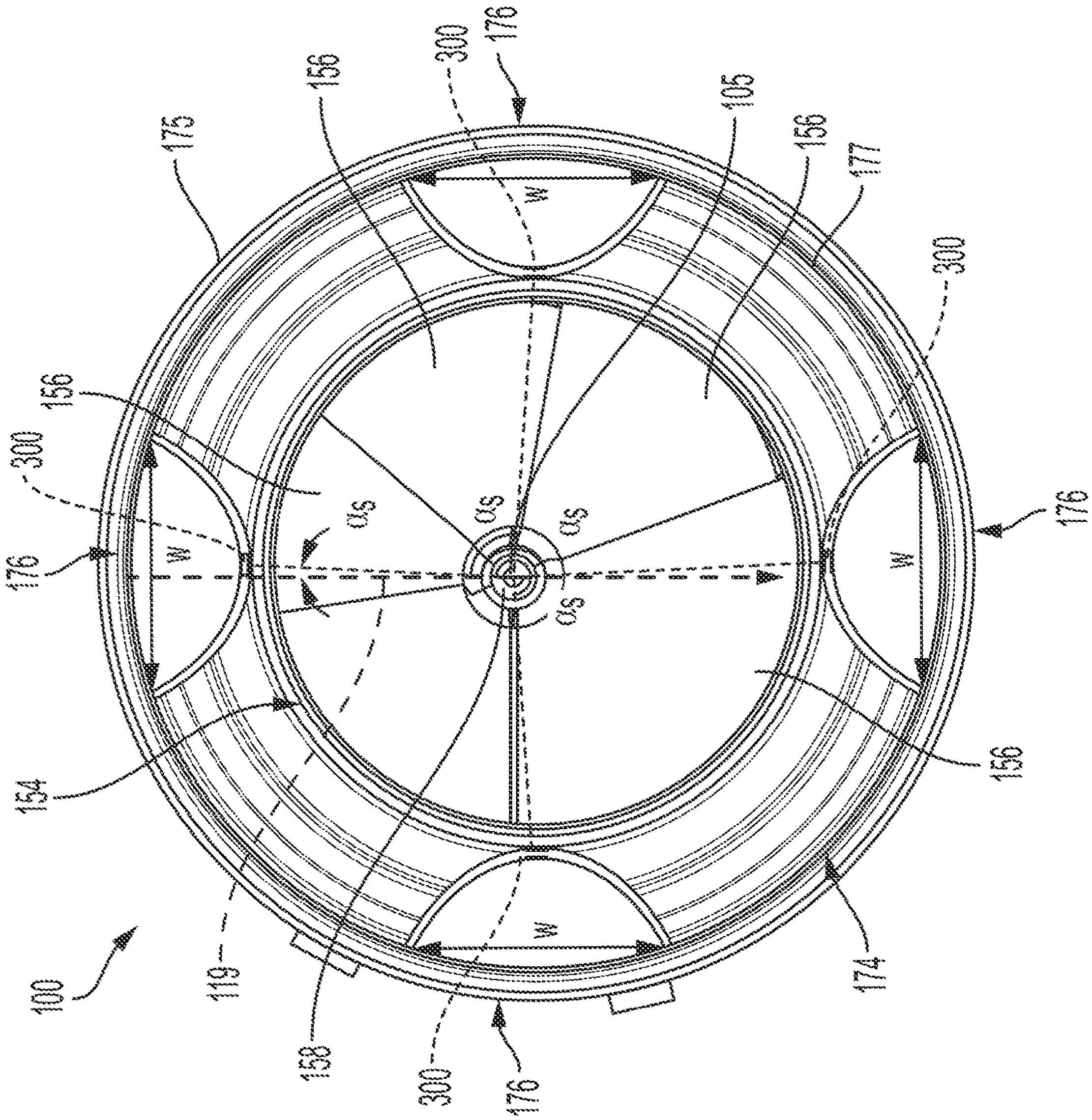
FIG. 4 is a rear view of the portion of the example exhaust gas aftertreatment system shown in FIG. 2.
Figure 5:
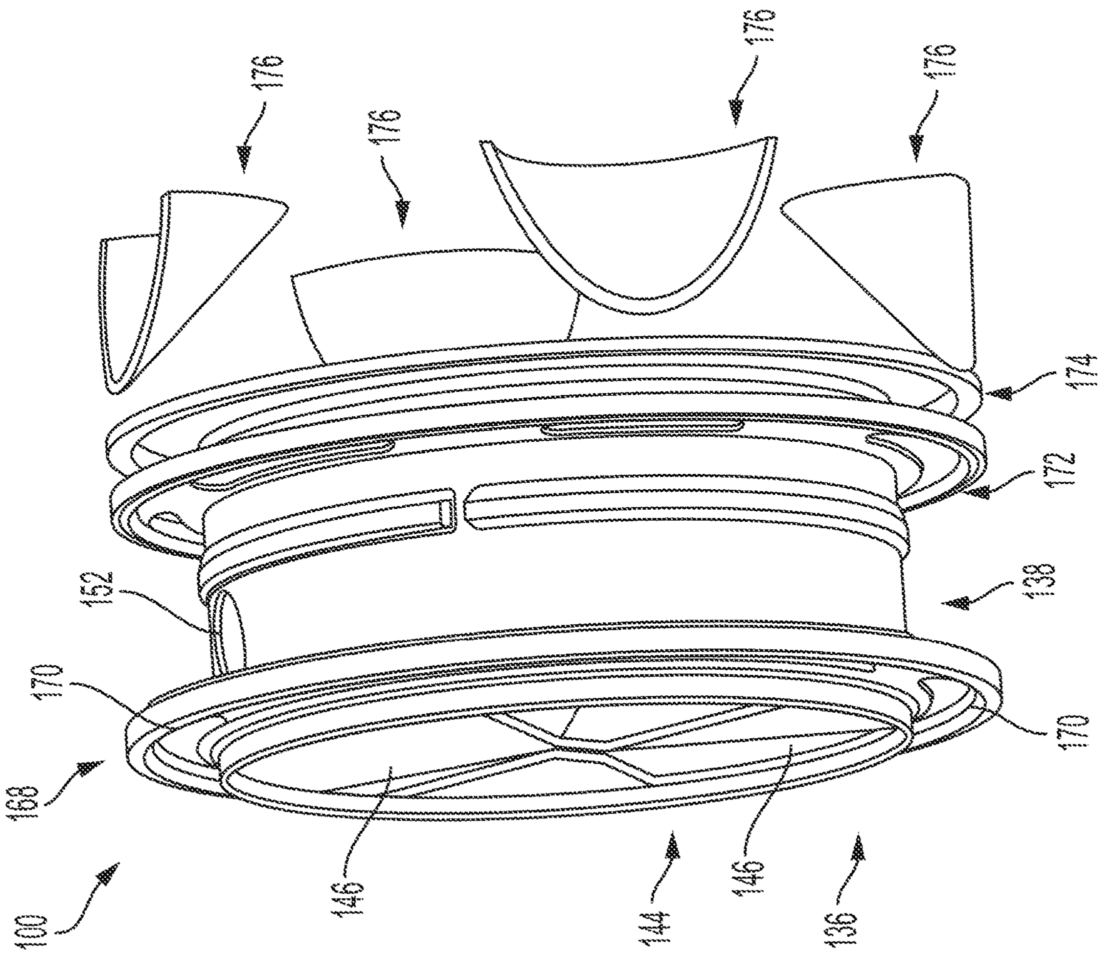
FIG. 5 is a perspective view of a portion of an example exhaust gas aftertreatment system including flow disrupters.

FIGS. 2-4 illustrate the exhaust gas aftertreatment system 100 according to various embodiments. In these embodiments, the flow disrupters 176 are each shaped as a portion of a semi-dome (e.g., quadric surface, apse, conch, scallop, etc.). Each of the flow disrupters 176 is configured such that an upstream edge is coupled to or in contact with the transfer conduit 175, the flow disrupter 176 gradually extends away from the transfer conduit 175 (e.g., towards the conduit center axis 105, etc.), and at least a portion of a downstream edge is separated from the transfer conduit 175. As a result, exhaust gas flowing along the flow disrupters 176 is gradually directed away from the transfer conduit 175 (e.g., towards the conduit center axis 105, etc.).

As shown in FIG. 3, the downstream edge of each of the flow disrupters 176 has a center point 300 (e.g., apex, etc.). The flow disrupter separation $S_d$ is measured from the mixer outlet plane 165 to the center point 300. Additionally, the angular separation $\alpha_s$ for each of the flow disrupters 176 is measured from the center point 300 of each of the flow disrupters 176, as shown in FIG. 4. For example, as shown in FIG. 4, four of the flow disrupters 176 are included, the first flow disrupter 176 having a first angular separation αs (e.g., 5°, etc.), a second flow disrupter 176 having a second angular separation αs (e.g., 50°, etc.), a third flow disrupter 176 having a third angular separation αs (e.g., 187°, etc.), and a fourth flow disrupter 176 having a fourth angular separation αs (e.g., 275°, etc.).

Furthermore, each of the flow disrupters 176 shown in FIGS. 2-4 is also defined by a radial height $h_r$. The radial height $h_r$ is measured from each center point 300 to the transfer conduit 175 along an axis that is orthogonal to the conduit center axis 105, and intersects the conduit center axis 105, the center point 300, and the transfer conduit 175.

The radial height $h_r$ influences how far each of the flow disrupters 176 projects into the transfer conduit 175, and therefore how much each of the flow disrupters 176 impacts the exhaust gas and the treatment fluid and/or the air-treatment fluid mixture. For example, the greater the radial height $h_r$, the more disruption that the flow disrupter 176 causes to the exhaust gas and the treatment fluid and/or the air-treatment fluid mixture. The radial height $h_r$ for each of the flow disrupters 176 may be independently selected such that the exhaust gas aftertreatment system 100 is tailored for a target application. In this way, for example, an ability of each of the flow disrupter 176 to cause mixing of the exhaust gas and the treatment fluid and/or the air-treatment fluid mixture may be selected so as to tailor the exhaust gas aftertreatment system 100 for a target application.

The radial heights $h_r$ may be selected based on the conduit diameter $d_c$. For example, the flow disrupters 176 may be configured such that the radial heights $h_r$ are each approximately equal to between $0.05d_c$ and $0.30d_c$, inclusive (e.g., $0.0475d_c$, $0.05d_c$, $0.08d_c$, $0.12d_c$, $0.15d_c$, $0.20d_c$, $0.25d_c$, $0.30d_c$, $0.315d_c$, etc.). In some applications, the flow disrupters 176 may be configured such that the radial heights $h_r$ are each approximately equal to between $0.08d_c$ and $0.25d_c$, inclusive (e.g., $0.076d_c$, $0.08d_c$, $0.15d_c$, $0.20d_c$, $0.25d_c$, $0.2625d_c$, etc.).

In some applications, such as is shown in FIGS. 2-4, the radial heights $h_r$ for all of the flow disrupters 176 are equal. In other embodiments, the radial height $h_r$ for each of the flow disrupters 176 is different from the radial heights $h_r$ for the others of the flow disrupters 176. For example, where four of the flow disrupters 176 are included, the first flow disrupter 176 may have a first radial height $h_{r1}$, the second flow disrupter 176 may have a second radial height $1.05h_{r1}$, the third flow disrupter 176 may have a third radial height $1.1h_{r1}$, and the fourth flow disrupter 176 may have a fourth radial height $1.15h_{r1}$.

Each of the flow disrupters 176 shown in FIGS. 2-4 is also defined by an angular height $h_a$. The angular height $h_a$ is measured from each center point 300 to the transfer conduit 175 along an axis that extends along at least a portion of the flow disrupter 176 and intersects the conduit center axis 105, the center point 300, and the transfer conduit 175.

The angular height $h_a$ influences how gradual the flow disrupters 176 transitions from the transfer conduit 175 to the center point 300, and therefore how much each of the flow disrupters 176 impacts the exhaust gas and the treatment fluid and/or the air-treatment fluid mixture. For example, the lower the angular height $h_a$, the more intense the transition (e.g., the greater the slope of the flow disrupter 176, etc.) from the transfer conduit 175 to the center point 300 for the same radial height $h_r$. The angular height $h_a$ for each of the flow disrupters 176 may be independently selected such that the exhaust gas aftertreatment system 100 is tailored for a target application. In this way, for example, an ability of each of the flow disrupter 176 to cause mixing of the exhaust gas and the treatment fluid and/or the air-treatment fluid mixture may be selected so as to tailor the exhaust gas aftertreatment system 100 for a target application.

In various embodiments, the angular height $h_a$ for each of the flow disrupters 176 is approximately equal to between 15° and 70°, inclusive (e.g., 14.25°, 15°, 20°, 30°, 48.5°, 50°, 55°, 60°, 70°, 73.5°, etc.). In some embodiments, the angular height $h_a$ for each of the flow disrupters 176 is approximately equal to between 30° and 60°, inclusive (e.g., 28.5°, 30°, 45°, 48.5°, 55°, 60°, 63°, etc.).

In some applications, such as is shown in FIGS. 2-4, the angular heights $h_a$ for all of the flow disrupters 176 are equal. In other embodiments, the angular height $h_a$ for each of the flow disrupters 176 is different from the angular heights $h_a$ for the others of the flow disrupters 176. For example, where four of the flow disrupters 176 are included, the first flow disrupter 176 may have a first angular height $h_{a1}$, the second flow disrupter 176 may have a second angular height $1.05h_{a1}$, the third flow disrupter 176 may have a third angular height $1.1h_{a1}$, and the fourth flow disrupter 176 may have a fourth angular height $1.15h_{a1}$.

Additionally, each of the flow disrupters 176 shown in FIGS. 2-4 is also defined by a width w. The width w is measured between opposite ends of the downstream edge of each flow disrupter 176.

The width w influences how far each of the flow disrupters 176 projects into the transfer conduit 175, and therefore how much each of the flow disrupters 176 impacts the exhaust gas and the treatment fluid and/or the air-treatment fluid mixture. For example, the greater the width w, the more disruption that the flow disrupter 176 causes to the exhaust gas and the treatment fluid and/or the air-treatment fluid mixture. The width w for each of the flow disrupters 176 may be independently selected such that the exhaust gas aftertreatment system 100 is tailored for a target application. In this way, for example, an ability of each of the flow disrupter 176 to cause mixing of the exhaust gas and the treatment fluid and/or the air-treatment fluid mixture may be selected so as to tailor the exhaust gas aftertreatment system 100 for a target application.

The width w may be selected based on the conduit diameter $d_c$. For example, the flow disrupters 176 may be configured such that the widths w are each approximately equal to between $0.10d_c$ and $0.70d_c$, inclusive (e.g., $0.095d_c$, $0.10d_c$, $0.15d_c$, $0.33d_c$, $0.50d_c$, $0.60d_c$, $0.70d_c$, $0.735d_c$, etc.). In some applications, the flow disrupters 176 may be configured such that the widths are each approximately equal to between $0.15d_c$ and $0.60d_c$, inclusive (e.g., $0.1425d_c$, $0.15d_c$, $0.33d_c$, $0.60d_c$, $0.63d_c$, etc.).

In some applications, such as is shown in FIGS. 2-4, the widths w for all of the flow disrupters 176 are equal. In other embodiments, the widths w for each of the flow disrupters 176 is different from the widths w for the others of the flow disrupters 176. For example, where four of the flow disrupters 176 are included, the first flow disrupter 176 may have a first width $w_1$, the second flow disrupter 176 may have a second width $1.05w_1$, the third flow disrupter 176 may have a third width $1.1w_1$, and the fourth flow disrupter 176 may have a fourth width $1.15w_1$.

FIGS. 5-12 illustrate the exhaust gas aftertreatment system 100 with the exhaust gas conduit system 102 hidden, according to various embodiments.

Figure 6:
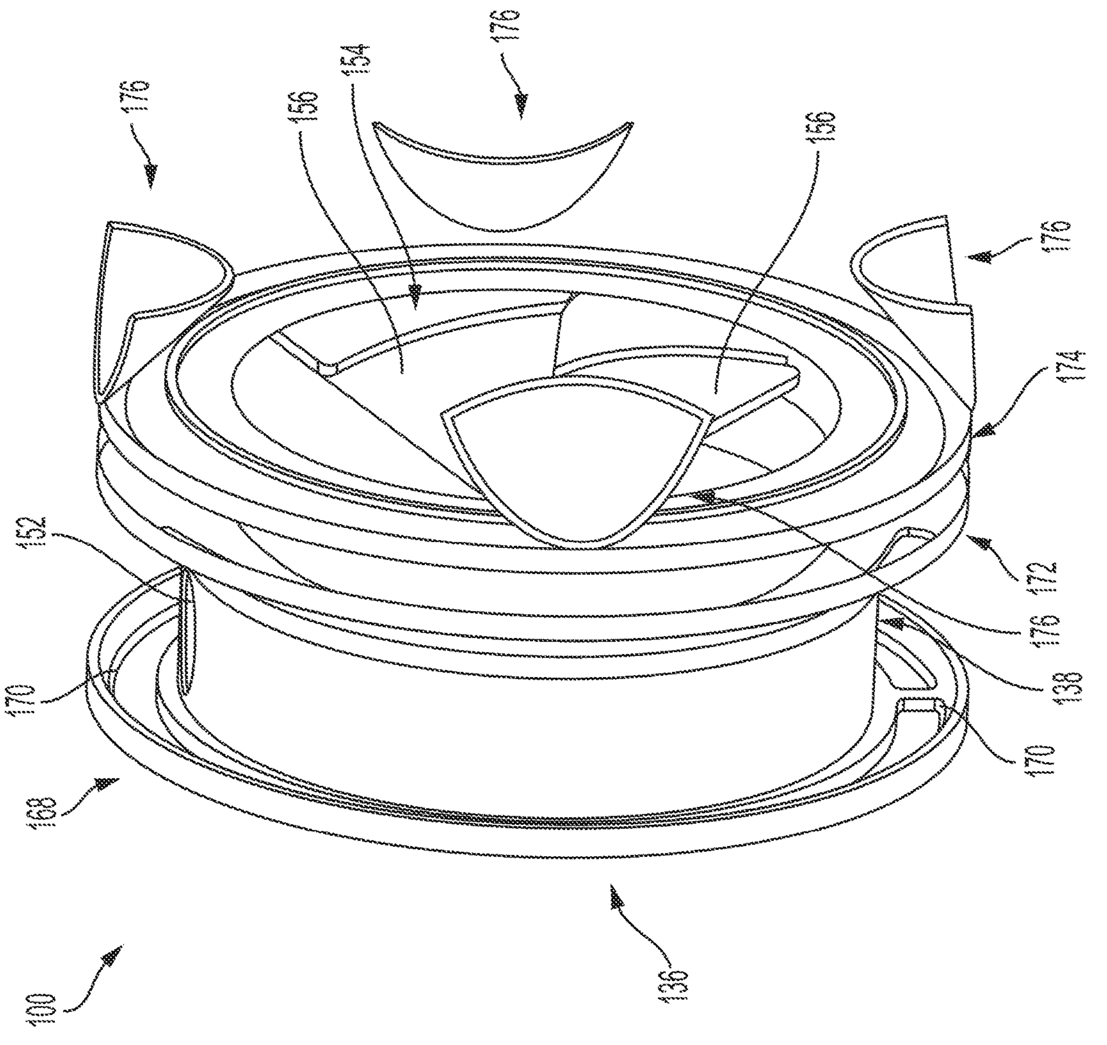
FIG. 6 is a perspective view of a portion of an example exhaust gas aftertreatment system including flow disrupters.

As shown in FIG. 6, four of the flow disrupters 176 are included, the first flow disrupter 176 having a first angular separation αs approximately equal to 0°, a second flow disrupter 176 having a second angular separation αs approximately equal to 90°, a third flow disrupter 176 having a third angular separation αs approximately equal to 180°, and a fourth flow disrupter 176 having a fourth angular separation αs approximately equal to 270°. Such an arrangement may be capable of attaining a uniformity index (UI) of the treatment fluid in the exhaust gas downstream of the flow disrupters 176 of approximately 0.976 with a total pressure drop of the mixer 136 being approximately 1.677 kilopascals (kPa), a fluid density index (FDI) of approximately 0.955, and a wall-film percentage of approximately 5.9%.

Figure 7:
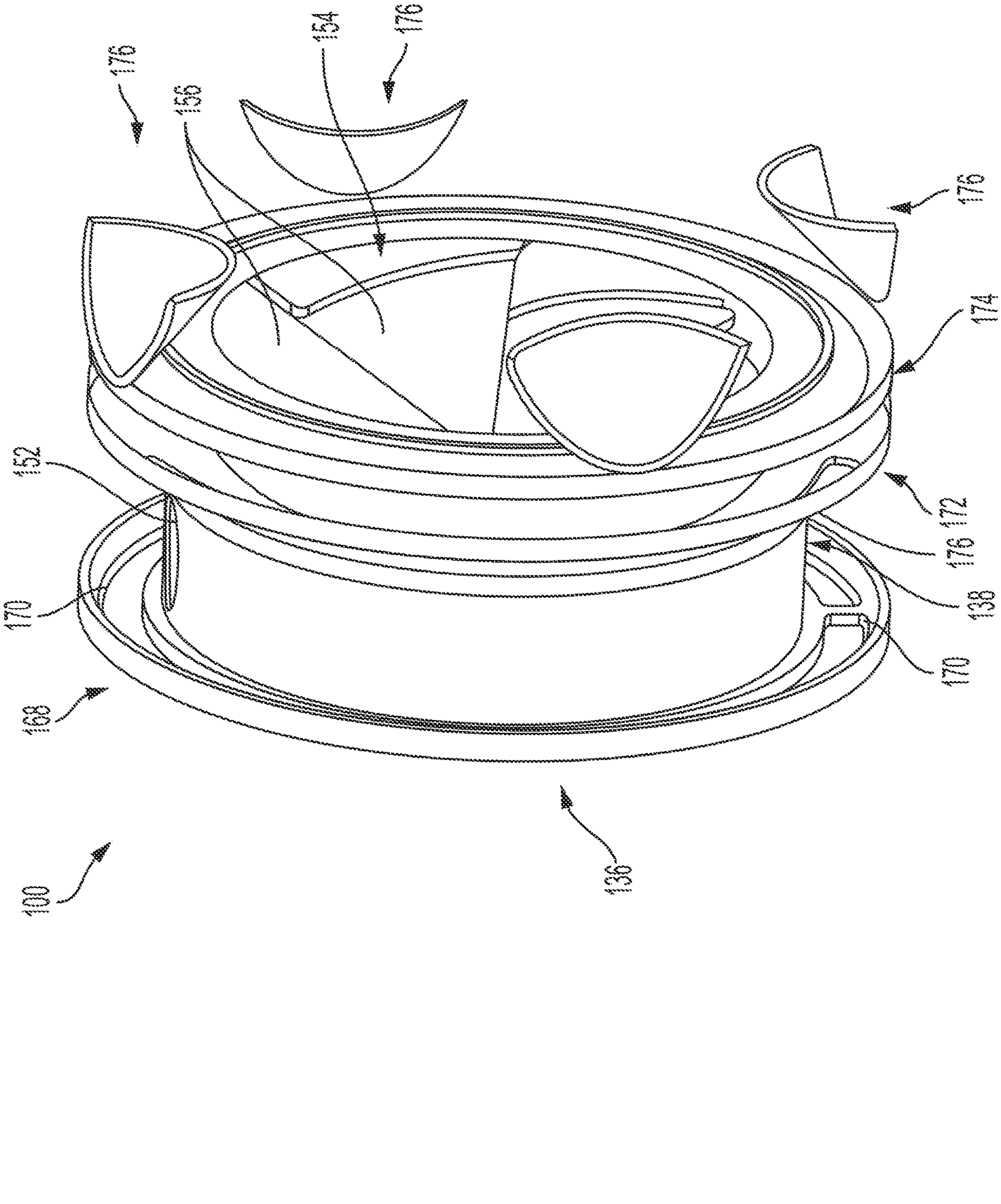
FIG. 7 is a perspective view of a portion of an example exhaust gas aftertreatment system including flow disrupters.

Referring to FIG. 7, four of the flow disrupters 176 are included, the first flow disrupter 176 having a first angular separation $\alpha_s$ approximately equal to −15°, a second flow disrupter 176 having a second angular separation $\alpha_s$ approximately equal to 75°, a third flow disrupter 176 having a third angular separation $\alpha_s$ approximately equal to 165°, and a fourth flow disrupter 176 having a fourth angular separation $\alpha_s$ approximately equal to 255°. Such an arrangement may be capable of attaining a UI of the treatment fluid in the exhaust gas downstream of the flow disrupters 176 of approximately 0.972 with a total pressure drop of the mixer 136 being approximately 1.557 kPa, an FDI of approximately 0.968, and a wall-film percentage of approximately 5.8%.

Figure 8:
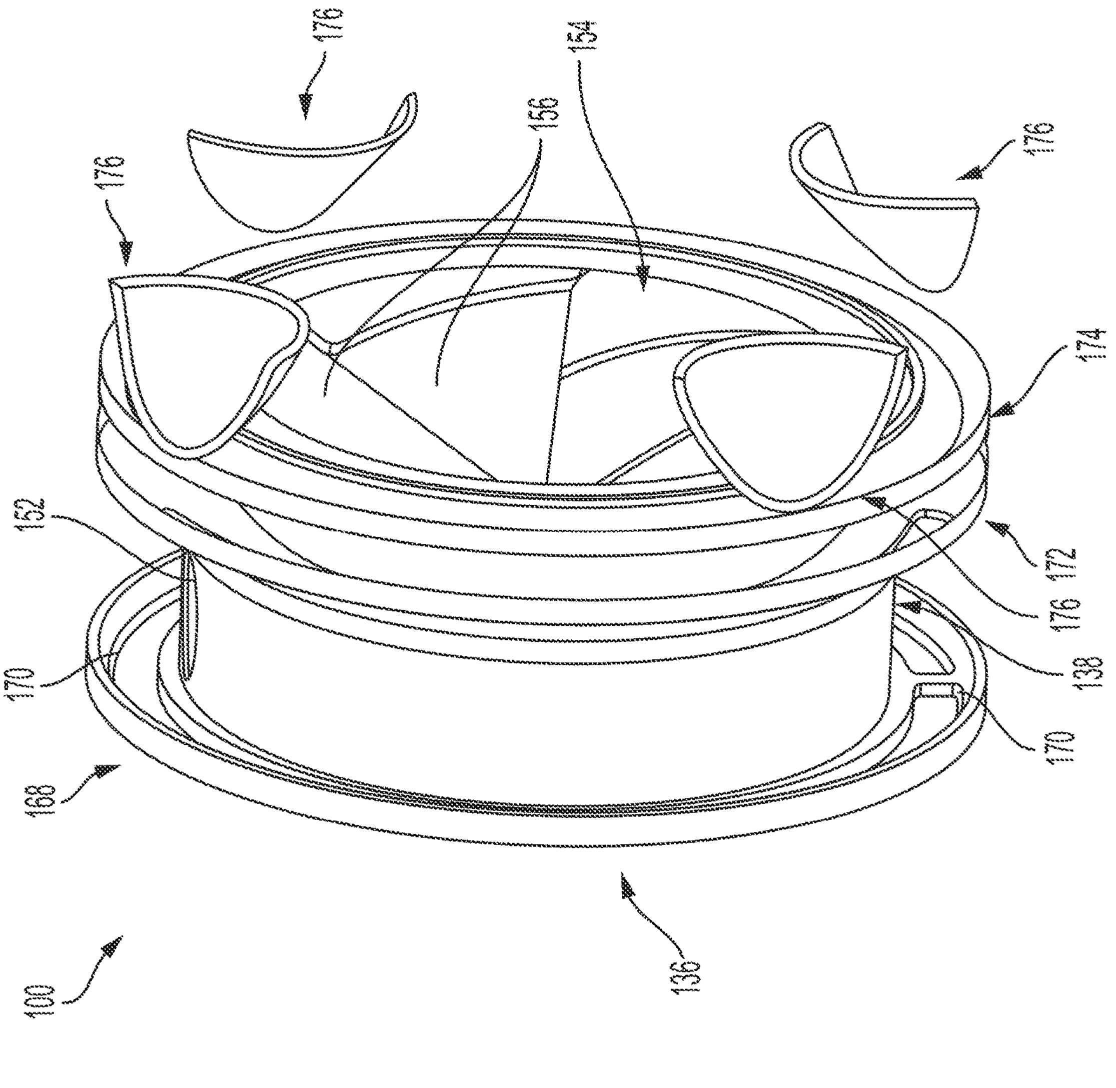
FIG. 8 is a perspective view of a portion of an example exhaust gas aftertreatment system including flow disrupters.

FIG. 8 shows an example where four of the flow disrupters 176 are included, the first flow disrupter 176 having a first angular separation $\alpha_s$ approximately equal to −30°, a second flow disrupter 176 having a second angular separation $\alpha_s$ approximately equal to 60°, a third flow disrupter 176 having a third angular separation $\alpha_s$ approximately equal to 150°, and a fourth flow disrupter 176 having a fourth angular separation $\alpha_s$ approximately equal to 240°. Such an arrangement may be capable of attaining a UI of the treatment fluid in the exhaust gas downstream of the flow disrupters 176 of approximately 0.971 with a total pressure drop of the mixer 136 being approximately 1.550 kPa, an FDI of approximately 0.967, and a wall-film percentage of approximately 5.3%.

Figure 9:
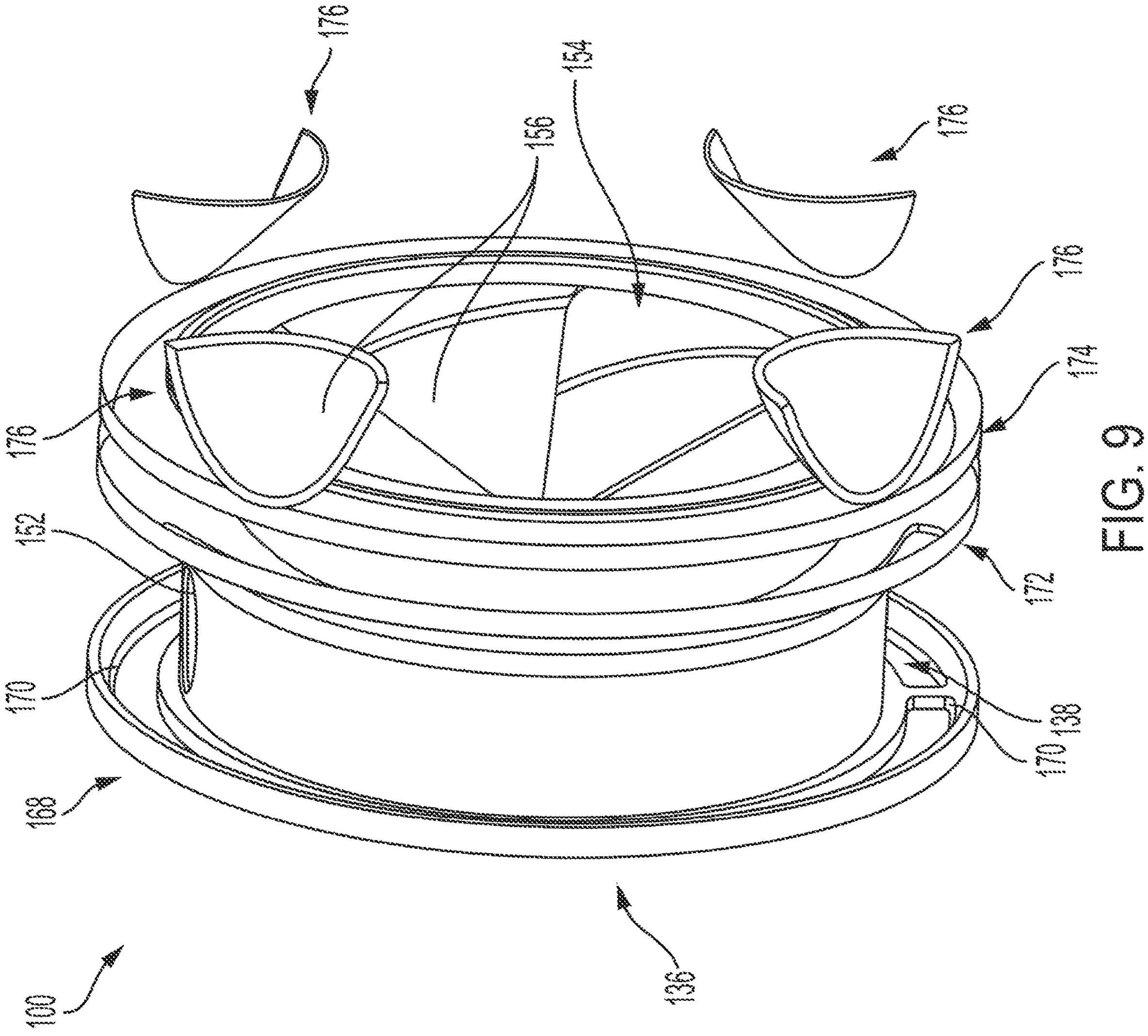
FIG. 9 is a perspective view of a portion of an example exhaust gas aftertreatment system including flow disrupters.

As shown in FIG. 9, four of the flow disrupters 176 are included, the first flow disrupter 176 having a first angular separation $\alpha_s$ approximately equal to −45°, a second flow disrupter 176 having a second angular separation $\alpha_s$ approximately equal to 45°, a third flow disrupter 176 having a third angular separation $\alpha_s$ approximately equal to 135°, and a fourth flow disrupter 176 having a fourth angular separation $\alpha_s$ approximately equal to 225°. Such an arrangement may be capable of attaining a UI of the treatment fluid in the exhaust gas downstream of the flow disrupters 176 of approximately 0.968 with a total pressure drop of the mixer 136 being approximately 1.533 kPa, an FDI of approximately 0.966, and a wall-film percentage of approximately 5.0%.

Figure 10:
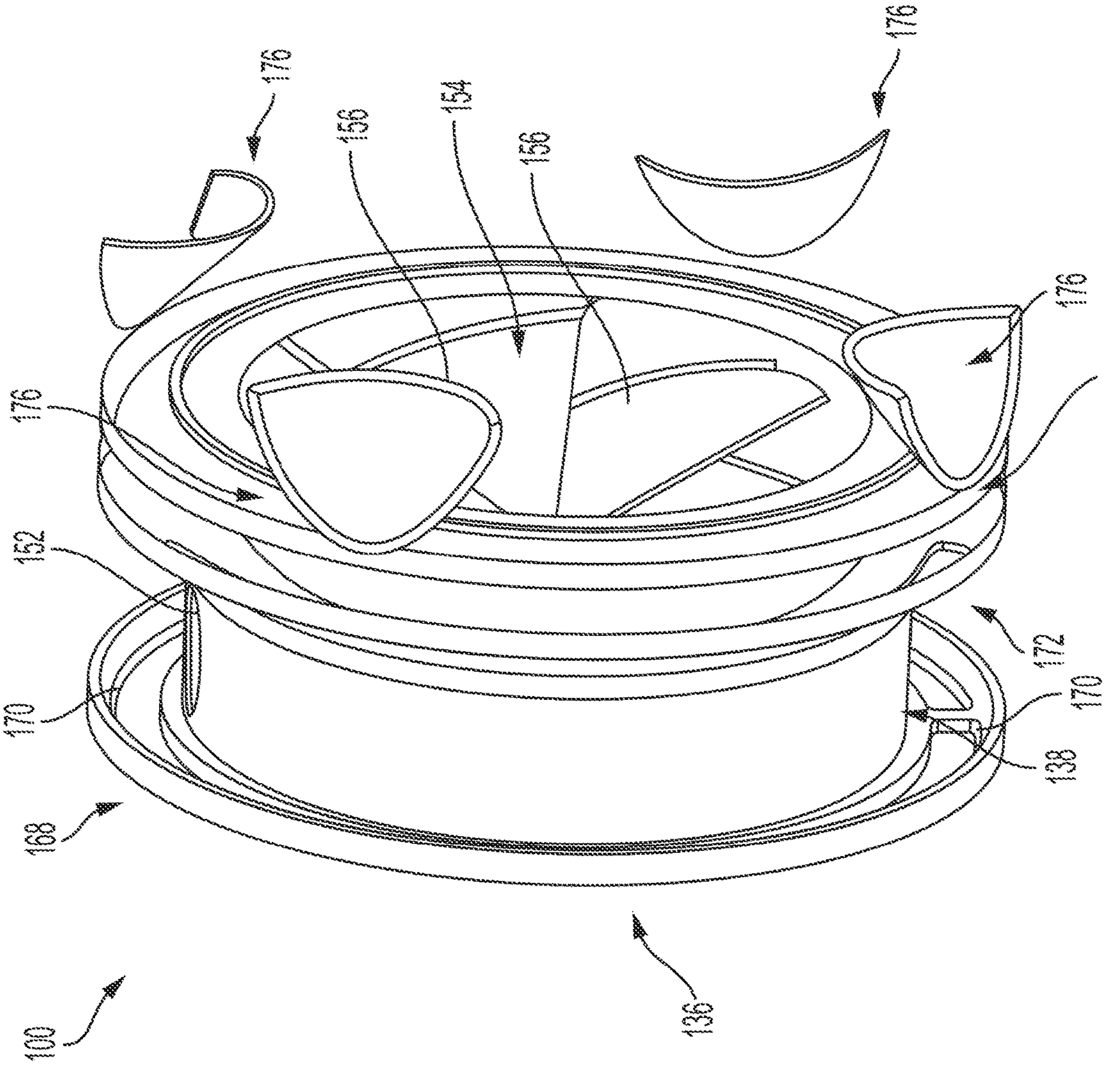
FIG. 10 is a perspective view of a portion of an example exhaust gas aftertreatment system including flow disrupters.

Referring to FIG. 10, four of the flow disrupters 176 are included, the first flow disrupter 176 having a first angular separation $\alpha_s$ approximately equal to −60°, a second flow disrupter 176 having a second angular separation $\alpha_s$ approximately equal to 30°, a third flow disrupter 176 having a third angular separation $\alpha_s$ approximately equal to 120°, and a fourth flow disrupter 176 having a fourth angular separation $\alpha_s$ approximately equal to 210°. Such an arrangement may be capable of attaining a UI of the treatment fluid in the exhaust gas downstream of the flow disrupters 176 of approximately 0.966 with a total pressure drop of the mixer 136 being approximately 1.528 kPa, an FDI of approximately 0.965, and a wall-film percentage of approximately 5.7%.

Figure 11:
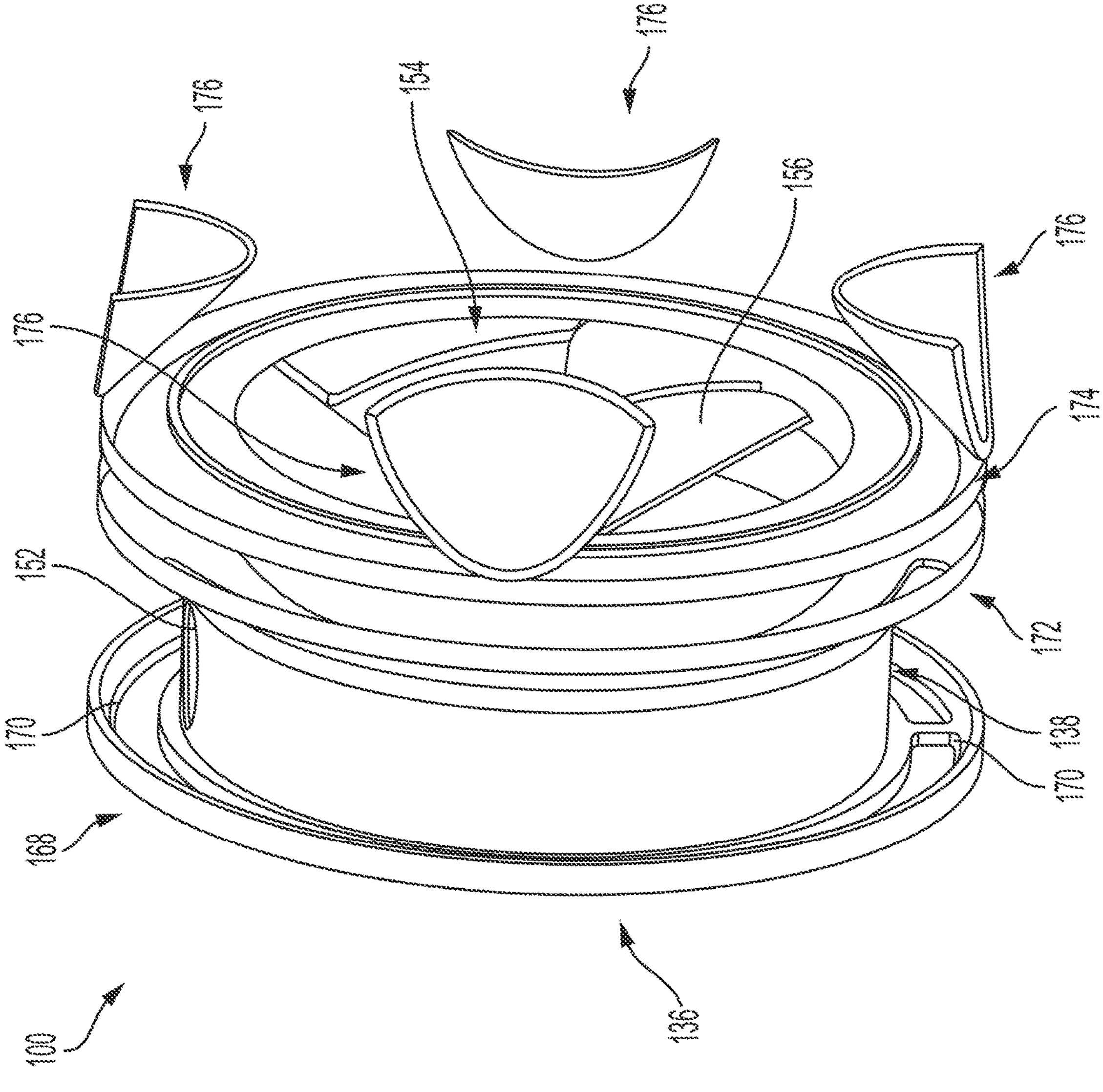
FIG. 11 is a perspective view of a portion of an example exhaust gas aftertreatment system including flow disrupters.

FIG. 11 shows an example where four of the flow disrupters 176 are included, the first flow disrupter 176 having a first angular separation $\alpha_s$ approximately equal to −80°, a second flow disrupter 176 having a second angular separation $\alpha_s$ approximately equal to 10°, a third flow disrupter 176 having a third angular separation $\alpha_s$ approximately equal to 100°, and a fourth flow disrupter 176 having a fourth angular separation $\alpha_s$ approximately equal to 190°. Such an arrangement may be capable of attaining a UI of the treatment fluid in the exhaust gas downstream of the flow disrupters 176 of approximately 0.967 with a total pressure drop of the mixer 136 being approximately 1.582 kPa, an FDI of approximately 0.970, and a wall-film percentage of approximately 5.5%.

Figure 12:
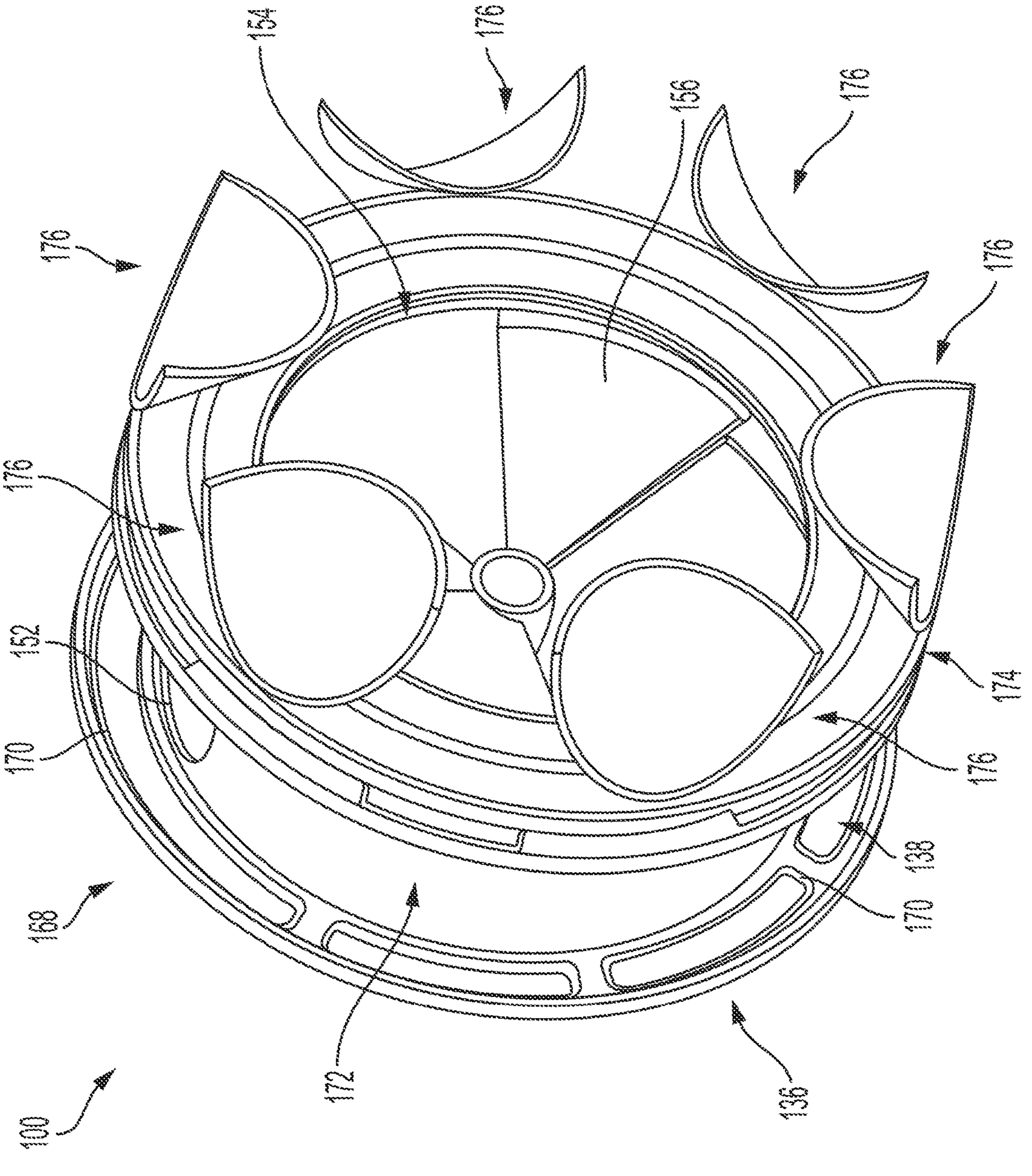
FIG. 12 is a perspective view of a portion of an example exhaust gas aftertreatment system including flow disrupters.

As shown in FIG. 12, six of the flow disrupters 176 are included. In some applications, the first flow disrupter 176 may have a first angular separation $\alpha_s$ approximately equal to 15°, the second flow disrupter 176 may have a second angular separation $\alpha_s$ approximately equal to 75°, the third flow disrupter 176 may have a third angular separation $\alpha_s$ approximately equal to 135°, the fourth flow disrupter 176 may have a fourth angular separation $\alpha_s$ approximately equal to 195°, the fifth flow disrupter 176 may have a fifth angular separation $\alpha_s$ approximately equal to 255°, and the sixth flow disrupter 176 may have a sixth angular separation $\alpha_s$ approximately equal to 305°.

Figure 13:
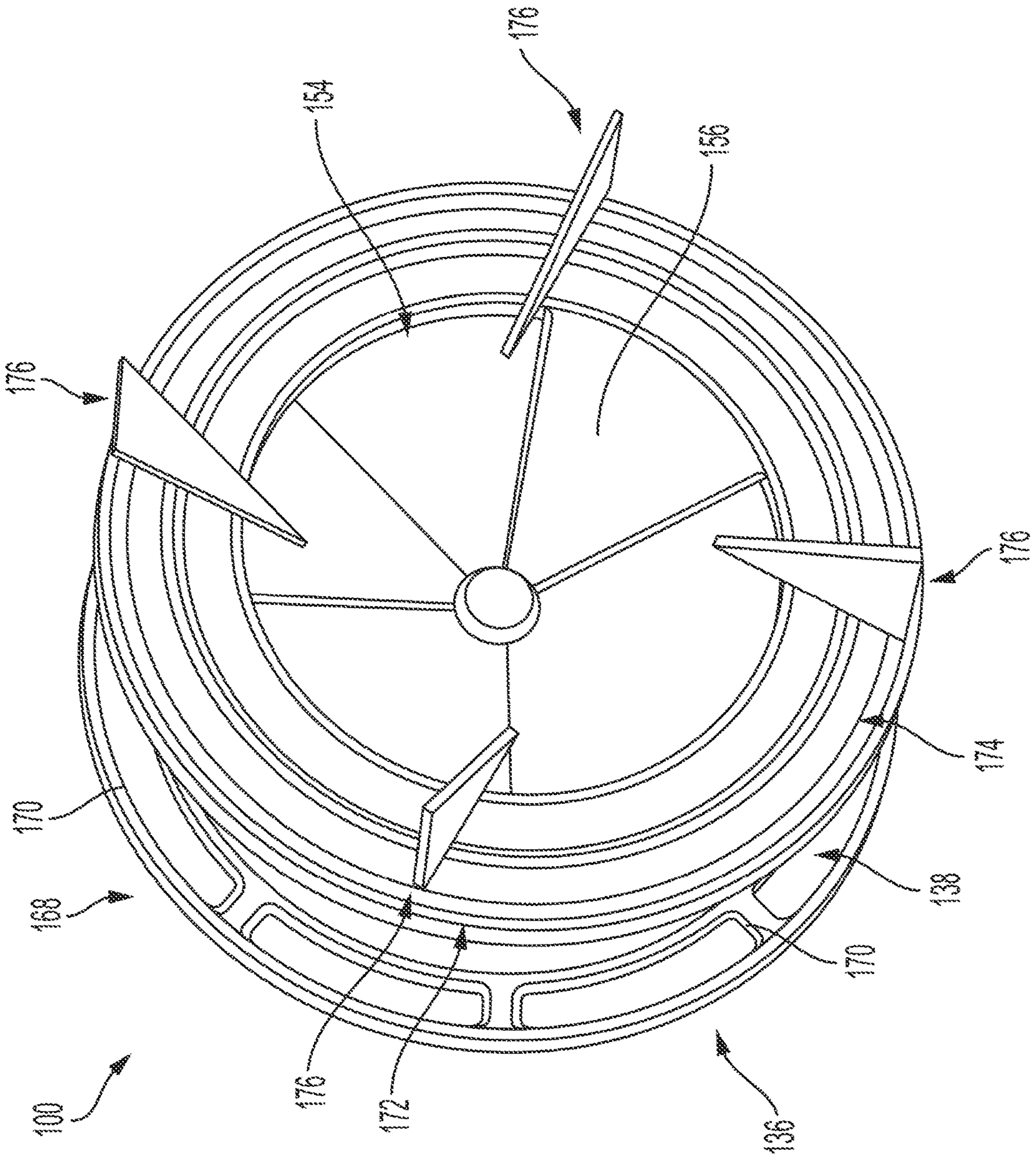
FIG. 13 is a perspective view of a portion of an example exhaust gas aftertreatment system including flow disrupters.

FIG. 13 illustrates the exhaust gas aftertreatment system 100 according to various embodiments. Rather than the flow disrupters 176 being semi-domes, the flow disrupters 176 are prismatic (e.g., triangular, rectangular, rhomboidal, hexagonal, etc.) plates (e.g., fins, ribs, etc.). The center points 300 are disposed on portions of the flow disrupters 176 which are farthest from the mixer outlet 164.

In some embodiments, the flow disrupters 176 include perforations (e.g., apertures, holes, etc.). The perforations are configured to facilitate flow of the exhaust gas through the flow disrupters 176. The perforations may enable flow of the exhaust gas to targeted portions of the catalyst member 182 and/or may decrease a backpressure of the exhaust gas aftertreatment system 100.

While the exhaust gas aftertreatment system 100 has been shown and described in the context of use with a diesel internal combustion engine, it is understood that the exhaust gas aftertreatment system 100 may be used with other internal combustion engines, such as gasoline internal combustion engines, hybrid internal combustion engines, propane internal combustion engines, dual-fuel internal combustion engines, and other similar internal combustion engines.

III. Overview of Second Example Exhaust Gas Aftertreatment Systems

Figure 14:
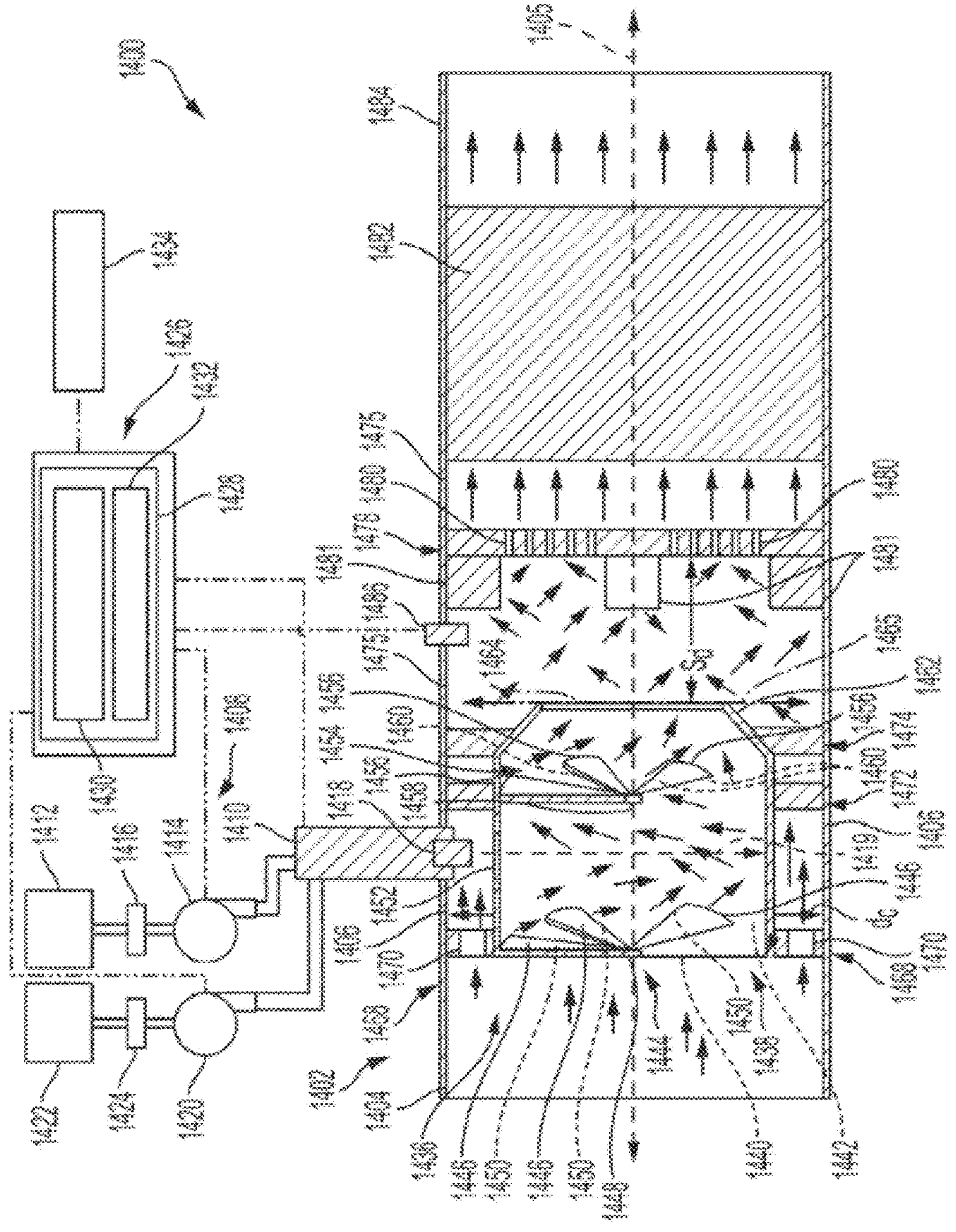
FIG. 14 is a schematic diagram of an example exhaust gas aftertreatment system including flow disrupters.

FIG. 14 depicts an exhaust gas aftertreatment system 1400 (e.g., treatment system, etc.) for treating exhaust gas produced by an internal combustion engine. As is explained in more detail herein, the exhaust gas aftertreatment system 1400 is configured to facilitate treatment of the exhaust gas. This treatment may facilitate reduction of emission of undesirable components in the exhaust gas. This treatment may also or instead facilitate conversion of various oxidation components of the exhaust gas into other components. This treatment may also or instead facilitate removal of particulates from the exhaust gas.

The exhaust gas aftertreatment system 1400 includes an exhaust gas conduit system 1402 (e.g., line system, pipe system, etc.). The exhaust gas conduit system 1402 is configured to facilitate routing of the exhaust gas produced by the internal combustion engine throughout the exhaust gas aftertreatment system 1400 and to atmosphere.

The exhaust gas conduit system 1402 includes an inlet conduit 1404 (e.g., line, pipe, etc.). The inlet conduit 1404 is fluidly coupled to an upstream component and is configured to receive exhaust gas from the upstream component. In some embodiments, the inlet conduit 1404 is coupled to the upstream component. In other embodiments, the inlet conduit 1404 is integrally formed with the upstream component. The inlet conduit 1404 is centered on a conduit center axis 1405 (e.g., the conduit center axis 1405 extends through a center point of the inlet conduit 1404, etc.).

The exhaust gas conduit system 1402 also includes an introduction conduit 1406 (e.g., decomposition housing, decomposition reactor, decomposition chamber, reactor pipe, decomposition tube, reactor tube, hydrocarbon introduction housing, etc.). The introduction conduit 1406 is fluidly coupled to the inlet conduit 1404 and is configured to receive exhaust gas from the inlet conduit 1404. In various embodiments, the introduction conduit 1406 is coupled to the inlet conduit 1404. For example, the introduction conduit 1406 may be, welded, riveted, or otherwise attached to the inlet conduit 1404. In other embodiments, the introduction conduit 1406 is integrally formed with the inlet conduit 1404. In some embodiments, the inlet conduit 1404 is the introduction conduit 1406 (e.g., only the inlet conduit 1404 is included in the exhaust gas conduit system 1402 and the inlet conduit 1404 functions as both the inlet conduit 1404 and the introduction conduit 1406). The introduction conduit 1406 is centered on the conduit center axis 1405 (e.g., the conduit center axis 1405 extends through a center point of the introduction conduit 1406, etc.). The introduction conduit 1406 has a conduit diameter $d_c$. The conduit diameter $d_c$ may be selected so as to tailor the exhaust gas aftertreatment system 1400 for a target application.

The exhaust gas aftertreatment system 1400 also includes a treatment fluid delivery system 1408. As is explained in more detail herein, the treatment fluid delivery system 1408 is configured to facilitate the introduction of a treatment fluid, such as a reductant or a hydrocarbon (e.g., fuel, oil, additive, etc.), into the exhaust gas. When the reductant is introduced into the exhaust gas, reduction of emission of undesirable components in the exhaust gas may be facilitated. When the hydrocarbon is introduced into the exhaust gas, the temperature of the exhaust gas may be increased (e.g., to facilitate regeneration of components of the exhaust gas aftertreatment system 1400, etc.). For example, the temperature of the exhaust gas may be increased by combusting the hydrocarbon within the exhaust gas (e.g., using a spark plug, etc.).

The treatment fluid delivery system 1408 includes a dosing module 1410 (e.g., doser, reductant doser, hydrocarbon doser, etc.). The dosing module 1410 is configured to facilitate passage of the treatment fluid through the introduction conduit 1406 and into the introduction conduit 1406. The dosing module 1410 may include an insulator interposed between a portion of the dosing module 1410 and the portion of the introduction conduit 1406 on which the dosing module 1410 is mounted. In various embodiments, the dosing module 1410 is coupled to the introduction conduit 1406.

The treatment fluid delivery system 1408 also includes a treatment fluid source 1412 (e.g., reductant tank, hydrocarbon tank, etc.). The treatment fluid source 1412 is configured to contain the treatment fluid. The treatment fluid source 1412 is fluidly coupled to the dosing module 1410 and configured to provide the treatment fluid to the dosing module 1410. The treatment fluid source 1412 may include multiple treatment fluid sources 1412 (e.g., multiple tanks connected in series or in parallel, etc.). The treatment fluid source 1412 may be, for example, a diesel exhaust fluid tank containing Adblue® or a fuel tank containing fuel.

The treatment fluid delivery system 1408 also includes a treatment fluid pump 1414 (e.g., supply unit, etc.). The treatment fluid pump 1414 is fluidly coupled to the treatment fluid source 1412 and the dosing module 1410 and configured to receive the treatment fluid from the treatment fluid source 1412 and to provide the treatment fluid to the dosing module 1410. The treatment fluid pump 1414 is used to pressurize the treatment fluid from the treatment fluid source 1412 for delivery to the dosing module 1410. In some embodiments, the treatment fluid pump 1414 is pressure controlled. In some embodiments, the treatment fluid pump 1414 is coupled to a chassis of a vehicle associated with the exhaust gas aftertreatment system 1400.

In some embodiments, the treatment fluid delivery system 1408 also includes a treatment fluid filter 1416. The treatment fluid filter 1416 is fluidly coupled to the treatment fluid source 1412 and the treatment fluid pump 1414 and is configured to receive the treatment fluid from the treatment fluid source 1412 and to provide the treatment fluid to the treatment fluid pump 1414. The treatment fluid filter 1416 filters the treatment fluid prior to the treatment fluid being provided to internal components of the treatment fluid pump 1414. For example, the treatment fluid filter 1416 may inhibit or prevent the transmission of solids to the internal components of the treatment fluid pump 1414. In this way, the treatment fluid filter 1416 may facilitate prolonged desirable operation of the treatment fluid pump 1414.

The dosing module 1410 includes at least one injector 1418 (e.g., insertion device, etc.). The injector 1418 is fluidly coupled to the treatment fluid pump 1414 and configured to receive the treatment fluid from the treatment fluid pump 1414. The injector 1418 is configured to dose the treatment fluid received by the dosing module 1410 into the exhaust gas within the introduction conduit 1406 along an injection axis 1419 (e.g., within a spray cone that is centered on the injection axis 1419, etc.).

In some embodiments, the treatment fluid delivery system 1408 also includes an air pump 1420 and an air source 1422 (e.g., air intake, etc.). The air pump 1420 is fluidly coupled to the air source 1422 and is configured to receive air from the air source 1422. The air pump 1420 is fluidly coupled to the dosing module 1410 and is configured to provide the air to the dosing module 1410. In some applications, the dosing module 1410 is configured to mix the air and the treatment fluid into an air-treatment fluid mixture and to provide the air-treatment fluid mixture to the injector 1418 (e.g., for dosing into the exhaust gas within the introduction conduit 1406, etc.). The injector 1418 is fluidly coupled to the air pump 1420 and configured to receive the air from the air pump 1420. The injector 1418 is configured to dose the air-treatment fluid mixture into the exhaust gas within the introduction conduit 1406. In some of these embodiments, the treatment fluid delivery system 1408 also includes an air filter 1424. The air filter 1424 is fluidly coupled to the air source 1422 and the air pump 1420 and is configured to receive the air from the air source 1422 and to provide the air to the air pump 1420. The air filter 1424 is configured to filter the air prior to the air being provided to the air pump 1420. In other embodiments, the treatment fluid delivery system 1408 does not include the air pump 1420 and/or the treatment fluid delivery system 1408 does not include the air source 1422. In such embodiments, the dosing module 1410 is not configured to mix the treatment fluid with the air.

In various embodiments, the dosing module 1410 is configured to receive air and fluid, and doses the air-treatment fluid mixture into the introduction conduit 1406. In various embodiments, the dosing module 1410 is configured to receive treatment fluid (and does not receive air), and doses the treatment fluid into the introduction conduit 1406. In various embodiments, the dosing module 1410 is configured to receive treatment fluid, and doses the treatment fluid into the introduction conduit 1406. In various embodiments, the dosing module 1410 is configured to receive air and treatment fluid, and doses the air-treatment fluid mixture into the introduction conduit 1406.

The exhaust gas aftertreatment system 1400 also includes a controller 1426 (e.g., control circuit, driver, etc.). The dosing module 1410, the treatment fluid pump 1414, and the air pump 1420 are also electrically or communicatively coupled to the controller 1426. The controller 1426 is configured to control the dosing module 1410 to dose the treatment fluid or the air-treatment fluid mixture into the introduction conduit 1406. The controller 1426 may also be configured to control the treatment fluid pump 1414 and/or the air pump 1420 in order to control the treatment fluid or the air-treatment fluid mixture that is dosed into the introduction conduit 1406.

The controller 1426 includes a processing circuit 1428. The processing circuit 1428 includes a processor 1430 and a memory 1432. The processor 1430 may include a microprocessor, an ASIC, a FPGA, etc., or combinations thereof. The memory 1432 may include, but is not limited to, electronic, optical, magnetic, or any other storage or transmission device capable of providing a processor, ASIC, FPGA, etc. with program instructions. This memory 1432 may include a memory chip, EEPROM, EPROM, flash memory, or any other suitable memory from which the controller 1426 can read instructions. The instructions may include code from any suitable programming language. The memory 1432 may include various modules that include instructions which are configured to be implemented by the processor 1430.

In various embodiments, the controller 1426 is configured to communicate with a central controller 1434 (e.g., ECU, ECM, etc.) of an internal combustion engine having the exhaust gas aftertreatment system 1400. In some embodiments, the central controller 1434 and the controller 1426 are integrated into a single controller.

In some embodiments, the central controller 1434 is communicable with a display device (e.g., screen, monitor, touch screen, HUD, indicator light, etc.). The display device may be configured to change state in response to receiving information from the central controller 1434. For example, the display device may be configured to change between a static state and an alarm state based on a communication from the central controller 1434. By changing state, the display device may provide an indication to a user of a status of the treatment fluid delivery system 1408.

The exhaust gas aftertreatment system 1400 also includes a mixer 1436 (e.g., a swirl generating device, etc.). At least a portion of the mixer 1436 is positioned within the introduction conduit 1406. In some embodiments, a first portion of the mixer 1436 is positioned within the inlet conduit 1404 and a second portion of the mixer 1436 is positioned within the introduction conduit 1406.

The mixer 1436 receives the exhaust gas from the inlet conduit 1404 (e.g., via the introduction conduit 1406, etc.). The mixer 1436 also receives the treatment fluid or the air-treatment fluid mixture received from the injector 1418. The mixer 1436 is configured to mix the treatment fluid or the air-treatment fluid mixture with the exhaust gas. The mixer 1436 is also configured to facilitate swirling of the exhaust gas and mixing of the exhaust gas and the treatment fluid or the air-treatment fluid mixture so as to disperse the treatment fluid within the exhaust gas downstream of the mixer 1436 (e.g., to obtain an increased UI, etc.). By dispersing the treatment fluid within the exhaust gas using the mixer 1436, reduction of emission of undesirable components in the exhaust gas is enhanced and/or an ability of the exhaust gas aftertreatment system 1400 to increase a temperature of the exhaust gas may be enhanced.

The mixer 1436 includes a mixer body 1438 (e.g., shell, frame, etc.). The mixer body 1438 is supported within the inlet conduit 1404 and/or the introduction conduit 1406. In various embodiments, the mixer body 1438 is centered on the conduit center axis 1405 (e.g., the conduit center axis 1405 extends through a center point of the mixer body 1438, etc.). In other embodiments, the mixer body 1438 is centered on an axis that is separated from the conduit center axis 1405. For example, the mixer body 1438 may be centered on an axis that is separated from and approximately parallel to the conduit center axis 1405. In another example, the mixer body 1438 may be centered on an axis that intersects the conduit center axis 1405 and is angled relative to the conduit center axis 1405 (e.g., when viewed on a plane along which the axis and the conduit center axis 1405 extend, etc.).

The mixer body 1438 includes a mixer inlet 1440 (e.g., inlet aperture, inlet opening, etc.). The mixer inlet 1440 receives the exhaust gas (e.g., from the inlet conduit 1404, etc.). The mixer body 1438 defines (e.g., partially encloses, etc.) a mixer cavity 1442 (e.g., void, etc.). The mixer cavity 1442 receives the exhaust gas from the mixer inlet 1440. As is explained in more detail herein, the exhaust gas is caused to swirl within the mixer body 1438.

The mixer 1436 also includes an upstream vane plate 1444 (e.g., upstream mixing element, mixing plate, etc.). The upstream vane plate 1444 is coupled to the mixer body 1438 and is disposed within the mixer cavity 1442. In some embodiments, the upstream vane plate 1444 is coupled to the mixer body 1438 proximate the mixer inlet 1440.

The upstream vane plate 1444 includes a plurality of upstream vanes 1446 (e.g., plates, fins, etc.). Each of the upstream vanes 1446 extends within the mixer cavity 1442 so as to cause the exhaust gas to swirl within the mixer cavity 1442 (e.g., downstream of the upstream vane plate 1444, etc.). At least one of the upstream vanes 1446 is coupled to the mixer body 1438. For example, an edge of one of the upstream vanes 1446 may be coupled to the mixer body 1438 (e.g., using spot welds, etc.).

In various embodiments, each of the upstream vanes 1446 is coupled to an upstream vane hub 1448 (e.g., center post, etc.). For example, the upstream vanes 1446 may be coupled to the upstream vane hub 1448 such that the upstream vane plate 1444 is rotationally symmetric about the upstream vane hub 1448. In various embodiments, the upstream vane hub 1448 is centered on the conduit center axis 1405 (e.g., the conduit center axis 1405 extends through a center point of the upstream vane hub 1448, etc.).

The upstream vane plate 1444 defines a plurality of upstream vane apertures 1450 (e.g., windows, holes, etc.). Each of the upstream vane apertures 1450 is located between two adjacent upstream vanes 1446. For example, where the upstream vane plate 1444 includes four upstream vanes 1446, the upstream vane plate 1444 includes four upstream vane apertures 1450 (e.g., a first upstream vane aperture 1450 between a first upstream vane 1446 and a second upstream vane 1446, a second upstream vane aperture 1450 between the second upstream vane 1446 and a third upstream vane 1446, a third upstream vane aperture 1450 between the third upstream vane 1446 and a fourth upstream vane 1446, and a fourth upstream vane aperture 1450 between the fourth upstream vane 1446 and the first upstream vane 1446). In various embodiments, the upstream vane plate 1444 includes the same number of upstream vanes 1446 and upstream vane apertures 1450.

The mixer body 1438 also includes a treatment fluid inlet 1452 (e.g., aperture, window, hole, etc.). The treatment fluid inlet 1452 is aligned with the injector 1418 and the mixer body 1438 is configured to receive the treatment fluid or the air-treatment fluid mixture through the treatment fluid inlet 1452. The treatment fluid inlet 1452 is disposed downstream of the upstream vane plate 1444. As a result, the treatment fluid or the air-treatment fluid mixture flows from the injector 1418, between the mixer body 1438 and the introduction conduit 1406, through the mixer body 1438 via the treatment fluid inlet 1452, and into the mixer cavity 1442 (e.g., downstream of the upstream vane plate 1444, etc.). The injection axis 1419 extends through the treatment fluid inlet 1452.

The mixer 1436 also includes a downstream vane plate 1454 (e.g., downstream mixing element, mixing plate, etc.). The downstream vane plate 1454 is coupled to the mixer body 1438 and is disposed within the mixer cavity 1442. In various embodiments, the downstream vane plate 1454 is coupled to the mixer body 1438 downstream of the treatment fluid inlet 1452 such that the treatment fluid inlet 1452 is located between the upstream vane plate 1444 and the downstream vane plate 1454.

The downstream vane plate 1454 includes a plurality of downstream vanes 1456 (e.g., plates, fins, etc.). Each of the downstream vanes 1456 extends within the mixer cavity 1442 so as to cause the exhaust gas to swirl within the mixer cavity 1442 (e.g., downstream of the downstream vane plate 1454, etc.). At least one of the downstream vanes 1456 is coupled to the mixer body 1438. For example, an edge of one of the downstream vanes 1456 may be coupled to the mixer body 1438 (e.g., using spot welds, etc.).

The downstream vane plate 1454 may include more, less, or the same number of downstream vanes 1456 as the upstream vane plate 1444 includes the upstream vanes 1446. For example, where the upstream vane plate 1444 includes five upstream vanes 1446, the downstream vane plate 1454 may include three, four, five, six, or other numbers of the downstream vanes 1456.

In various embodiments, each of the downstream vanes 1456 is coupled to a downstream vane hub 1458 (e.g., center post, etc.). For example, the downstream vanes 1456 may be coupled to the downstream vane hub 1458 such that the downstream vane plate 1454 is rotationally symmetric about the downstream vane hub 1458. In various embodiments, the downstream vane hub 1458 is centered on the conduit center axis 1405 (e.g., the conduit center axis 1405 extends through a center point of the downstream vane hub 1458, etc.). In some embodiments, the downstream vane hub 1458 is centered on an axis that is different from an axis that the upstream vane hub 1448 is centered on. For example, the downstream vane hub 1458 may be centered on an axis that is approximately parallel to and separated from an axis that the upstream vane hub 1448 is centered on.

The downstream vane plate 1454 defines a plurality of downstream vane apertures 1460 (e.g., windows, holes, etc.). Each of the downstream vane apertures 1460 is located between two adjacent downstream vanes 1456. For example, where the downstream vane plate 1454 includes four downstream vanes 1456, the downstream vane plate 1454 includes four downstream vane apertures 1460 (e.g., a first downstream vane aperture 1460 between a first downstream vane 1456 and a second downstream vane 1456, a second downstream vane aperture 1460 between the second downstream vane 1456 and a third downstream vane 1456, a third downstream vane aperture 1460 between the third downstream vane 1456 and a fourth downstream vane 1456, and a fourth downstream vane aperture 1460 between the fourth downstream vane 1456 and the first downstream vane 1456). In various embodiments, the downstream vane plate 1454 includes the same number of downstream vanes 1456 and downstream vane apertures 1460.

The mixer 1436 also includes a shroud 1462 (e.g., cover, etc.). The shroud 1462 is contiguous with the mixer body 1438 and extends from the mixer body 1438 towards the conduit center axis 1405. The shroud 1462 functions to funnel (e.g., concentrate, direct, etc.) the exhaust gas towards the conduit center axis 1405.

The shroud 1462 includes a mixer outlet 1464 (e.g., outlet aperture, outlet opening, etc.). The mixer outlet 1464 provides the exhaust gas out of the shroud 1462, and therefore out of the mixer body 1438. Due to the upstream vane plate 1444 and the downstream vane plate 1454, the exhaust gas exiting the mixer outlet 1464 swirls.

The mixer outlet 1464 is disposed along a mixer outlet plane 1465. The conduit center axis 1405 extends through the mixer outlet plane 1465. In various embodiments, the conduit center axis 1405 is orthogonal to the mixer outlet plane 1465.

The exhaust gas aftertreatment system 1400 also includes an upstream flange 1468 (e.g., panel, coupler, ring, etc.). The upstream flange 1468 is coupled to the mixer body 1438 proximate the mixer inlet 1440. The upstream flange 1468 is also coupled to the introduction conduit 1406. The upstream flange 1468 functions to separate the mixer body 1438 from the introduction conduit 1406 and support the mixer 1436 within the introduction conduit 1406.

In various embodiments, the upstream flange 1468 includes a plurality of upstream flange apertures 1470 (e.g., windows, holes, etc.). Each of the upstream flange apertures 1470 is configured to facilitate passage of the exhaust gas through the upstream flange 1468. As a result, the exhaust gas may flow between the mixer body 1438 and the introduction conduit 1406.

At least a portion of the exhaust gas flowing between the mixer body 1438 and the introduction conduit 1406 enters the mixer body 1438 via the treatment fluid inlet 1452. For example, the exhaust gas flowing through the mixer body 1438 may create a vacuum at the treatment fluid inlet 1452 and this vacuum may draw the exhaust gas flowing between the mixer body 1438 and the introduction conduit 1406 into the mixer body 1438 via the treatment fluid inlet 1452. The exhaust gas entering the mixer body via the treatment fluid inlet 1452 may assist in propelling the treatment fluid and/or the air-treatment fluid mixture provided by the injector 1418 into the mixer cavity 1442 (e.g., between the upstream vane plate 1444 and the downstream vane plate 1454, etc.).

The exhaust gas aftertreatment system 1400 also includes a midstream flange 1472 (e.g., panel, coupler, ring, etc.). The midstream flange 1472 is coupled to the mixer body 1438 downstream of the treatment fluid inlet 1452. The midstream flange 1472 is also coupled to the introduction conduit 1406. The midstream flange 1472 functions to separate the mixer body 1438 from the introduction conduit 1406 and support the mixer 1436 within the introduction conduit 1406.

In various embodiments, the midstream flange 1472 is configured to prevent flow of the exhaust gas and the treatment fluid and/or the air-treatment fluid mixture between the mixer body 1438 and the introduction conduit 1406 (e.g., less than 1% of the exhaust gas and the treatment fluid and/or the air-treatment fluid mixture flowing between the mixer body 1438 and the introduction conduit 1406 flows between the midstream flange 1472 and the mixer body 1438 and between the midstream flange 1472 and the introduction conduit 1406, etc.). In this way, the midstream flange 1472 functions to direct the exhaust gas and the treatment fluid and/or the air-treatment fluid mixture flowing between the mixer body 1438 and the introduction conduit 1406 into the mixer body 1438 via the treatment fluid inlet 1452 (e.g., rather than facilitating bypassing of the mixer body 1438 using apertures formed in the midstream flange 1472, etc.).

In some embodiments, the midstream flange 1472 includes apertures that are analogous to the upstream flange apertures 1470. In these embodiments, these apertures are configured to facilitate flow of the exhaust gas and the treatment fluid and/or the air-treatment fluid mixture through the midstream flange 1472.

The exhaust gas aftertreatment system 1400 also includes a downstream flange 1474 (e.g., panel, coupler, ring, etc.). The downstream flange 1474 is coupled to the shroud 1462. The downstream flange 1474 is also coupled to the introduction conduit 1406. The downstream flange 1474 functions to separate the shroud 1462 from the introduction conduit 1406 and support the mixer 1436 within the introduction conduit 1406.

In various embodiments, the downstream flange 1474 is configured to prevent (e.g., less than 1% of the exhaust gas and the treatment fluid and/or the air-treatment fluid mixture flowing between the mixer body 1438 and the introduction conduit 1406 flows between the downstream flange 1474 and the mixer body 1438 and between the downstream flange 1474 and the introduction conduit 1406, etc.) flow of the exhaust gas and the treatment fluid and/or the air-treatment fluid mixture between the shroud 1462 and the introduction conduit 1406. In this way, the downstream flange 1474 functions to prevent flow of the exhaust gas and the treatment fluid and/or the air-treatment fluid mixture exiting the mixer outlet 1464 from flowing back upstream towards the mixer inlet 1440.

The exhaust gas conduit system 1402 also includes a transfer conduit 1475. The transfer conduit 1475 is fluidly coupled to the introduction conduit 1406 and is configured to receive the exhaust gas from the introduction conduit 1406. In various embodiments, the transfer conduit 1475 is coupled to the introduction conduit 1406. For example, the transfer conduit 1475 may be fastened (e.g., using a band, using bolts, using twist-lock fasteners, threaded, etc.), welded, riveted, or otherwise attached to the introduction conduit 1406. In other embodiments, the transfer conduit 1475 is integrally formed with the introduction conduit 1406. In some embodiments, the introduction conduit 1406 is the transfer conduit 1475 (e.g., only the introduction conduit 1406 is included in the exhaust gas conduit system 1402 and the introduction conduit 1406 functions as both the introduction conduit 1406 and the transfer conduit 1475). The transfer conduit 1475 is centered on the conduit center axis 1405 (e.g., the conduit center axis 1405 extends through a center point of the transfer conduit 1475, etc.).

The exhaust gas aftertreatment system 1400 also includes a perforated plate 1478 (e.g., straightening plate, flow straightener, etc.). The perforated plate 1478 is coupled to the transfer conduit 1475 downstream of the mixer 1436. The perforated plate 1478 extends across the transfer conduit 1475. In various embodiments, the perforated plate 1478 extends along a plane that is approximately parallel to a plane that the upstream flange 1468 extends along, a plane that the midstream flange 1472 extends along, and/or a plane that the downstream flange 1474 extends along.

The perforated plate 1478 includes a plurality of perforations 1480 (e.g., holes, apertures, windows, etc.). Each of the perforations 1480 facilitates passage of the exhaust gas and the treatment fluid and/or the air-treatment fluid mixture through the perforated plate 1478. The perforated plate 1478 is configured such that flow of the exhaust gas and the treatment fluid and/or the air-treatment fluid mixture between the perforated plate 1478 and the transfer conduit 1475 is substantially prevented (e.g., less than 1% of the exhaust gas and the treatment fluid and/or the air-treatment fluid mixture flows between the perforated plate 1478 and the transfer conduit 1475, etc.).

The perforations 1480 function to straighten flow of the exhaust gas and the treatment fluid and/or the air-treatment fluid mixture downstream of the perforated plate 1478. For example, the exhaust gas and the treatment fluid and/or the air-treatment fluid mixture may be tumbling upstream of the perforated plate 1478, may flow through the perforated plate 1478 via the perforations 1480, and then may flow along relatively straight flow paths downstream of the perforated plate 1478.

The perforated plate 1478 may be variously configured so as to be tailored for a target application. For example, a number of the perforations 1480, locations of each of the perforations 1480, and/or sizes of each of the perforations 1480 may be individually selected such that the perforated plate 1478 is tailored for a target application. By variously locating the perforations 1480, the exhaust gas and the treatment fluid and/or the air-treatment fluid mixture can be directed to target locations downstream of the perforated plate 1478 because of the straight flow paths.

The exhaust gas aftertreatment system 1400 also includes one or more flow disrupters 1481 (e.g., flow disrupters, protrusions, projections, protuberances, ribs, fins, guides, etc.). Each of the flow disrupters 1481 is coupled to or integrally formed with the perforated plate 1478. For example, the flow disrupters 1481 may be welded or fastened to the perforated plate 1478. In another example, the flow disrupters 1481 are formed in the perforated plate 1478 via a bending process which bends portions of the perforated plate 1478 towards the conduit center axis 1405.

Each of the flow disrupters 1481 projects (e.g., protrudes, extends, etc.) from the perforated plate 1478. As a result, the exhaust gas flowing within the transfer conduit 1475 upstream of the perforated plate 1478 is caused to flow around the flow disrupters 1481. By flowing around the flow disrupters 1481, the swirl of the exhaust gas that is provided by the mixer 1436 is disrupted (e.g., broken up, etc.). This disruption causes the exhaust gas to tumble (e.g., mix, etc.) prior to flowing through the perforations 1480. For example, the exhaust gas may tumble along the perforated plate 1478 and straighten after flowing through one of the perforations 1480. In addition to the swirl provided by the mixer 1436, this tumbling provides another mechanism for mixing of the exhaust gas and the treatment fluid and/or the air-treatment fluid mixture. By variously configuring the flow disrupters 1481, a target mixing of the exhaust gas and the treatment fluid and/or the air-treatment fluid mixture can be achieved.

As a result, the flow disrupters 1481 are capable of increasing a UI of the treatment fluid in the exhaust gas without substantially increasing a pressure drop produced by the mixer 1436, a wall-film of the mixer 1436, or deposits formed by the mixer 1436, compared to other mixing devices. Additionally, the configuration of the flow disrupters 1481 may be selected so as to minimize manufacturing requirements and decrease weight of the mixer 1436 and low frequency modes when compared to other mixer devices. Furthermore, the mixer 1436 may be variously configured while utilizing the flow disrupters 1481 (e.g., the flow disrupters 1481 do not substantially limit a configuration of the mixer 1436, etc.). For example, the flow disrupters 1481 may enable various sizing of the upstream flange apertures 1470 so as to enable further reduction in pressure drop.

Furthermore, a downstream edge of each of the flow disrupters 1481 (e.g., a juncture between the flow disrupter 1481 and the perforated plate 1478, etc.) is separated from the mixer outlet plane 1465 by a flow disrupter separation $S_d$. The flow disrupter separation Sa for each of the flow disrupters 1481 may be independently selected such that the exhaust gas aftertreatment system 1400 is tailored for a target application.

The flow disrupter separations $S_d$ may be selected based on the conduit diameter $d_c$. For example, the flow disrupters 1481 may be configured such that the flow disrupter separations $S_d$ are each approximately equal to between $0.10d_c$ and $0.30d_c$, inclusive (e.g., $0.095d_c$, $0.10d_c$, $0.13d_c$, $0.19d_c$, $0.20d_c$, $0.25d_c$, $0.30d_c$, $0.315d_c$, etc.). In some applications, the flow disrupters 1481 may be configured such that the flow disrupter separations $S_d$ are each approximately equal to between $0.13d_c$ and $0.25d_c$, inclusive (e.g., $0.1235d_c$, $0.13d_c$, $0.19d_c$, $0.20d_c$, $0.25d_c$, $0.2625d_c$, etc.).

In some applications, such as is shown in FIG. 14, the flow disrupter separations $S_d$ for all of the flow disrupters 1481 are equal. In other embodiments, the flow disrupter separation $S_d$ for each of the flow disrupters 1481 is different from the flow disrupter separations $S_d$ for the others of the flow disrupters 1481. For example, the perforated plate 1478 may be twisted along the conduit center axis 1405 such that the flow disrupters 1481 are staggered along the conduit center axis 1405 by the first flow disrupter 1481 having a first flow disrupter separation $S_{d1}$, the second flow disrupter 1481 having a second flow disrupter separation $1.05S_{d1}$, the third flow disrupter 1481 having a third flow disrupter separation $1.1S_{d1}$, and the fourth flow disrupter 1481 having a fourth flow disrupter separation $1.15S_{d1}$.

Additionally, a center point (e.g., apex, etc.) of each of the flow disrupters 1481 may be angularly separated from the injection axis 1419 by an angular separation $\alpha_s$ when measured along a plane that is orthogonal to the conduit center axis 1405. This plane may be approximately parallel to the mixer outlet plane 1465 and/or a plane along which the injection axis 1419 is disposed. The angular separation $\alpha_s$ for each of the flow disrupters 1481 may be selected independent of the angular separation $\alpha_s$ for others of the flow disrupters 1481 such that the exhaust gas aftertreatment system 1400 is tailored for a target application. In various embodiments, the angular separation $\alpha_s$ for each of the flow disrupters 1481 is approximately equal to between 0° and 270°, inclusive (e.g., 0°, 45°, 55°, 65°, 75°, 90°, 120°, 150°, 180°, 220°, 270°, 283.5°, etc.).

The exhaust gas aftertreatment system 1400 also includes a catalyst member 1482 (e.g., conversion catalyst member, SCR catalyst member, catalyst metals, etc.). The catalyst member 1482 is coupled to the transfer conduit 1475. For example, the catalyst member 1482 may be disposed within a shell which is press-fit within the transfer conduit 1475.

In various embodiments, the catalyst member 1482 is configured to cause decomposition of components of the exhaust gas using reductant (e.g., via catalytic reactions, etc.). In these embodiments, the treatment fluid provided by the dosing module 1410 is reductant. Specifically, the reductant that has been provided into the exhaust gas by the injector 1418 undergoes the processes of evaporation, thermolysis, and hydrolysis to form non-$NO_x$ emissions within the transfer conduit 1475 and/or the catalyst member 1482. In this way, the catalyst member 1482 is configured to assist in the reduction of $NO_x$ emissions by accelerating a $NO_x$ reduction process between the reductant and the $NO_x$ of the exhaust gas into diatomic nitrogen, water, and/or carbon dioxide. The catalyst member 1482 may include, for example, platinum, rhodium, palladium, or other similar materials. In some embodiments, the catalyst member 1482 is a ceramic conversion catalyst member.

In various embodiments, the catalyst member 1482 is configured to oxidize a hydrocarbon and/or carbon monoxide in the exhaust gas and the treatment fluid and/or the air-treatment fluid mixture. In these embodiments, the catalyst member 1482 includes an oxidation catalyst member (e.g., a DOC, etc.). For example, the catalyst member 1482 may be an oxidation catalyst member that is configured to facilitate conversion of carbon monoxide in the exhaust gas and the treatment fluid and/or the air-treatment fluid mixture into carbon dioxide.

In various embodiments, the catalyst member 1482 may include multiple portions. For example, the catalyst member 1482 may include a first portion that includes platinum and a second portion that includes rhodium. By including multiple portions, an ability of the catalyst member 1482 to facilitate treatment of the exhaust gas may be tailored for a target application.

The exhaust gas conduit system 1402 also includes an outlet conduit 1484. The outlet conduit 1484 is fluidly coupled to the transfer conduit 1475 and is configured to receive the exhaust gas from the transfer conduit 1475. In various embodiments, the outlet conduit 1484 is coupled to the transfer conduit 1475. For example, the outlet conduit 1484 may be fastened (e.g., using a band, using bolts, using twist-lock fasteners, threaded, etc.), welded, riveted, or otherwise attached to the transfer conduit 1475. In other embodiments, the outlet conduit 1484 is integrally formed with the transfer conduit 1475. In some embodiments, the transfer conduit 1475 is the outlet conduit 1484 (e.g., only the transfer conduit 1475 is included in the exhaust gas conduit system 1402 and the transfer conduit 1475 functions as both the transfer conduit 1475 and the outlet conduit 1484). The outlet conduit 1484 is centered on the conduit center axis 1405 (e.g., the conduit center axis 1405 extends through a center point of the outlet conduit 1484, etc.).

In various embodiments, the exhaust gas conduit system 1402 only includes a single conduit which functions as the inlet conduit 1404, the introduction conduit 1406, the transfer conduit 1475, and the outlet conduit 1484.

In various embodiments, the exhaust gas aftertreatment system 1400 also includes a sensor 1486 (e.g., sensing unit, detector, flow rate sensor, mass flow rate sensor, volumetric flow rate sensor, velocity sensor, pressure sensor, temperature sensor, thermocouple, hydrocarbon sensor, $NO_x$ sensor, CO sensor, $CO_2$ sensor, $O_2$ sensor, particulate sensor, nitrogen sensor, etc.). The sensor 1486 is coupled to the transfer conduit 1475 and is configured to measure (e.g., sense, detect, etc.) a parameter (e.g., flow rate, mass flow rate, volumetric flow rate, velocity, pressure, temperature, hydrocarbon concentration, $NO_x$ concentration, CO concentration, $CO_2$ concentration, $O_2$ concentration, particulate concentration, nitrogen concentration, etc.) of the exhaust gas and the treatment fluid and/or the air-treatment fluid mixture within the transfer conduit 1475. The sensor 1486 is electrically or communicatively coupled to the controller 1426 and is configured to provide a signal associated with the parameter to the controller 1426. The controller 1426 (e.g., via the processing circuit 1428, etc.) is configured to determine the parameter based on the signal. The controller 1426 may be configured to control the dosing module 1410, the treatment fluid pump 1414, and/or the air pump 1420 based on the signal. Furthermore, the controller 1426 may be configured to communicate the signal to the central controller 1434.

Figure 15:
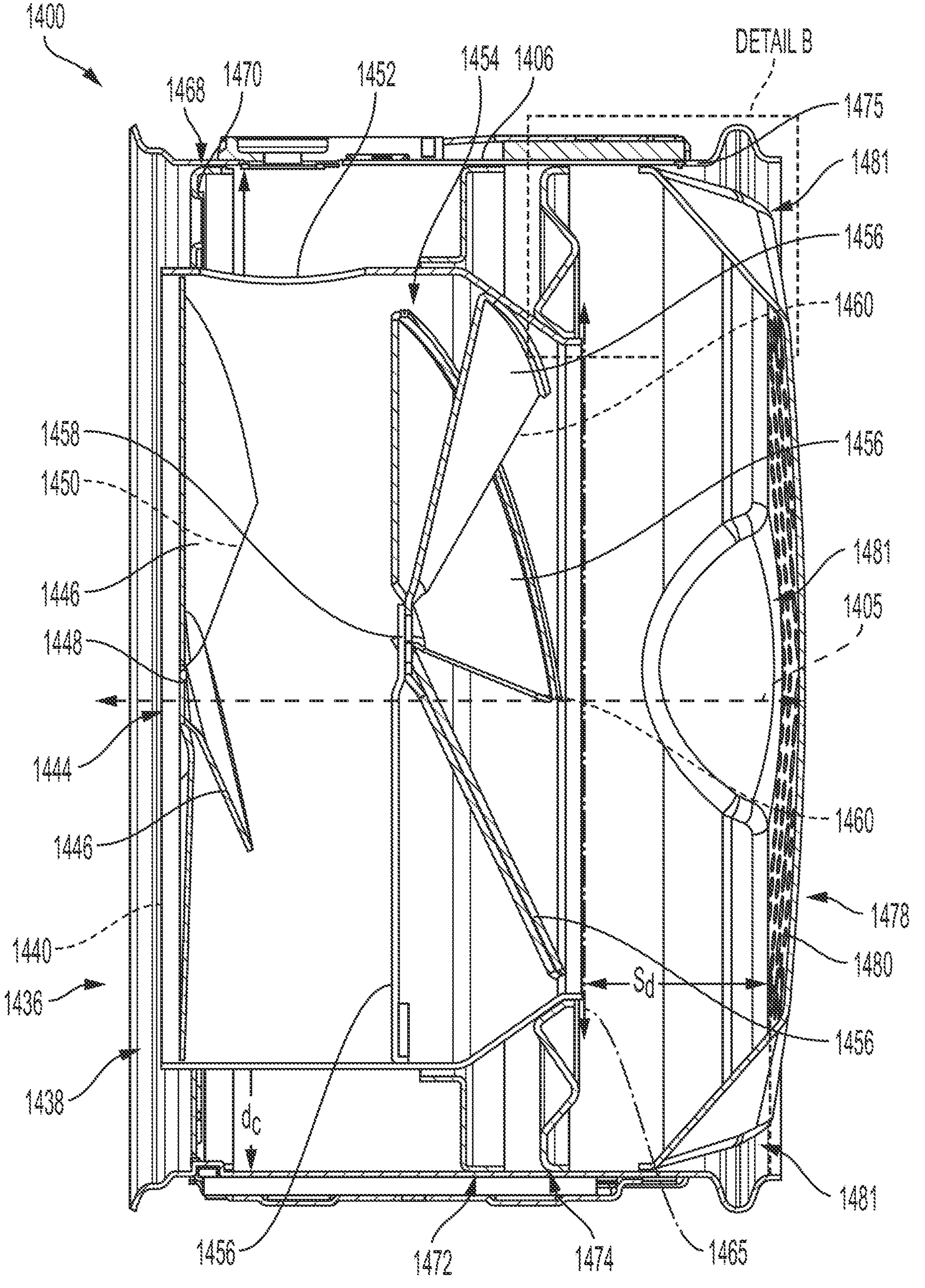
FIG. 15 is a cross-sectional view of a portion of an example exhaust gas aftertreatment system including flow disrupters.
Figure 16:
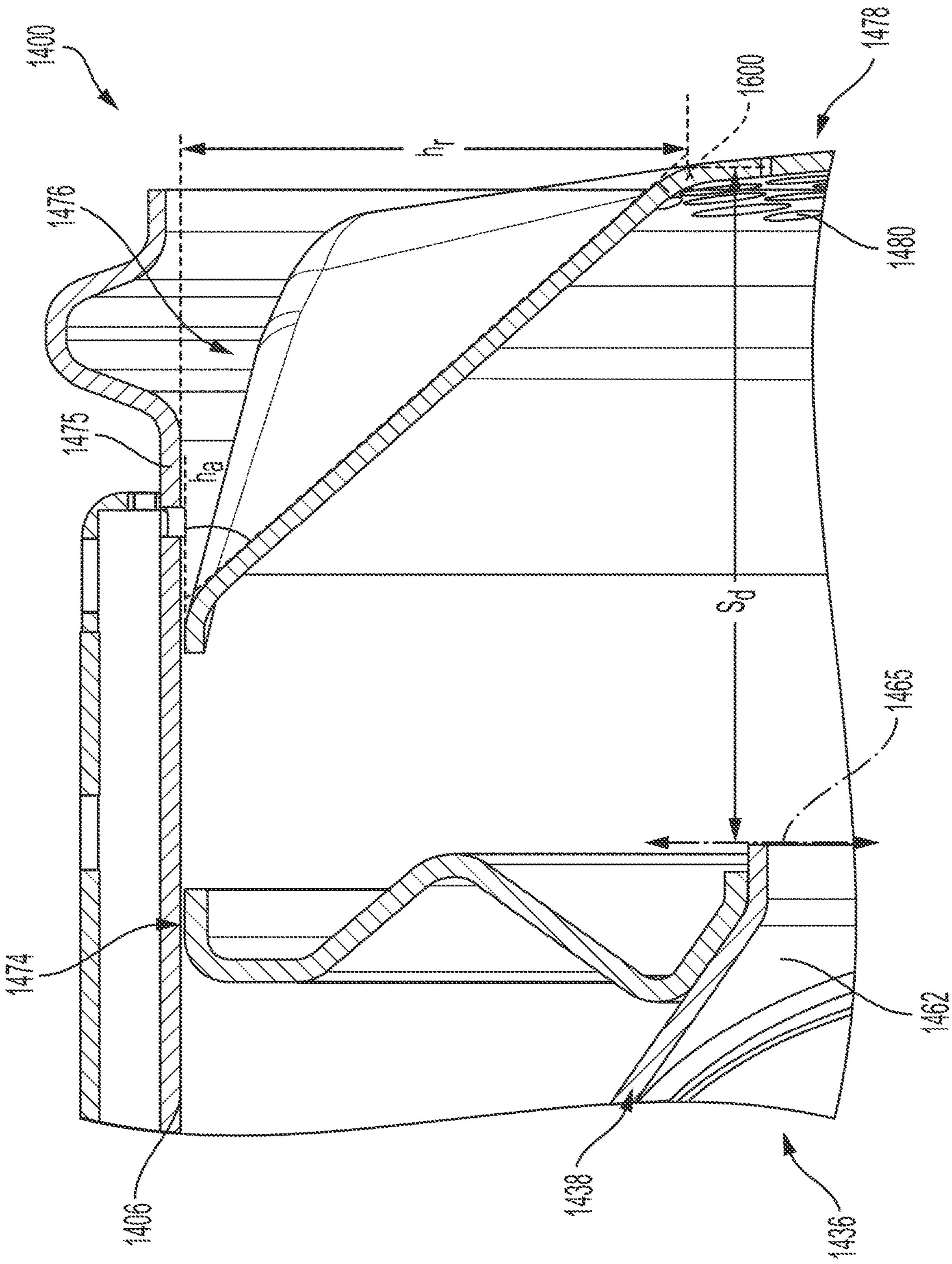
FIG. 16 is detailed view of Detail B in FIG. 15.
Figure 17:
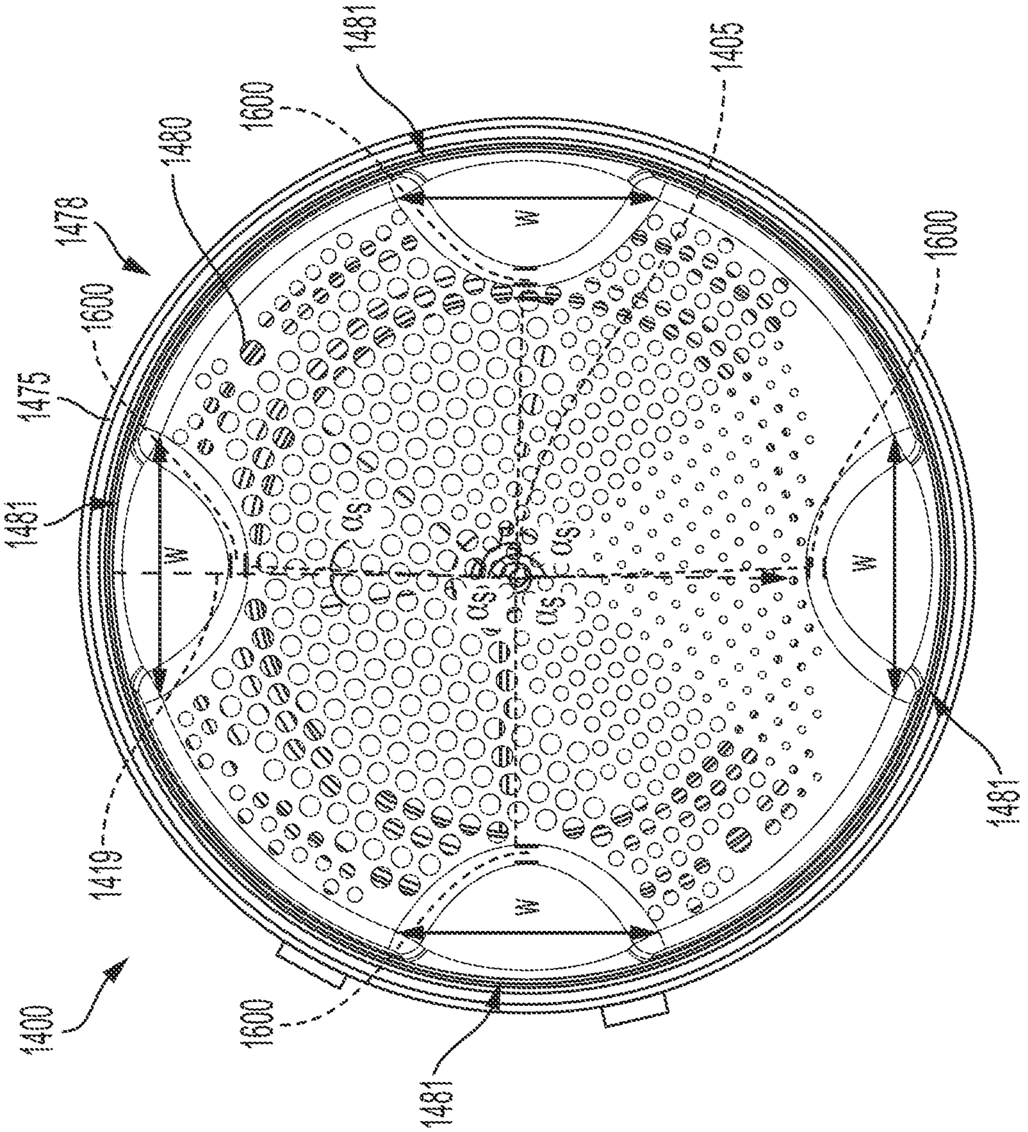
FIG. 17 is a rear view of the portion of the example exhaust gas aftertreatment system shown in FIG. 15.

FIGS. 15-17 illustrate the exhaust gas aftertreatment system 1400 according to various embodiments. In these embodiments, the flow disrupters 1481 are each shaped as a portion of a semi-dome. Each of the flow disrupters 1481 is configured such that an upstream edge is coupled to or in contact with the transfer conduit 1475, the flow disrupter 1481 gradually extends away from the transfer conduit 1475 (e.g., towards the conduit center axis 1405, etc.), and at least a portion of a downstream edge is separated from the transfer conduit 1475. As a result, exhaust gas flowing along the flow disrupters 1481 is gradually directed away from the transfer conduit 1475 (e.g., towards the conduit center axis 1405, etc.).

As shown in FIG. 16, the downstream edge of each of the flow disrupters 1481 has a center point 1600 (e.g., apex, etc.). The flow disrupter separation $S_d$ is measured from the mixer outlet plane 1465 to the center point 1600. Additionally, the angular separation $\alpha_s$ for each of the flow disrupters 1481 is measured from the center point 1600 of each of the flow disrupters 1481, as shown in FIG. 17. For example, as shown in FIG. 17, four of the flow disrupters 1481 are included, the first flow disrupter 1481 having a first angular separation $\alpha_s$ (e.g., 5°, etc.), a second flow disrupter 1481 having a second angular separation $\alpha_s$ (e.g., 50°, etc.), a third flow disrupter 1481 having a third angular separation $\alpha_s$ (e.g., 187°, etc.), and a fourth flow disrupter 1481 having a fourth angular separation $\alpha_s$ (e.g., 275°, etc.).

Furthermore, each of the flow disrupters 1481 shown in FIGS. 15-17 is also defined by a radial height $h_r$. The radial height $h_r$ is measured from each center point 1600 to the transfer conduit 1475 along an axis that is orthogonal to the conduit center axis 1405, and intersects the conduit center axis 1405, the center point 1600, and the transfer conduit 1475.

The radial height $h_r$ influences how far each of the flow disrupters 1481 projects into the transfer conduit 1475, and therefore how much each of the flow disrupters 1481 impacts the exhaust gas and the treatment fluid and/or the air-treatment fluid mixture. For example, the greater the radial height $h_r$, the more disruption that the flow disrupter 1481 causes to the exhaust gas and the treatment fluid and/or the air-treatment fluid mixture. The radial height $h_r$ for each of the flow disrupters 1481 may be independently selected such that the exhaust gas aftertreatment system 1400 is tailored for a target application. In this way, for example, an ability of each of the flow disrupter 1481 to cause mixing of the exhaust gas and the treatment fluid and/or the air-treatment fluid mixture may be selected so as to tailor the exhaust gas aftertreatment system 1400 for a target application.

The radial heights $h_r$ may be selected based on the conduit diameter $d_c$. For example, the flow disrupters 1481 may be configured such that the radial heights $h_r$ are each approximately equal to between $0.05d_c$ and $0.30d_c$, inclusive (e.g., $0.0475d_c$, $0.05d_c$, $0.08d_c$, $0.12d_c$, $0.15d_c$, $0.20d_c$, $0.25d_c$, $0.30d_c$, $0.315d_c$, etc.). In some applications, the flow disrupters 1481 may be configured such that the radial heights $h_r$ are each approximately equal to between $0.08d_c$ and $0.25d_c$, inclusive (e.g., $0.076d_c$, $0.08d_c$, $0.15d_c$, $0.20d_c$, $0.25d_c$, $0.2625d_c$, etc.).

In some applications, such as is shown in FIGS. 15-17, the radial heights $h_r$ for all of the flow disrupters 1481 are equal. In other embodiments, the radial height $h_r$ for each of the flow disrupters 1481 is different from the radial heights $h_r$ for the others of the flow disrupters 1481. For example, where four of the flow disrupters 1481 are included, the first flow disrupter 1481 may have a first radial height $h_{r1}$, the second flow disrupter 1481 may have a second radial height $1.05h_{r1}$, the third flow disrupter 1481 may have a third radial height $1.1h_{r1}$, and the fourth flow disrupter 1481 may have a fourth radial height $1.15h_{r1}$.

Each of the flow disrupters 1481 shown in FIGS. 15-17 is also defined by an angular height $h_a$. The angular height $h_a$ is measured from each center point 1600 to the transfer conduit 1475 along an axis that extends along at least a portion of the flow disrupter 1481 and intersects the conduit center axis 1405, the center point 1600, and the transfer conduit 1475.

The angular height $h_a$ influences how gradual the flow disrupters 1481 transitions from the transfer conduit 1475 to the center point 1600, and therefore how much each of the flow disrupters 1481 impacts the exhaust gas and the treatment fluid and/or the air-treatment fluid mixture. For example, the lower the angular height $h_a$, the more intense the transition (e.g., the greater the slope of the flow disrupter 1481, etc.) from the transfer conduit 1475 to the center point 1600 for the same radial height $h_r$. The angular height $h_a$ for each of the flow disrupters 1481 may be independently selected such that the exhaust gas aftertreatment system 1400 is tailored for a target application. In this way, for example, an ability of each of the flow disrupter 1481 to cause mixing of the exhaust gas and the treatment fluid and/or the air-treatment fluid mixture may be selected so as to tailor the exhaust gas aftertreatment system 1400 for a target application.

In various embodiments, the angular height $h_a$ for each of the flow disrupters 1481 is approximately equal to between 15° and 70°, inclusive (e.g., 14.25°, 15°, 20°, 30°, 48.5°, 50°, 55°, 60°, 70°, 73.5°, etc.). In some embodiments, the angular height $h_a$ for each of the flow disrupters 1481 is approximately equal to between 30° and 60°, inclusive (e.g., 28.5°, 30°, 45°, 48.5°, 55°, 60°, 63°, etc.).

In some applications, such as is shown in FIGS. 15-17, the angular heights $h_a$ for all of the flow disrupters 1481 are equal. In other embodiments, the angular height $h_a$ for each of the flow disrupters 1481 is different from the angular heights $h_a$ for the others of the flow disrupters 1481. For example, where four of the flow disrupters 1481 are included, the first flow disrupter 1481 may have a first angular height $h_{a1}$, the second flow disrupter 1481 may have a second angular height $1.05h_{a1}$, the third flow disrupter 1481 may have a third angular height $1.1h_{a1}$, and the fourth flow disrupter 1481 may have a fourth angular height $1.15h_{a1}$.

Additionally, each of the flow disrupters 1481 shown in FIGS. 15-17 is also defined by a width w. The width w is measured between opposite ends of the downstream edge of each flow disrupter 1481.

The width w influences how far each of the flow disrupters 1481 projects into the transfer conduit 1475, and therefore how much each of the flow disrupters 1481 impacts the exhaust gas and the treatment fluid and/or the air-treatment fluid mixture. For example, the greater the width w, the more disruption that the flow disrupter 1481 causes to the exhaust gas and the treatment fluid and/or the air-treatment fluid mixture. The width w for each of the flow disrupters 1481 may be independently selected such that the exhaust gas aftertreatment system 1400 is tailored for a target application. In this way, for example, an ability of each of the flow disrupter 1481 to cause mixing of the exhaust gas and the treatment fluid and/or the air-treatment fluid mixture may be selected so as to tailor the exhaust gas aftertreatment system 1400 for a target application.

The width w may be selected based on the conduit diameter $d_c$. For example, the flow disrupters 1481 may be configured such that the widths w are each approximately equal to between $0.10d_c$ and $0.70d_c$, inclusive (e.g., $0.095d_c$, $0.10d_c$, $0.15d_c$, $0.33d_c$, $0.50d_c$, $0.60d_c$, $0.70d_c$, $0.735d_c$, etc.). In some applications, the flow disrupters 1481 may be configured such that the widths are each approximately equal to between $0.15d_c$ and $0.60d_c$, inclusive (e.g., $0.1425d_c$, $0.15d_c$, $0.33d_c$, $0.60d_c$, $0.63d_c$, etc.).

In some applications, such as is shown in FIGS. 15-17, the widths w for all of the flow disrupters 1481 are equal. In other embodiments, the widths w for each of the flow disrupters 1481 is different from the widths w for the others of the flow disrupters 1481. For example, where four of the flow disrupters 1481 are included, the first flow disrupter 1481 may have a first width $w_1$, the second flow disrupter 1481 may have a second width $1.05w_1$, the third flow disrupter 1481 may have a third width $1.1w_1$, and the fourth flow disrupter 1481 may have a fourth width $1.15w_1$.

Figure 18:
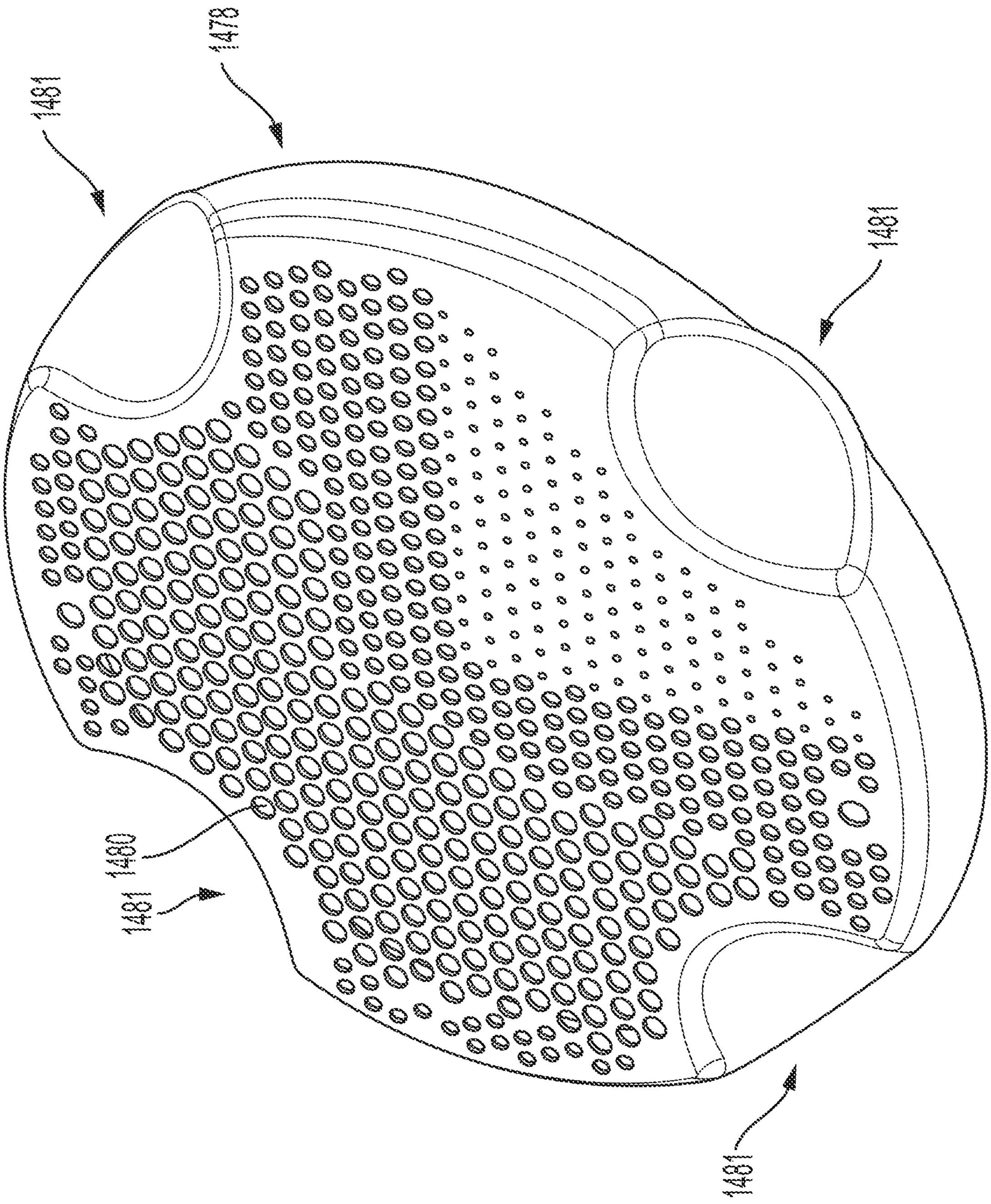
FIG. 18 is a perspective view of a portion of an example exhaust gas aftertreatment system including flow disrupters.
Figure 19:
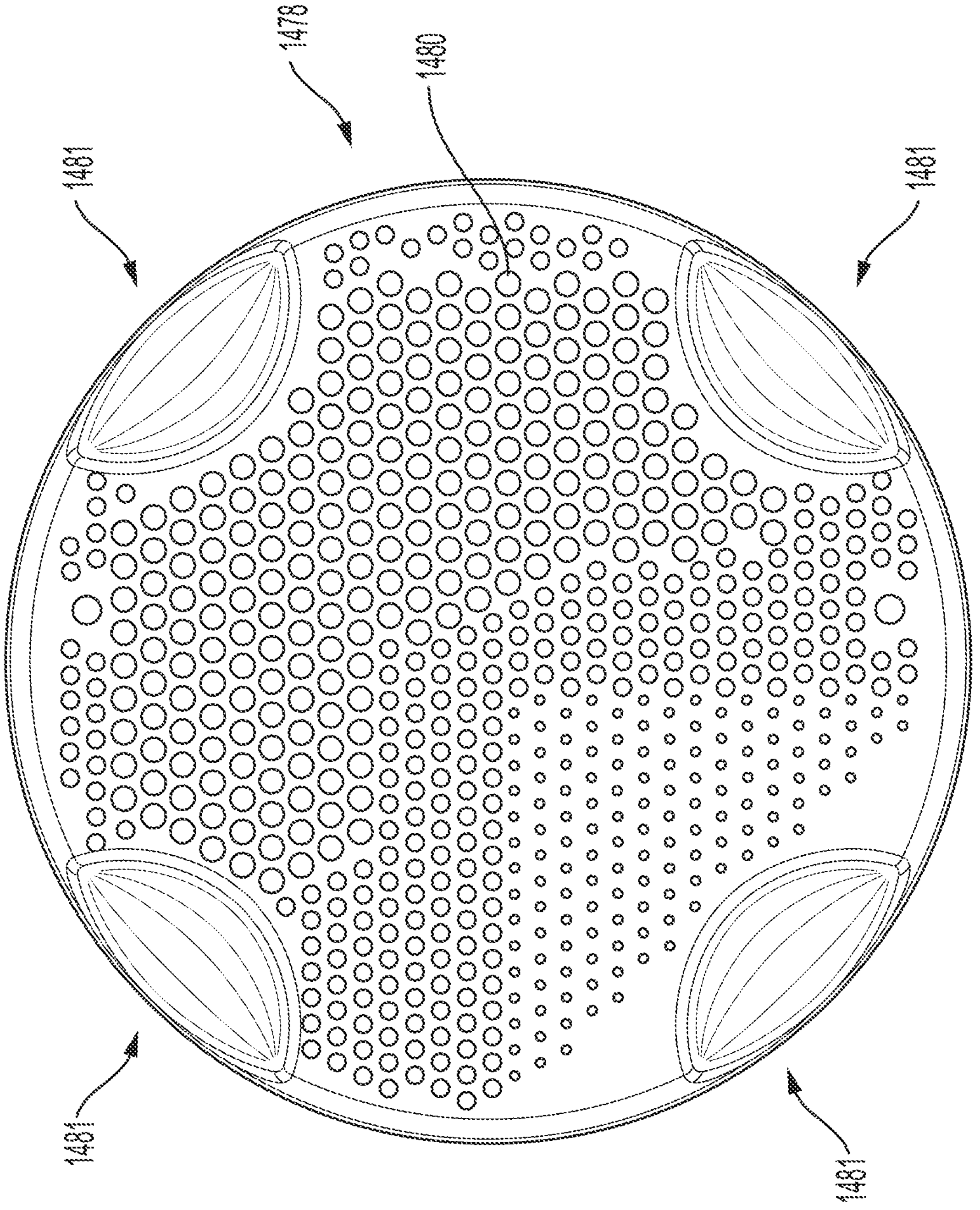
FIG. 19 is a perspective view of a portion of an example exhaust gas aftertreatment system including flow disrupters.

FIGS. 18 and 19 illustrate the perforated plate 1478 and the flow disrupters 1481 according to various embodiments. Specifically, four of the flow disrupters 1481 are integrally formed with the perforated plate 1478. The perforated plate 1478 includes a plurality of the perforations 1480 such that some of the perforations 1480 have different sizes than others of the perforations 1480. For example, each of the perforations 1480 may have a diameter that is approximately equal to between 3 millimeters (mm) and 12 mm, inclusive (e.g., 2.85 mm, 3 mm, 5 mm, 6 mm, 10 mm, 12 mm, 12.6 mm, etc.).

The perforations 1480 may be arranged such that sections of the perforated plate 1478 include perforations 1480 of the same size. For example, as shown in FIGS. 18 and 19, a bottom center section of the perforated plate 1478 includes perforations 1480 of a smaller size than an upper section of the perforated plate 1478. By variously arranging and sizing the perforations 1480, flow through the perforated plate 1478 may be tailored for a target application (e.g., a target configuration of the catalyst member 1482, etc.).

In some embodiments, the flow disrupters 1481 include perforations (e.g., apertures, holes, etc.). The perforations are configured to facilitate flow of the exhaust gas through the flow disrupters 1481. The perforations may enable flow of the exhaust gas to targeted portions of the catalyst member 1482 and/or may decrease a backpressure of the exhaust gas aftertreatment system 1400.

While the exhaust gas aftertreatment system 1400 has been shown and described in the context of use with a diesel internal combustion engine, it is understood that the exhaust gas aftertreatment system 1400 may be used with other internal combustion engines, such as gasoline internal combustion engines, hybrid internal combustion engines, propane internal combustion engines, dual-fuel internal combustion engines, and other similar internal combustion engines.

IV. Configuration of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, reductant, an air-reductant mixture, exhaust gas, hydrocarbon, an air-hydrocarbon mixture, may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. An exhaust gas aftertreatment system comprising:

an exhaust gas conduit centered on a conduit center axis and comprising an inner surface;

a mixer comprising:

a mixer body spaced apart from the inner surface, and a vane plate having a plurality of vanes, at least one of the vanes being coupled to the mixer body; and a plurality of flow disrupters disposed downstream of the mixer, circumferentially around the conduit center axis, and spaced apart from the conduit center axis, each of the flow disrupters extending inwardly from and having an upstream edge in contact with the inner surface.

2. The exhaust gas aftertreatment system of claim 1, wherein:

the mixer further comprises:

a treatment fluid inlet disposed downstream of the vane plate and that is configured to receive a treatment fluid or an air-treatment fluid mixture, and a mixer outlet that is configured to provide exhaust gas and the treatment fluid or the air-treatment fluid mixture to the exhaust gas conduit;

the mixer outlet is disposed along a mixer outlet plane; and $0.10*d_c \leq S_d \leq 0.30*d_c$, where $d_c$ is a conduit diameter of the exhaust gas conduit and $S_d$ is a flow disrupter separation along the conduit center axis between at least one of the flow disrupters and the mixer outlet plane.

3. The exhaust gas aftertreatment system of claim 1, wherein at least one of the flow disrupters is shaped as a portion of a semi-dome.

4. The exhaust gas aftertreatment system of claim 1, further comprising:

a flange coupled to the mixer body, the flange facilitating separation of the mixer body from the exhaust gas conduit, the flange comprising a plurality of flange apertures, each of the flange apertures facilitating passage of exhaust gas through the flange, the flange extending along a first plane; and a perforated plate disposed downstream of the mixer, the perforated plate comprising a plurality of perforations, each of the perforations facilitating passage of the exhaust gas through the perforated plate, the perforated plate extending along a second plane, the second plane being parallel to the first plane.

5. The exhaust gas aftertreatment system of claim 1, wherein each of the flow disrupters is coupled to the exhaust gas conduit.

6. The exhaust gas aftertreatment system of claim 1, wherein each of the flow disrupters is integrally formed with the exhaust gas conduit.

7. The exhaust gas aftertreatment system of claim 1, wherein:

the flow disrupters comprise:

a first flow disrupter with a first downstream edge having a first center point, the first center point being separated from the exhaust gas conduit by a first radial height $h_{r1}$, and a second flow disrupter with a second downstream edge having a second center point, the second center point being separated from the exhaust gas conduit by a second radial height $h_{r2}$;

the first flow disrupter is configured such that $0.05*d_c \leq h_{r1} \leq 0.30*d_c$, where $d_c$ is a conduit diameter of the exhaust gas conduit; and the second flow disrupter is configured such that $0.05*d_c \leq h_{r2} \leq 0.30*d_c$.

8. The exhaust gas aftertreatment system of claim 7, wherein the first flow disrupter and the second flow disrupter are configured such that $h_{r1}=h_{r2}$.

9. The exhaust gas aftertreatment system of claim 1, wherein:

the mixer further comprises a mixer outlet that is configured to provide exhaust gas to the exhaust gas conduit;

the mixer outlet is disposed along a mixer outlet plane; and the flow disrupters comprise:

a first flow disrupter with a first downstream edge that is separated from the mixer outlet plane by a first separation distance, and a second flow disrupter with a second downstream edge that is separated from the mixer outlet plane by a second separation distance that is equal to the first separation distance.

10. The exhaust gas aftertreatment system of claim 9, further comprising:

an injector configured to provide a treatment fluid or an air-treatment fluid mixture into the exhaust gas conduit along an injection axis;

wherein the first downstream edge comprises a first center point that is angularly separated from the injection axis by a first angular separation; and wherein the second downstream edge comprises a second center point that is angularly separated from the injection axis by a second angular separation that is greater than the first angular separation.

11. The exhaust gas aftertreatment system of claim 10, wherein:

the mixer further comprises a treatment fluid inlet disposed downstream of the vane plate and that is configured to receive the treatment fluid or the air-treatment fluid mixture; and the mixer is configured such that the injection axis extends through the treatment fluid inlet.

12. The exhaust gas aftertreatment system of claim 9, further comprising:

an injector configured to provide a treatment fluid or an air-treatment fluid mixture into the exhaust gas conduit along an injection axis;

wherein the first flow disrupter is aligned with the injection axis such that a plane along which the injection axis extends bisects the first flow disrupter.

13. The exhaust gas aftertreatment system of claim 12, wherein the second flow disrupter is aligned with the injection axis such that the plane bisects the second flow disrupter.

14. An exhaust gas aftertreatment system comprising:

an exhaust gas conduit centered on a conduit center axis;

a mixer comprising:

a mixer body, and a vane plate having a plurality of vanes, at least one of the vanes being coupled to the mixer body;

a perforated plate extending across the exhaust gas conduit and disposed downstream of the mixer, the perforated plate comprising a plurality of perforations that are each configured to facilitate passage of exhaust gas through the perforated plate; and a first flow disrupter projecting from the perforated plate or integrally formed with the perforated plate, the first flow disrupter extending towards the conduit center axis.

15. The exhaust gas aftertreatment system of claim 14, further comprising:

a second flow disrupter projecting from the perforated plate or integrally formed with the perforated plate, the second flow disrupter extending towards the conduit center axis;

wherein the perforated plate extends between the first flow disrupter and the second flow disrupter and separates the first flow disrupter from the second flow disrupter.

16. The exhaust gas aftertreatment system of claim 14, wherein at least a portion of the first flow disrupter is disposed upstream of the perforations.

17. The exhaust gas aftertreatment system of claim 14, wherein:

the perforations comprise:

a plurality of first perforations, each of the first perforations having a first diameter, a plurality of second perforations, each of the second perforations having a second diameter larger than the first diameter, and a plurality of third perforations, each of the third perforations having a third diameter larger than the second diameter; and the second perforations are disposed between the first perforations and the third perforations.

18. An exhaust gas aftertreatment system comprising:

an exhaust gas conduit centered on a conduit center axis and comprising an inner surface;

a mixer comprising a mixer outlet disposed along a mixer outlet plane;

a perforated plate coupled to the exhaust gas conduit and disposed downstream of the mixer, the perforated plate comprising a plurality of perforations that are each configured to facilitate passage of exhaust gas through the perforated plate; and a flow disrupter disposed downstream of the mixer and circumferentially around the conduit center axis, the flow disrupter extending inwardly from the inner surface, the flow disrupter configured such that:

$0.10*d_c \leq S_d \leq 0.30*d_c$, where $d_c$ is a conduit diameter of the exhaust gas conduit and $S_d$ is a flow disrupter separation along the conduit center axis between the flow disrupter and the mixer outlet plane, and $0.05*d_c \leq h_r \leq 0.30*d_c$, where $h_r$ is a height of the flow disrupter from the exhaust gas conduit to a center point of a downstream edge of the flow disrupter;

wherein the flow disrupter is:

coupled to the exhaust gas conduit, integrally formed with the exhaust gas conduit, coupled to the perforated plate, or integrally formed with the perforated plate.

19. The exhaust gas aftertreatment system of claim 18, wherein the flow disrupter is shaped as a portion of a semi-dome.

20. The exhaust gas aftertreatment system of claim 18, wherein the flow disrupter is disposed upstream of the perforations.

21. The exhaust gas aftertreatment system of claim 18, further comprising:

an injector configured to provide a treatment fluid or an air-treatment fluid mixture into the exhaust gas conduit along an injection axis;

wherein the flow disrupter is aligned with the injection axis such that a plane along which the injection axis extends bisects the flow disrupter.

22. The exhaust gas aftertreatment system of claim 21, wherein:

the mixer further comprises a treatment fluid inlet that is configured to receive the treatment fluid or the air-treatment fluid mixture; and the mixer is configured such that the injection axis extends through the treatment fluid inlet.

23. An exhaust gas aftertreatment system comprising:

an exhaust gas conduit centered on a conduit center axis and comprising an inner surface;

a mixer comprising:

a mixer body spaced apart from the inner surface, and a vane plate having a plurality of vanes, at least one of the vanes being coupled to the mixer body; and a plurality of flow disrupters disposed downstream of the mixer, circumferentially around the conduit center axis, and spaced apart from the conduit center axis, each of the flow disrupters extending inwardly from the inner surface and integrally formed with the exhaust gas conduit.

* * * * *